(12) United States Patent
Horita

(10) Patent No.: US 11,239,676 B2
(45) Date of Patent: Feb. 1, 2022

(54) MOBILE DEVICE

(71) Applicant: SEIKO EPSON CORPORATION, Tokyo (JP)

(72) Inventor: Ryohei Horita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 217 days.

(21) Appl. No.: 16/575,540

(22) Filed: Sep. 19, 2019

(65) Prior Publication Data

US 2020/0099243 A1  Mar. 26, 2020

(30) Foreign Application Priority Data

Sep. 21, 2018  (JP) ............................. JP2018-177336
Jan. 25, 2019  (JP) ............................. JP2019-011652

(51) Int. Cl.
  *H02J 7/00*  (2006.01)
  *B41J 3/36*  (2006.01)
  *H02J 7/02*  (2016.01)

(52) U.S. Cl.
  CPC ............. H02J 7/0047 (2013.01); B41J 3/36 (2013.01); *H02J 7/02* (2013.01); *H02J 2007/0067* (2013.01); *H02J 2207/20* (2020.01)

(58) Field of Classification Search
  CPC ........ H02J 7/0047; H02J 7/02; H02J 2207/20; H02J 2007/0067; B41J 3/36

USPC .................. 320/114, 127, 136, 162
See application file for complete search history.

(56) References Cited

U.S. PATENT DOCUMENTS

| | | | |
|---|---|---|---|
| 2005/0162132 A1* | 7/2005 | Nagasawa | H02J 9/061 320/128 |
| 2015/0273905 A1 | 10/2015 | Tsuyama | |
| 2018/0120915 A1 | 5/2018 | Li | |
| 2019/0181509 A1* | 6/2019 | Ohtsuka | H01M 10/441 |
| 2019/0280516 A1* | 9/2019 | Shimaya | H02J 9/06 |
| 2020/0099230 A1* | 3/2020 | Horita | H02J 7/0013 |
| 2020/0099242 A1* | 3/2020 | Horita | B41J 29/02 |
| 2020/0099246 A1* | 3/2020 | Horita | H02J 7/025 |

FOREIGN PATENT DOCUMENTS

JP  2015-182369 A  10/2015

* cited by examiner

*Primary Examiner* — Edward Tso
*Assistant Examiner* — Aaron Piggush
(74) *Attorney, Agent, or Firm* — Global IP Counselors, LLP

(57) ABSTRACT

A mobile device includes a drive element, a first battery which outputs power, and a supplying unit which supplies the power output by the first battery or power output by a second battery to the drive element, in which the supplying unit prioritizes supplying of the power output by the second battery to the drive element over the power output by the first battery.

9 Claims, 29 Drawing Sheets

FIG. 9

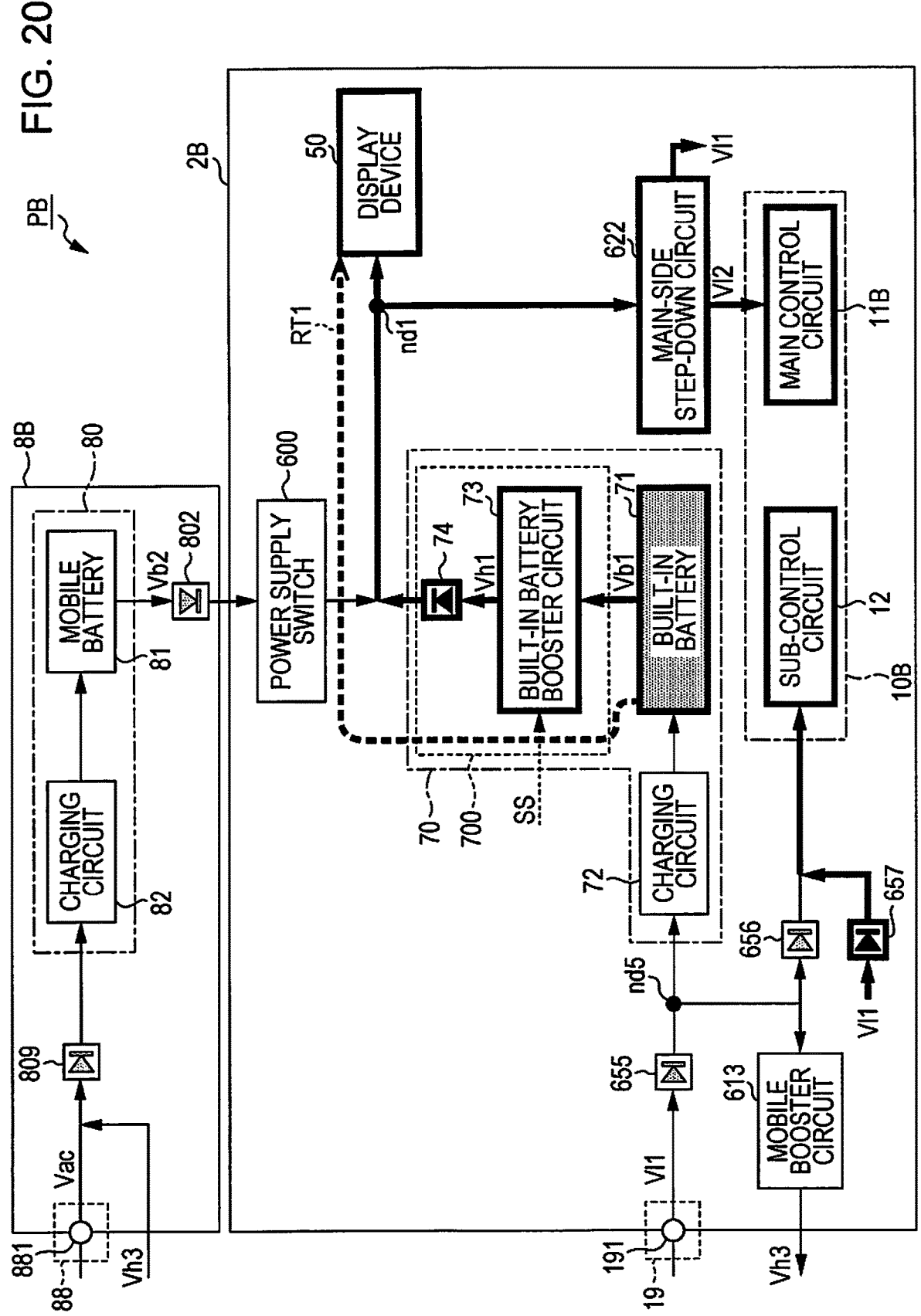

MOBILE DEVICE

The present application is based on, and claims priority from JP Application Serial Number 2018-177336, filed Sep. 21, 2018 and JP Application Serial Number 2019-011652, filed Jan. 25, 2019, the disclosures of which are hereby incorporated by reference herein in their entirety.

BACKGROUND

1. Technical Field

The present disclosure relates to a mobile device.

2. Related Art

A mobile device which is small, light, has portability, and includes a drive element is proposed in the related art. For example, in JP-A-2015-182369, a smart phone provided with a display device as the drive element and including a built-in battery is disclosed as an example of the mobile device.

However, in a mobile device of the related art, when a battery which is built into the mobile device assumes a completely discharged state, a supply of power from a commercial power source is necessary in order to drive a drive element of the mobile device, and there is a problem in that the portability of the mobile device is impeded.

SUMMARY

According to an aspect of the present disclosure, there is provided a mobile device including a drive element, a first battery which outputs power, and a supplying unit which supplies the power output by the first battery or power output by a second battery to the drive element, in which the supplying unit prioritizes supplying of the power output by the second battery to the drive element over the power output by the first battery.

BRIEF DESCRIPTION OF THE DRAWINGS

FIG. 9 is an explanatory diagram illustrating an example of the charging by a built-in battery AC charging mode.

FIG. 20 is an explanatory diagram illustrating an example of the power supplying by a built-in battery power supplying mode.

FIG. 29 is an explanatory diagram illustrating an example of the power bus.

FIG. 30 is an explanatory diagram illustrating an example of the power bus.

DESCRIPTION OF EXEMPLARY EMBODIMENTS

Hereinafter, the embodiments will be described with reference to the drawings. Note that the dimensions and scales of the parts in each of the drawings are rendered differently from actuality, as appropriate. Since the embodiments described hereinafter are favorable specific examples, various technically favorable limitations are afforded. However, the scope of the disclosure is not limited thereto as long as there is no wording particularly limiting the present disclosure in the description hereinafter.

1. First Embodiment

In the present embodiment, a description will be given of a portable device P including a mobile printer 1 that is a mobile type ink jet printer capable of executing a printing process in which an ink is discharged to form an image on a medium. The mobile printer 1 is an example of "the mobile device". The medium is a recording paper such as ordinary paper, a photograph, or a postcard, for example.

1.1. Outline of Portable Device P

Figure 1:
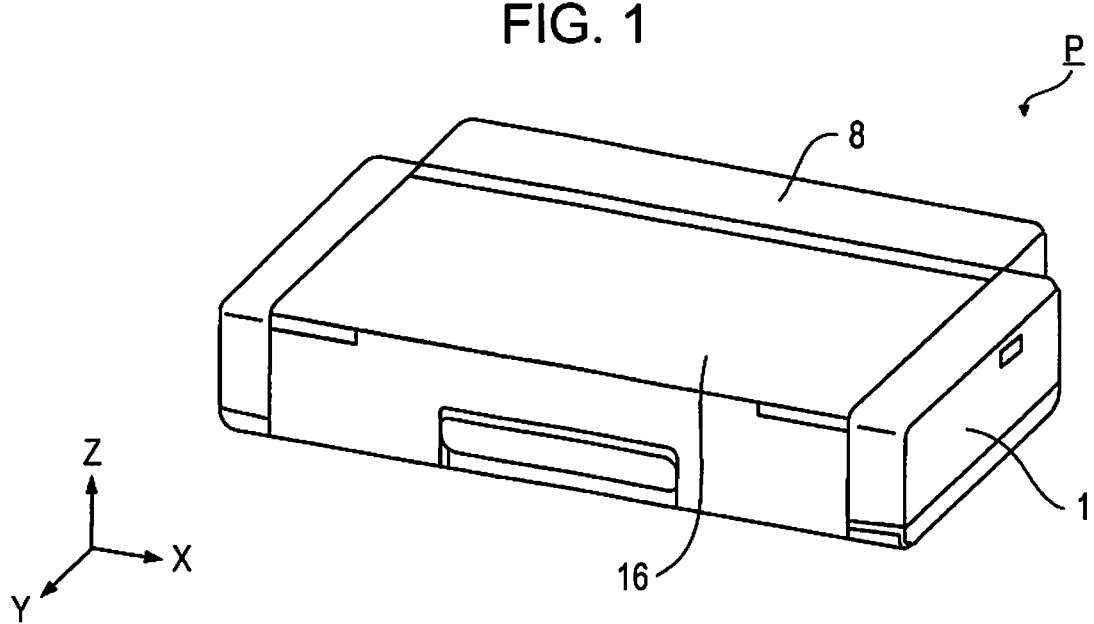
FIG. 1 is an external perspective view illustrating an example of a portable device according to a first embodiment.

FIG. 1 is an external perspective view of the portable device P as viewed from the front side. The portable device P includes the mobile printer 1 and a mobile battery unit 8 that is attachable and detachable with respect to the mobile printer 1. As illustrated in FIG. 1, a cover 16 capable of opening and closing is provided on the mobile printer 1.

Figure 2:
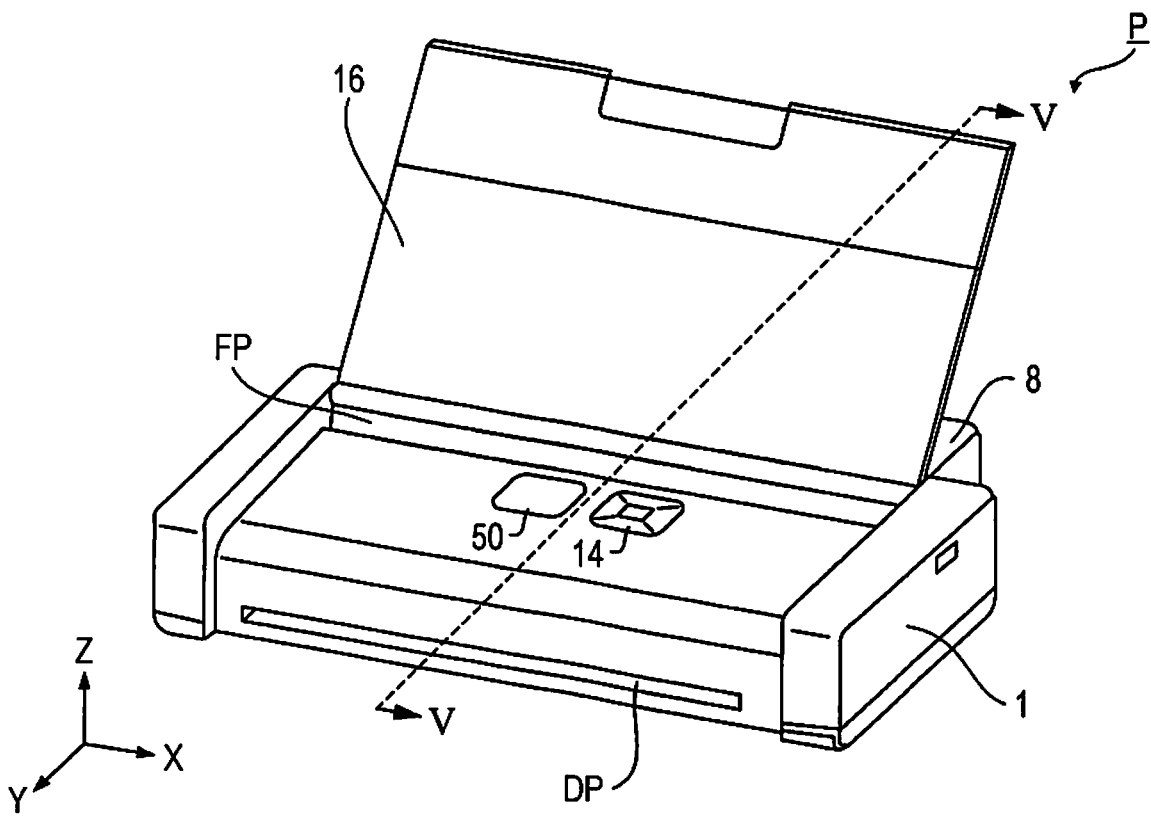
FIG. 2 is an external perspective view illustrating an example of the portable device.

FIG. 2 is an external perspective view of the portable device P when the cover 16 is open. As illustrated in FIG. 2, the mobile battery unit 8 is mounted to the rear surface of the mobile printer 1. Hereinafter, as illustrated in FIG. 2, a front surface direction of the mobile printer 1 will be referred to as "a +Y direction" and a rear surface direction of the mobile printer 1 will be referred to as "a −Y direction". The +Y direction and the −Y direction will be collectively referred to as "Y-axis directions". When the mobile printer 1 is viewed from the +1 direction, a right direction of the mobile printer 1 will be referred to as "a +X direction", a left direction will be referred to as "a −X direction", and the +X direction and the −X direction will be collectively referred to as "X-axis directions". An upward direction of the mobile printer 1 will be referred to as "a +Z direction", a downward direction will be referred to as "a −Z direction", and the +Z direction and the −Z direction will be collectively referred to as "Z-axis directions".

As illustrated in FIG. 2, the mobile printer 1 is provided with a display device 50, an operation unit 14, a paper feed port FP to feed a medium to the mobile printer 1, and a paper discharging port DP to discharge the medium. The display device 50 is capable of displaying various information relating to the mobile printer 1 and the mobile battery unit 8. The display device 50 is formed to include a display panel such as a liquid crystal panel, an electronic paper panel, or an organic electro-luminescence panel. The operation unit 14 receives operations of a user.

Figure 3:
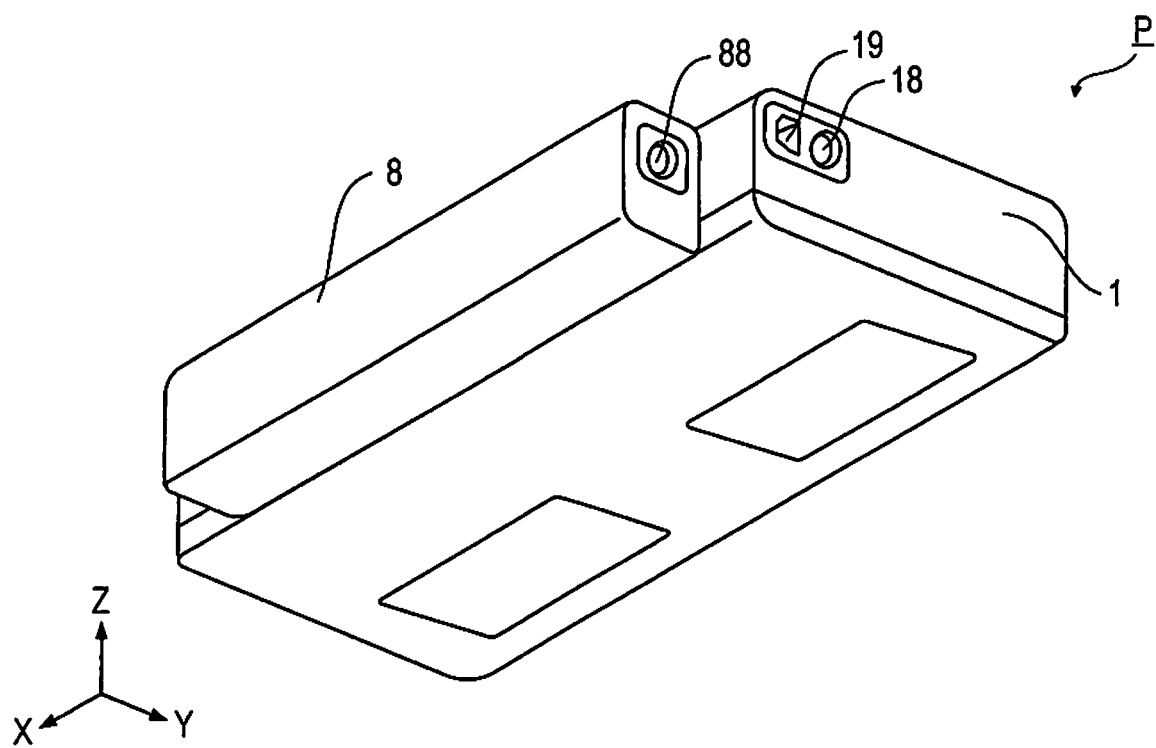
FIG. 3 is an external perspective view illustrating an example of the portable device.

FIG. 3 is an external perspective view of the portable device P as viewed from the −Y direction. As illustrated in FIG. 3, the mobile printer 1 is provided with a DC jack 18 into which it is possible to insert a DC plug of an AC adapter, and a USB port 19. Similarly, the mobile battery unit 8 is provided with a DC jack 88. Here, AC is an acronym of alternating current, DC is an acronym of direct current, and USB is an acronym of universal serial bus.

The mobile printer 1 may be electrically coupled to a host computer such as a personal computer or a digital camera via the USB port 19. The mobile printer 1 is capable of receiving a supply of print data Img indicating an image to be formed by the mobile printer 1 from the host computer.

1.2. Outline of Functions of Portable Device P

Figure 4:
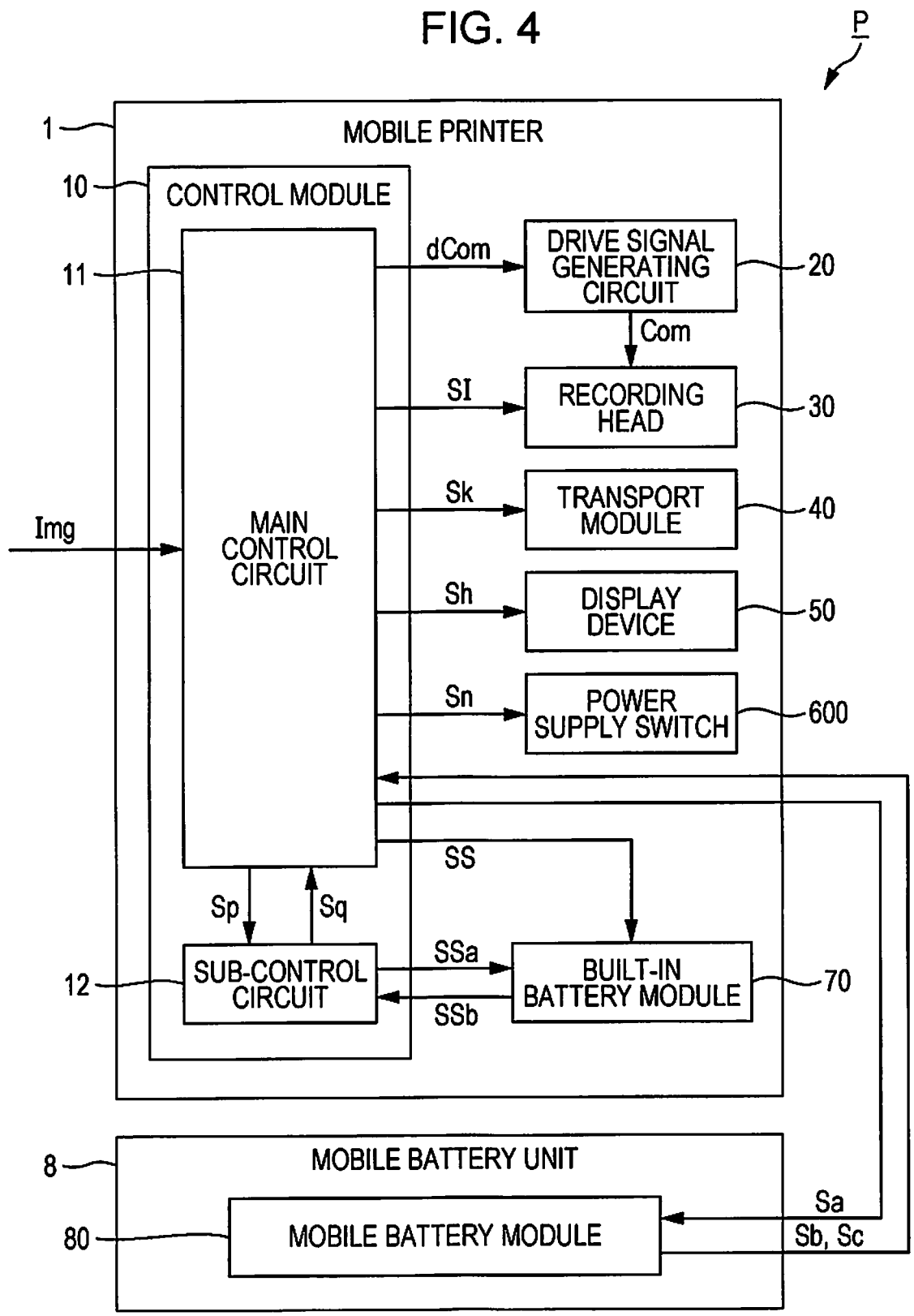
FIG. 4 is a functional block diagram illustrating an example of a functional configuration of the portable device.

FIG. 4 is a functional block diagram illustrating an example of a functional configuration of the portable device P.

As described above, the portable device P is provided with the mobile printer 1 and the mobile battery unit 8.

As exemplified in FIG. 4, the mobile printer 1 is provided with a control module 10, a recording head 30, a drive signal generating circuit 20, a transport module 40, the display device 50 described above, a built-in battery module 70, and a power supply switch 600. The control module 10 controls the parts of the mobile printer 1, the recording head 30 is provided with a plurality of discharge units capable of discharging the ink, the drive signal generating circuit 20 generates a drive signal Com for driving the recording head 30 such that the ink is discharged from the discharging units provided in the recording head 30, the transport module 40 is for changing the relative positions of the medium and the recording head 30, the built-in battery module 70 is capable of supplying power to the parts of the mobile printer 1, and the power supply switch 600 switches between whether or not to the mobile printer 1 receives the supply of power from the mobile battery unit 8. The recording head 30 is an example of "a drive element".

The mobile battery unit 8 is provided with a mobile battery module 80 capable of supplying power to the parts of the mobile printer 1 when the mobile battery unit 8 is mounted to the mobile printer 1.

In the present embodiment, for example, a case is anticipated in which the control module 10 includes a main control circuit 11 and a sub-control circuit 12.

The main control circuit 11 is configured to include a CPU, for example. Here, CPU is an acronym of central processing unit. Incidentally, the main control circuit 11 may be provided with a DSP, an ASIC, a PLD, an FPGA, or the like instead of the CPU or in addition to the CPU. Here, DSP is an acronym of digital signal processor. ASIC is an acronym of application specific integrated circuit. PLD is an acronym of programmable logic device. FPGA is an acronym of field programmable gate array. The main control circuit 11 is an example of "a first processor". Hereinafter, there is a case in which "the first processor" is referred to simply as "a processor".

The sub-control circuit 12 is configured to include a CPU, for example. The sub-control circuit 12 may be provided with a DSP, an ASIC, a PLD, an FPGA, or the like instead of the CPU or in addition to the CPU. The sub-control circuit 12 is an example of "a second processor".

The main control circuit 11 supplies a waveform definition signal dCom defining the waveform of the drive signal Com, which is generated in the drive signal generating circuit 20, to the drive signal generating circuit 20. Here, the drive signal Com is a signal for driving the discharging units provided in the recording head 30. The main control circuit 11 supplies a print signal SI which specifies, of the plurality of discharging units provided in the recording head 30, the discharging units to be driven by the drive signal Com to the recording head 30. The main control circuit 11 supplies a transport control signal SK for controlling the transport module 40 to the transport module 40. The main control circuit 11 supplies a display control signal Sh for controlling the display device 50 to the display device 50.

The main control circuit 11 supplies a specification signal Sn, which specifies whether or not to turn the power supply switch 600 on, to the power supply switch 600. The mobile printer 1 is capable of receiving the supply of power from the mobile battery unit 8 mounted to the mobile printer 1 when the power supply switch 600 is turned on. The main control circuit 11 supplies a control signal SS for controlling the built-in battery module 70 to the built-in battery module 70. The main control circuit 11 supplies a control signal Sa for controlling the mobile battery module 80 to the mobile battery module 80. The main control circuit 11 acquires a state signal Sb indicating the state of the mobile battery unit 8 and a mounting signal Sc indicating that the mobile battery unit 8 is mounted to the mobile printer 1 from the mobile battery module 80.

The sub-control circuit 12 supplies a control signal SSa for controlling the built-in battery module 70 to the built-in battery module 70. The sub-control circuit 12 acquires a state signal SSb indicating the state of the built-in battery module 70 from the built-in battery module 70.

The main control circuit 11 supplies an instruction signal Sp instructing the output of the control signal SSa to the sub-control circuit 12. A notification signal Sq for performing notification of the information included in the sub-control circuit 12 is supplied to the main control circuit 11 from the sub-control circuit 12.

1.3. Configuration of Portable Device P

Figure 5:
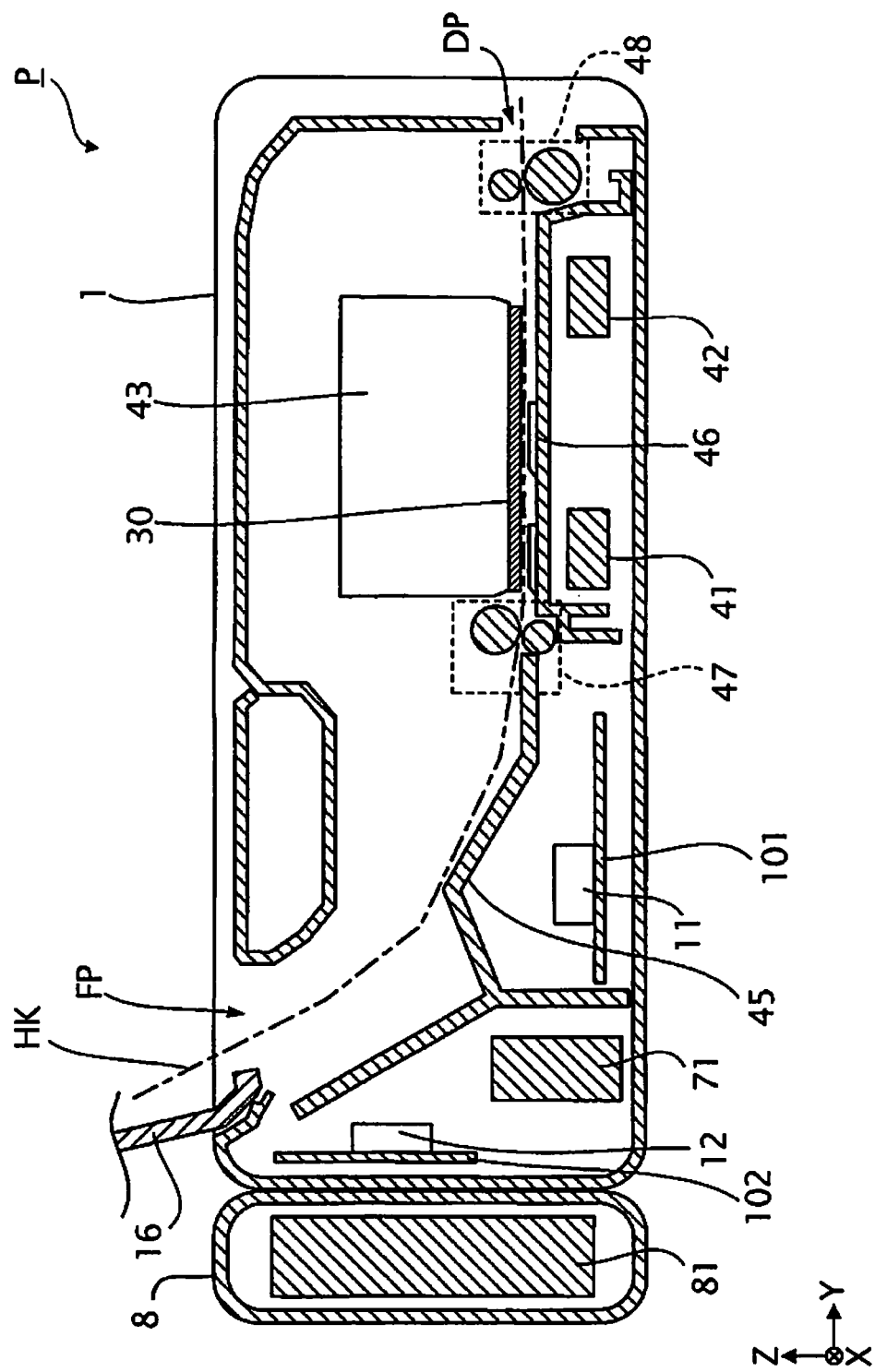
FIG. 5 is a sectional diagram illustrating a schematic example of a cross-sectional structure of the portable device.

FIG. 5 is a sectional diagram illustrating a schematic example of a cross-sectional structure of the portable device P when the portable device P is cut on a V-V line in FIG. 2. In the present embodiment, for example, a case is anticipated in which the mobile printer 1 provided in the portable device P is a serial printer.

As illustrated in FIG. 5, the mobile printer 1 is provided with a carriage 43 to which the recording head 30 is attached and a platen 46 provided on the -Z side of the carriage 43 and supports the medium. The transport module 40 is provided with a drive motor 41 for causing the carriage 43 to move reciprocally in the X-axis directions.

The mobile printer 1 is provided with a medium support portion 45, a transport roller pair 47, and a transport roller pair 48. The medium support portion 45 supports the medium that is inserted from the paper feed port FP, the transport roller pair 47 is for transporting the medium that is inserted from the paper feed port FP in the +Y direction onto the platen 46, and the transport roller pair 48 is for transporting the medium on the platen 46 in the +Y direction to the paper discharging port DP. The transport module 40 is provided with a drive motor 42 for driving the transport roller pair 47 and the transport roller pair 48.

In the present embodiment, when executing the printing process, the mobile printer 1 transports the medium along a transport path HK of the medium from the -Y side, which is upstream, to the +Y side, which is downstream, under the control of the main control circuit 11. The transport path HK is defined by the medium support portion 45 and the platen 46. When executing the printing process, the mobile printer 1 uses the drive motor 41 to cause the carriage 43 to move reciprocally in the X-axis directions which are the main scanning directions under the control of the main control circuit 11. Furthermore, when executing the printing process, the mobile printer 1 causes the ink to be discharged onto the medium that is transported over the platen 46 from the recording head 30 attached to the carriage 43 under the control of the main control circuit 11. Therefore, in the present embodiment, the mobile printer 1 is capable of forming an image corresponding to the print data Img on the entire surface of the medium in the printing process.

In the present embodiment, for example, as illustrated in FIG. 5, a case is anticipated in which the main control circuit 11 is provided on a substrate 101 disposed closer to the -Y side than the recording head 30, the sub-control circuit 12 is provided on a substrate 102 disposed closer to the -Y side than the paper feed port FP, and the built-in battery module 70 is disposed closer to the -Y side than the recording head 30.

The built-in battery module 70 is provided with a built-in battery 71. The built-in battery 71 is capable of supplying power to power supplying targets such as the control module 10, the drive signal generating circuit 20, the recording head 30, the transport module 40, and the display device 50. The built-in battery 71 is an example of "a first battery". In the present embodiment, a lithium ion battery is adopted as the built-in battery 71.

In the present embodiment, for example, a case is anticipated in which the mobile battery unit 8 may be mounted to and removed from the -Y side of the mobile printer 1. The mobile battery module 80 provided on the mobile battery unit 8 is provided with a mobile battery 81. The mobile battery 81 is capable of supplying power to the power supplying targets such as the control module 10, the drive signal generating circuit 20, the recording head 30, the transport module 40, and the display device 50 when the mobile battery unit 8 is mounted to the mobile printer 1 and the power supply switch 600 is turned on. The mobile battery 81 is an example of "a second battery". In the present embodiment, a lithium ion battery is adopted as the mobile battery 81. In the present embodiment, a case is anticipated in which an electric storage capacity of the mobile battery 81 is greater than an electric storage capacity of the built-in battery 71.

In the present embodiment, the expression "to supply power to the power supplying target" means to apply a power source voltage which is a potential difference between a high potential side power source potential and a low potential side reference potential to the power supplying target by setting the high potential side power source potential and the low potential side reference potential such as a ground potential with respect to the power supplying target. Hereinafter, "applying a power source voltage to the power supplying target" may simply be expressed as "supplying the power source voltage to the power supplying target".

In order to simplify the explanation, a voltage drop when a current is conducted by a diode will be ignored, a symbol of the voltage supplied to the anode will be set to the same symbol as that of the voltage supplied from the cathode.

1.4. Circuit Configuration of Portable Device P

Figure 6:
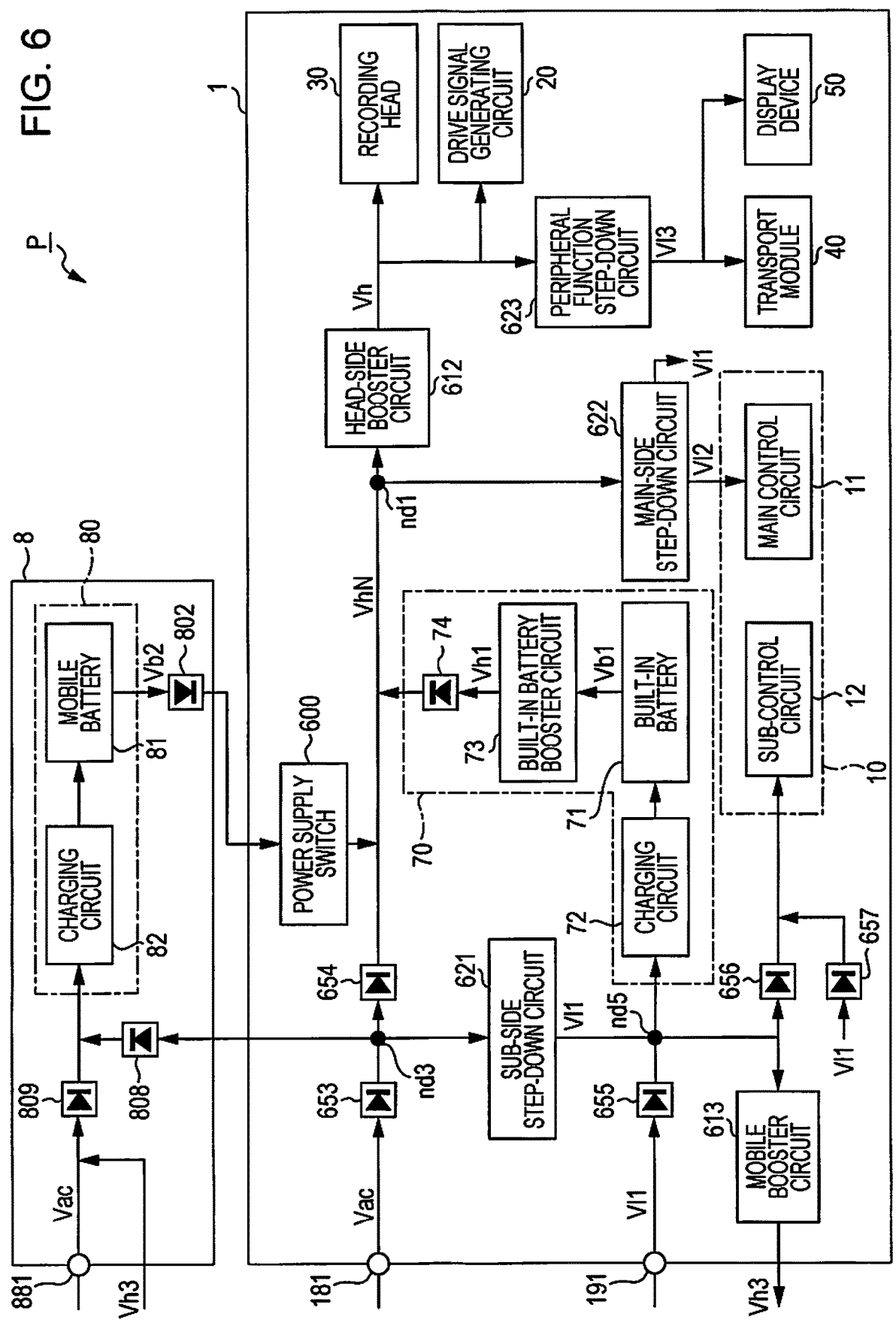
FIG. 6 is an explanatory diagram illustrating an example of a circuit configuration of the portable device.

FIG. 6 is an example of the circuit configuration of the portable device P. In FIG. 6, to facilitate explanation, of the wiring provided in the portable device P, notation of the signal lines will be omitted and only the power lines will be denoted. Hereinafter, a power line or a plurality of electrically coupled power lines may be referred to as "a node".

As described above, the mobile printer 1 is provided with the control module 10, the drive signal generating circuit 20, the recording head 30, the transport module 40, the display device 50, the built-in battery module 70, and the power supply switch 600, as described above. The mobile printer 1 is provided with a head-side booster circuit 612, a mobile booster circuit 613, a sub-side step-down circuit 621, a main-side step-down circuit 622, and a peripheral function step-down circuit 623. The mobile printer 1 is provided with a device-side diode 653, a device-side diode 654, a device-side diode 655, a device-side diode 656, and a device-side diode 657.

The mobile battery unit 8 is provided with the mobile battery module 80 as described above. The mobile battery unit 8 is provided with a mobile-side diode 802, a mobile-side diode 808, and a mobile-side diode 809.

1.4.1. Configuration of Built-in Battery Module 70

In addition to the built-in battery 71 described above, the built-in battery module 70 is provided with a charging circuit 72, a built-in battery booster circuit 73, and a built-in battery diode 74.

The charging circuit 72 charges the built-in battery 71 based on the control signal SSa supplied from the sub-control circuit 12. Here, the control signal SSa is a signal specifying to the charging circuit 72 whether or not to charge the built-in battery 71. The sub-control circuit 12 supplies the control signal SSa to the charging circuit 72 based on the instruction signal Sp supplied from the main control circuit 11. Here, the instruction signal Sp is a signal instructing the charging circuit 72 whether or not to charge the built-in battery 71.

The built-in battery 71 supplies a voltage Vb1 to the built-in battery booster circuit 73. The voltage Vb1 is 4.2 V, for example, when the built-in battery 71 is in a fully charged state. The built-in battery 71 supplies the state signal SSb indicating the state of the built-in battery 71 to the sub-control circuit 12. Here, the state signal SSb is a signal indicating the temperature, the voltage, and the like of the built-in battery 71, for example. The sub-control circuit 12 supplies, to the main control circuit 11, the notification signal Sq indicating information corresponding to the state signal SSb supplied from the built-in battery 71.

Based on the control signal SS supplied from the main control circuit 11, the built-in battery booster circuit 73 is capable of switching between whether or not to boost the voltage Vb1 output by the built-in battery 71. Here, the control signal SS is a signal specifying to the built-in battery booster circuit 73 whether or not to boost the voltage Vb1 output by the built-in battery 71 to a voltage Vh1 which is a higher voltage than the voltage Vb1. The voltage Vh1 is 13.2 V at maximum, for example. Specifically, the built-in battery booster circuit 73 boosts the voltage Vb1 output by the built-in battery 71 to the voltage Vh1 when the control signal SS specifies to the built-in battery booster circuit 73 that boosting is to be performed. The built-in battery booster circuit 73 does not boost the voltage Vb1 output by the built-in battery 71 and outputs the voltage Vb1 output by the built-in battery 71 unchanged to the anode of the built-in battery diode 74 when the control signal SS specifies to the built-in battery booster circuit 73 that boosting is not to be performed. The voltage Vh1 may be a voltage greater than or equal to a threshold voltage Vth (described later).

In the built-in battery diode 74, the anode is electrically coupled to the built-in battery booster circuit 73, the cathode is electrically coupled to a node nd1, and a current is prevented from flowing from the node nd1 to the built-in battery booster circuit 73.

The node nd1 is electrically coupled to, in addition to the cathode of the built-in battery diode 74, the cathode of the device-side diode 654, the output terminal of the power supply switch 600, the head-side booster circuit 612, and the main-side step-down circuit 622.

1.4.2. Configuration of Mobile Battery Module 80

The mobile battery module 80 is provided with the mobile battery 81 and a charging circuit 82.

The charging circuit 82 charges the mobile battery 81 based on the control signal Sa supplied from the main control circuit 11. Here, the control signal Sa is a signal specifying to the charging circuit 82 whether or not to charge the mobile battery 81.

The mobile battery 81 supplies a voltage Vb2 to the mobile-side diode 802. The voltage Vb2 is a voltage greater than or equal to the threshold voltage Vth when the mobile battery 81 is in a fully charged state. Here, the threshold voltage Vth is a voltage at which it is possible to drive the power supplying targets such as the control module 10, the drive signal generating circuit 20, the recording head 30, the transport module 40, and the display device 50 through the supplying of power from the mobile battery 81 when the mobile battery 81 outputs the threshold voltage Vth. The threshold voltage Vth is 13.2 V, for example. In other words, in the present embodiment, the threshold voltage Vth is a higher voltage than the voltage Vb1.

The mobile battery 81 supplies the state signal Sb indicating the state of the mobile battery 81 to the main control circuit 11. Here, the state signal Sb is a signal indicating the temperature, the voltage, and the like of the mobile battery 81, for example. When the mobile battery unit 8 is mounted to the mobile printer 1, the mobile battery 81 supplies, to the main control circuit 11, the mounting signal Sc indicating that the mobile battery unit 8 is mounted to the mobile printer 1.

1.4.3. Supplying of Power in Portable Device P

In the device-side diode 653, the anode is electrically coupled to a power supply terminal 181 inside the DC jack 18 and the cathode is electrically coupled to a node nd3. The device-side diode 653 prevents the current from flowing from the node nd3 to the power supply terminal 181. A voltage Vac is supplied to the anode of the device-side diode 653 via the power supply terminal 181 when the DC plug of the AC adapter is inserted into the DC jack 18. The voltage Vac is 24 V, for example. The device-side diode 653 supplies the voltage Vac to the node nd3 when the voltage Vac is supplied to the anode. The power supply terminal 181 is an example of "a first terminal".

In addition to the cathode of the device-side diode 653, the node nd3 is electrically coupled to the anode of the device-side diode 654, the anode of the mobile-side diode 808, and the sub-side step-down circuit 621.

In the device-side diode 654, the anode is electrically coupled to the node nd3 and the cathode is electrically coupled to the node nd1. The device-side diode 654 prevents a current from flowing from the node nd1 to the node nd3. The device-side diode 654 supplies the voltage Vac to the node nd1 when the voltage Vac is supplied to the anode. Hereinafter, there is a case in which the voltage of the node nd1 is referred to as a voltage VhN.

The sub-side step-down circuit 621 steps down the voltage Vac supplied thereto via the node nd3 to a voltage V11 and supplies the voltage V11 to a node nd5. The voltage V11 is 5 V, for example. The sub-side step-down circuit 621 is an example of "a first voltage changing unit".

In addition to the sub-side step-down circuit 621, the node nd5 is electrically coupled to the cathode of the device-side diode 655, the anode of the device-side diode 656, the charging circuit 72, and the mobile booster circuit 613. In other words, the voltage V11 is supplied to the charging circuit 72 from the node nd5.

In the device-side diode 655, the anode is electrically coupled to a power supply terminal 191 inside the USB port 19 and the cathode is electrically coupled to the node nd5. The device-side diode 655 prevents the current from flowing from the node nd5 to the power supply terminal 191. The voltage V11 is supplied via the power supply terminal 191 to the anode of the device-side diode 655 when the USB port 19 is electrically coupled to the host computer. The device-side diode 655 supplies the voltage V11 to the node nd5 when the voltage V11 is supplied to the anode. The power supply terminal 191 is an example of "a second terminal".

In the device-side diode 656, the anode is electrically coupled to the node nd5 and the cathode is electrically coupled to the sub-control circuit 12. The device-side diode 656 prevents a current from flowing from the sub-control circuit 12 to the node nd5. The device-side diode 656 supplies the voltage V11 to the sub-control circuit 12 when the voltage V11 is supplied to the anode.

The mobile booster circuit 613 boosts the voltage V11 supplied thereto via the node nd5 to a voltage Vh3. The mobile booster circuit 613 supplies the voltage Vh3 to the anode of the mobile-side diode 809 when the mobile battery unit 8 is mounted to the mobile printer 1. The voltage Vh3 is 24 V, for example. The mobile booster circuit 613 is an example of "a second voltage changing unit".

In the mobile-side diode 809, the anode is electrically coupled to a power supply terminal 881 inside the DC jack 88 and the cathode is electrically coupled to the charging circuit 82. The mobile-side diode 809 prevents the current from flowing from the charging circuit 82 to the power supply terminal 881. The voltage Vac is supplied to the anode of the mobile-side diode 809 via the power supply terminal 881 when the DC plug of the AC adapter is inserted into the DC jack 88. The mobile-side diode 809 supplies the voltage Vac to the charging circuit 82 when the voltage Vac is supplied to the anode.

The mobile-side diode 809 is electrically coupled to the mobile booster circuit 613 when the mobile battery unit 8 is mounted to the mobile printer 1. The mobile-side diode 809 prevents the current from flowing from the charging circuit 82 to the mobile booster circuit 613. The mobile-side diode 809 supplies the voltage Vh3 to the charging circuit 82 when the voltage Vh3 is supplied from the mobile booster circuit 613.

In the mobile-side diode 808, the anode is electrically coupled to the node nd3 and the cathode is electrically coupled to the charging circuit 82 when the mobile battery unit 8 is mounted to the mobile printer 1. The mobile-side diode 808 prevents the current from flowing from the charging circuit 82 to the node nd3. The mobile-side diode 808 supplies the voltage Vac to the charging circuit 82 when the voltage Vac is supplied to the anode via the node nd3.

In the mobile-side diode 802, when the anode is electrically coupled to the mobile battery 81 and the mobile battery unit 8 is mounted to the mobile printer 1, the cathode is electrically coupled to the input terminal of the power supply switch 600. The mobile-side diode 802 prevents the current from flowing from the power supply switch 600 to the mobile battery 81. The mobile-side diode 802 supplies the voltage Vb2 to the power supply switch 600 when the voltage Vb2 is supplied from the mobile battery 81 to the anode.

The power supply switch 600 switches between whether or not to electrically couple the cathode of the mobile-side diode 802 and the node nd1 to each other based on the specification signal Sn supplied from the main control circuit 11. When the power supply switch 600 is turned on, the voltage Vb2 is supplied from the mobile-side diode 802 to the node nd1 via the power supply switch 600.

The head-side booster circuit 612 boosts the voltage VhN supplied thereto via the node nd1 to the voltage Vh and supplies the voltage Vh to the drive signal generating circuit 20, the recording head 30, and the peripheral function step-down circuit 623. The voltage Vh is 42 V, for example.

The peripheral function step-down circuit 623 steps down the voltage Vh supplied thereto from the head-side booster circuit 612 to a voltage V13 and supplies the voltage V13 to the transport module 40 and the display device 50. The voltage V13 is 11 V, for example.

The main-side step-down circuit 622 steps down the voltage VhN supplied thereto via the node nd1 to the voltage V11 and a voltage V12, supplies the voltage V11 to the anode of the device-side diode 657, and supplies the voltage V12 to the main control circuit 11. The voltage V12 is 3.3 V, for example.

In the device-side diode 657, the anode is electrically coupled to the main-side step-down circuit 622 and the cathode is electrically coupled to the sub-control circuit 12. The device-side diode 657 prevents a current from flowing from the sub-control circuit 12 to the main-side step-down circuit 622. The device-side diode 657 supplies the voltage V11 supplied from the main-side step-down circuit 622 to the sub-control circuit 12.

1.4.4. Charging Modes

Hereinafter, a description will be given of a specific aspect of charging the built-in battery 71 and the mobile battery 81 in the portable device P according to the present embodiment, with reference to FIGS. 7 to 11.

In the portable device P in the present embodiment, it is possible to charge the built-in battery 71 using two built-in battery charging modes, the built-in battery AC charging mode and the built-in battery USB charging mode. The built-in battery AC charging mode is a charging mode which charges the built-in battery 71 using power from an AC power source. The built-in battery USB charging mode is a charging mode which charges the built-in battery 71 using the host computer connected to the USB port 19 as a power source. The power from the AC power source is the power after being subjected to conversion using AC/DC conversion.

When the DC plug of the AC adapter is inserted into the DC jack 18, since the power from the AC power source is supplied to the power supply terminal 181, the power from the AC power source is an example of "the power supplied to the first terminal". Similarly, when the host computer is electrically coupled to the USB port 19, since the power from the host computer is supplied to the power supply terminal 191, the power from the host computer is an example of "the power supplied to the second terminal". Hereinafter, the power from the host computer will be referred to as "the power from the USB power source". In the present embodiment, the power from the AC power source is greater than the power from the USB power source. Specifically, when the voltage Vac is 24 V, as described above, and the current is 2 A, for example, the power from the AC power source is 24×2=48 W. Meanwhile, when the voltage V11 from the USB power source is 5 V, as described above, and the current is 0.5 A according to the USB 2.0 standard, the power from the USB power source is 5×0.5=2.5 W. Therefore, the 48 W of power from the AC power source is greater than the 2.5 W of power from the USB power source.

Similarly, in the portable device P in the present embodiment, it is possible to charge the mobile battery 81 using two mobile battery charging modes, the mobile battery AC charging mode and the mobile battery USB charging mode.

The mobile battery AC charging mode is a charging mode which charges the mobile battery 81 using power from an AC power source. The mobile battery USB charging mode is a charging mode which charges the mobile battery 81 using power from a USB power source.

When the built-in battery 71 and the mobile battery 81 are charged using the power from the AC power source, for the order of charging, the portable device P in the present embodiment starts the charging of the mobile battery 81 and subsequently starts the charging of the built-in battery 71. Specifically, the portable device P starts the charging of the mobile battery 81 and then starts the charging of the built-in battery 71 after completing the charging to a capacity less than or equal to the capacity of the fully charged state of the mobile battery 81. The capacity less than or equal to the capacity of the fully charged state of the mobile battery 81 may be any capacity as long as the capacity is greater than that of a completely discharged state of the mobile battery 81 and is less than or equal to the capacity of the fully charged state of the mobile battery 81. In the present embodiment, the portable device P starts the charging of the built-in battery 71 after completing charging to the capacity of the fully charged state of the mobile battery 81.

It is possible to determine whether or not the mobile battery 81 is in the fully charged state based on the voltage of the mobile battery 81. In a general secondary cell including the built-in battery 71 and the mobile battery 81, the voltage is low in the completely discharged state and the voltage increases as the charging current flows into the secondary cell. When the secondary cell is charged in excess of the voltage of the fully charged state, since the secondary cell becomes overcharged and degrades, a circuit protecting the secondary cell stops the charging once the voltage of the secondary cell reaches the voltage of the fully charged state. Therefore, as long as the voltage of the mobile battery 81 is the voltage of the fully charged state, it is possible to determine that the mobile battery 81 is in the fully charged state, and as long as the voltage of the mobile battery 81 is less than the voltage of the fully charged state, it is possible to determine that the mobile battery 81 is yet to reach the fully charged state.

When the built-in battery 71 and the mobile battery 81 are charged using the power from the USB power source, for the order of charging, the portable device P starts the charging of the built-in battery 71 and subsequently starts the charging of the mobile battery 81. Specifically, the portable device P starts the charging of the built-in battery 71 and then starts the charging of the mobile battery 81 after the completing charging to a capacity less than or equal to the capacity of the fully charged state of the built-in battery 71. The capacity less than or equal to the capacity of the fully charged state of the built-in battery 71 may be any capacity as long as the capacity is greater than that of a completely discharged state of the built-in battery 71 and is less than or equal to the capacity of the fully charged state of the built-in battery 71. In the present embodiment, the portable device P starts the charging of the mobile battery 81 after completing charging to the capacity of the fully charged state of the built-in battery 71.

Figure 7:
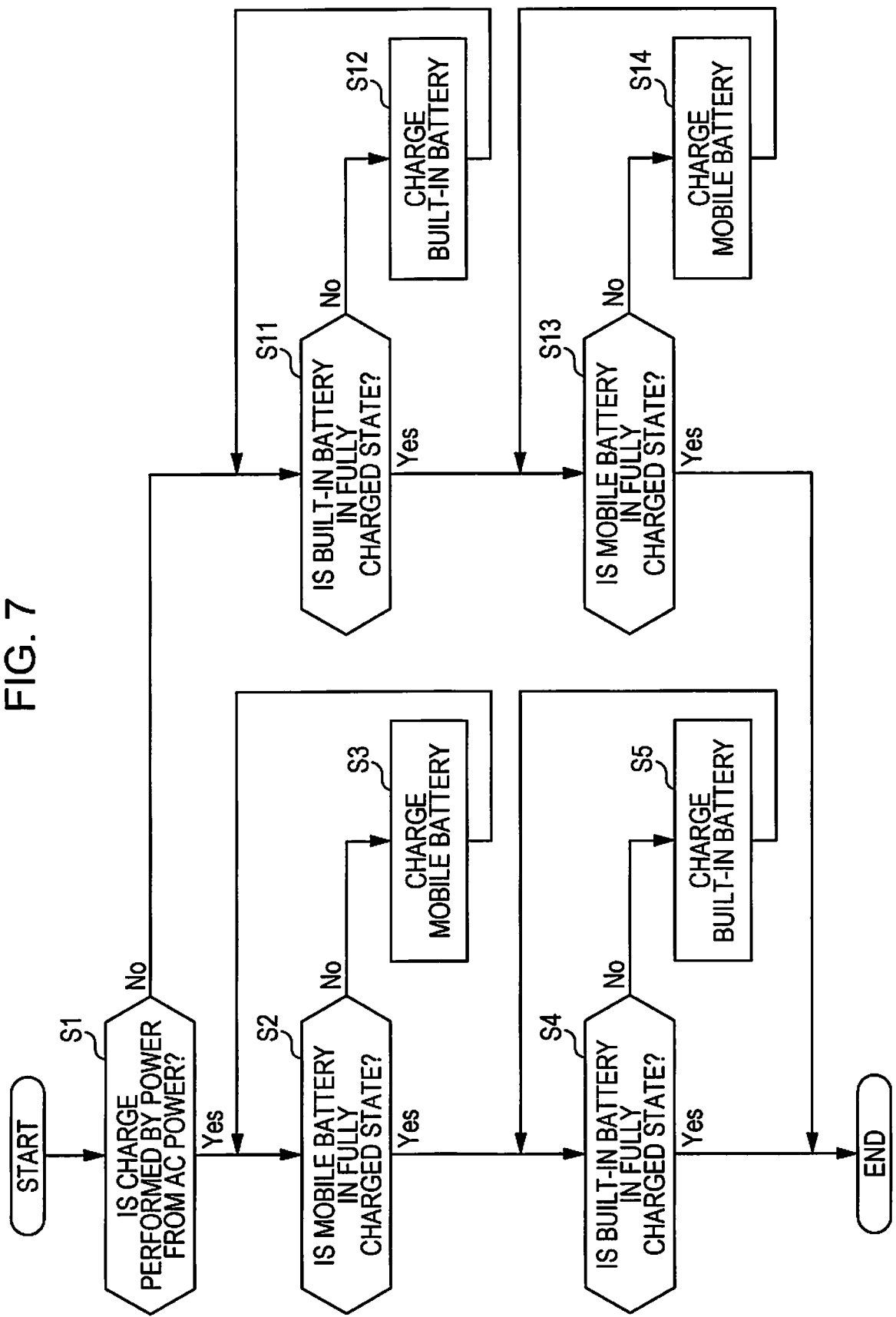
FIG. 7 is a flowchart illustrating an example of a process relating to charging of the portable device.

FIG. 7 is a flowchart illustrating the order of the charging. The flowchart illustrated in FIG. 7 has the premise of a case in which the DC plug of the AC adapter is inserted into the DC jack 18 and the charging is performed using the power from the AC power source or a case in which the host computer is electrically coupled to the USB port 19 and the charging is performed using the power from the USB power source.

In step S1, the control module 10 determines whether or not to perform the charging using the power from the AC power source. When the result of the determination in step S1 is positive, the control module 10 determines whether or not the mobile battery 81 is in the fully charged state in step S2. Specifically, the main control circuit 11 acquires the state signal Sb from the mobile battery 81 and determines whether or not the mobile battery 81 is in the fully charged state based on the voltage contained in the state signal Sb. When the result of the determination in step S2 is negative, that is, when the mobile battery 81 is yet to reach the fully charged state, the control module 10 charges the mobile battery 81 using the mobile battery AC charging mode in step S3.

Figure 8:
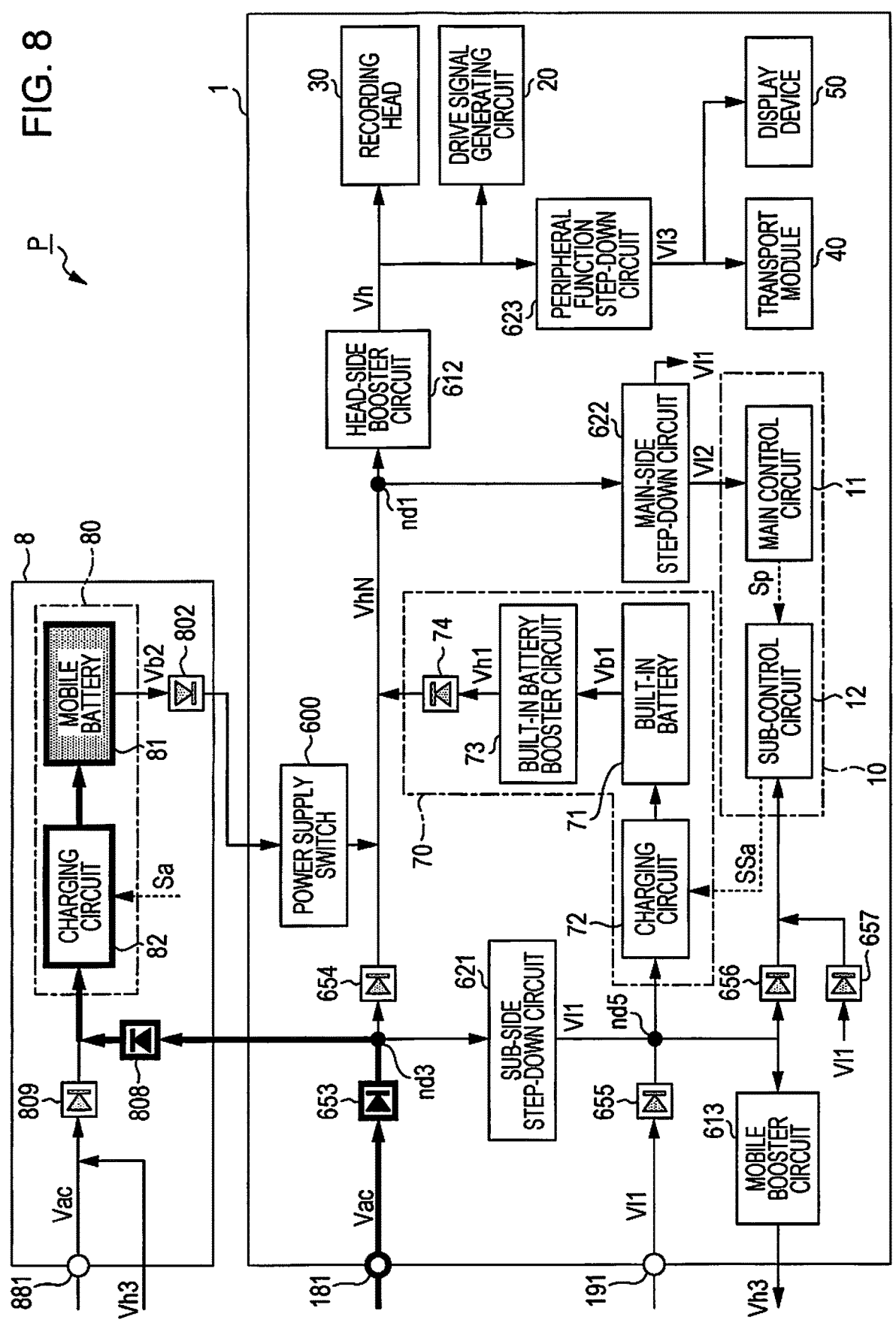
FIG. 8 is an explanatory diagram illustrating an example of the charging by a mobile battery AC charging mode.

FIG. 8 is a diagram illustrating the charging by the mobile battery AC charging mode. When the mobile battery charging mode is set to the mobile battery AC charging mode, the main control circuit 11 supplies the control signal Sa instructing the charging circuit 82 to charge the mobile battery 81. The charging circuit 82 charges the mobile battery 81 based on the control signal Sa supplied to the charging circuit 82. The main control circuit 11 supplies the instruction signal Sp instructing the output of the control signal SSa to the sub-control circuit 12, where the control signal SSa instructs the charging circuit 72 not to charge the built-in battery 71. The sub-control circuit 12 supplies the control signal SSa instructing the charging circuit 72 not to charge the built-in battery 71 to the charging circuit 72 based on the instruction signal Sp supplied to the sub-control circuit 12. In this case, the charging circuit 72 does not charge the built-in battery 71.

As illustrated in FIG. 8, in the mobile battery AC charging mode, the power from the AC power source is supplied to the mobile battery 81 via the power supply terminal 181, the device-side diode 653, the node nd3, the mobile-side diode 808, and the charging circuit 82. Since the charging circuit 72 does not charge the built-in battery 71 in the mobile battery AC charging mode, the power from the AC power source is not supplied to the built-in battery 71.

The description will return to FIG. 7. The control module 10 executes the process of step S3 for a fixed time and returns to the process of step S2. When the result of the determination in step S2 is positive, that is, when the mobile battery 81 is in the fully charged state, the control module 10 determines whether or not the built-in battery 71 is in the fully charged state in step S4. When the result of the determination in step S4 is negative, that is, when the built-in battery 71 is yet to reach the fully charged state, the control module 10 charges the built-in battery 71 using the built-in battery AC charging mode in step S5.

Figure 9:
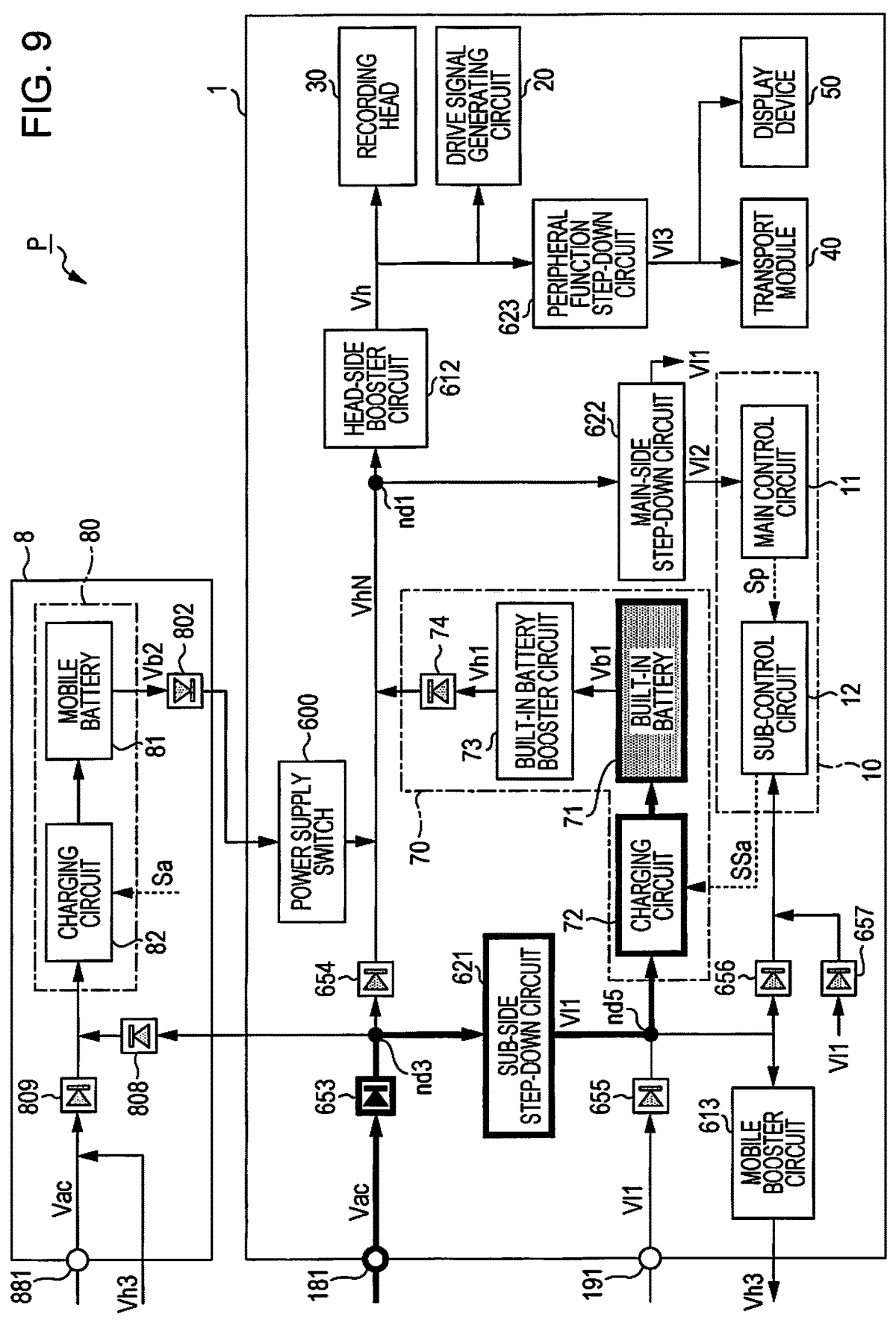

FIG. 9 is a diagram illustrating the charging by the built-in battery AC charging mode.

When the built-in battery charging mode is set to the built-in battery AC charging mode, the main control circuit 11 supplies the control signal Sa instructing the charging circuit 82 not to charge the mobile battery 81. In this case, the charging circuit 82 does not charge the mobile battery 81. The main control circuit 11 supplies the instruction signal Sp instructing the output of the control signal SSa to the sub-control circuit 12, where the control signal SSa instructs the charging circuit 72 to charge the built-in battery 71. The sub-control circuit 12 supplies the control signal SSa instructing the charging circuit 72 to charge the built-in battery 71 to the charging circuit 72 based on the instruction signal Sp supplied to the sub-control circuit 12. The charging circuit 72 charges the built-in battery 71 based on the control signal Sa supplied to the charging circuit 72.

As illustrated in FIG. 9, in the built-in battery AC charging mode, the power from the AC power source is supplied to the built-in battery 71 via the power supply terminal 181, the device-side diode 653, the node nd3, the sub-side step-down circuit 621, the node nd5, and the charging circuit 72. Since the charging circuit 82 does not charge the mobile battery 81 in the built-in battery AC charging mode, the power from the AC power source is not supplied to the mobile battery 81.

The description will return to FIG. 7. The control module 10 executes the process of step S5 for a fixed time and returns to the process of step S4. When the result of the determination in step S4 is positive, that is, when the built-in battery 71 is in the fully charged state, the control module 10 ends the processes illustrated in FIG. 7.

When the result of the determination in step S1 is negative, that is, when the charging is performed using the power from the USB power source, the control module 10 determines whether or not the built-in battery 71 is in the fully charged state in step S11. When the result of the determination in step S11 is negative, that is, when the built-in battery 71 is yet to reach the fully charged state, the control module 10 charges the built-in battery 71 using the built-in battery USB charging mode in step S12.

Figure 10:
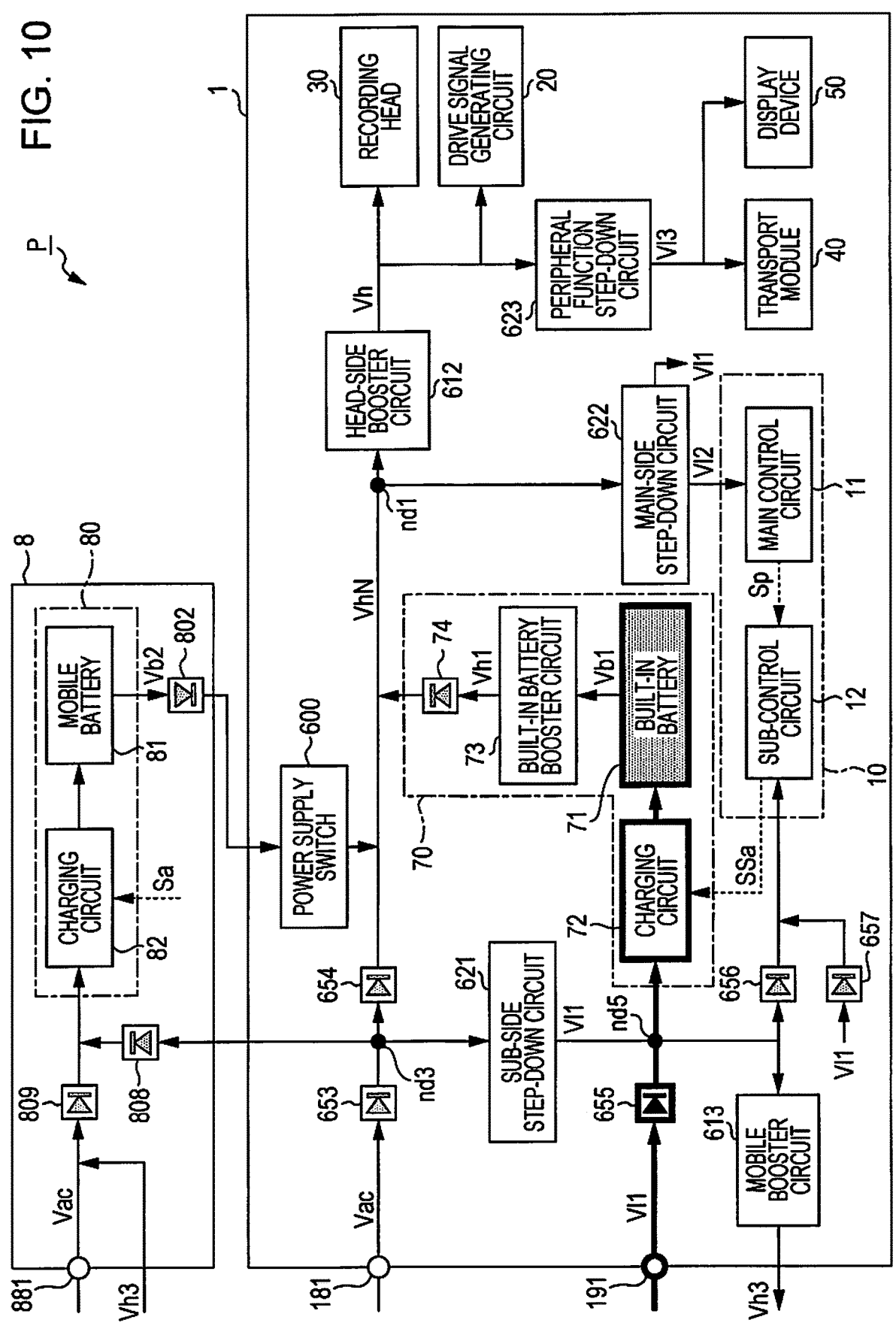
FIG. 10 is an explanatory diagram illustrating an example of the charging by a built-in battery USB charging mode.

FIG. 10 is a diagram illustrating the charging by the built-in battery USB charging mode. When the built-in battery charging mode is set to the built-in battery USB charging mode, the main control circuit 11 supplies the control signal Sa instructing the charging circuit 82 not to charge the mobile battery 81. In this case, the charging circuit 82 does not charge the mobile battery 81. The main control circuit 11 supplies the instruction signal Sp instructing the output of the control signal SSa to the sub-control circuit 12, where the control signal SSa instructs the charging circuit 72 to charge the built-in battery 71. The sub-control circuit 12 supplies the control signal SSa instructing the charging circuit 72 to charge the built-in battery 71 to the charging circuit 72 based on the instruction signal Sp supplied to the sub-control circuit 12. The charging circuit 72 charges the built-in battery 71 based on the control signal Sa supplied to the charging circuit 72.

As illustrated in FIG. 10, in the built-in battery USB charging mode, the power from the USB power source is supplied to the built-in battery 71 via the power supply terminal 191, the device-side diode 655, the node nd5, and the charging circuit 72. Since the charging circuit 82 does not charge the mobile battery 81 in the built-in battery USB charging mode, the power from the USB power source is not supplied to the mobile battery 81.

The description will return to FIG. 7. The control module 10 executes the process of step S12 for a fixed time and returns to the process of step S11. When the result of the determination in step S11 is positive, that is, when the built-in battery 71 is in the fully charged state, the control module 10 determines whether or not the mobile battery 81 is in the fully charged state in step S13. When the result of the determination in step S13 is negative, that is, when the mobile battery 81 is yet to reach the fully charged state, the control module 10 charges the mobile battery 81 using the mobile battery USB charging mode in step S14.

Figure 11:
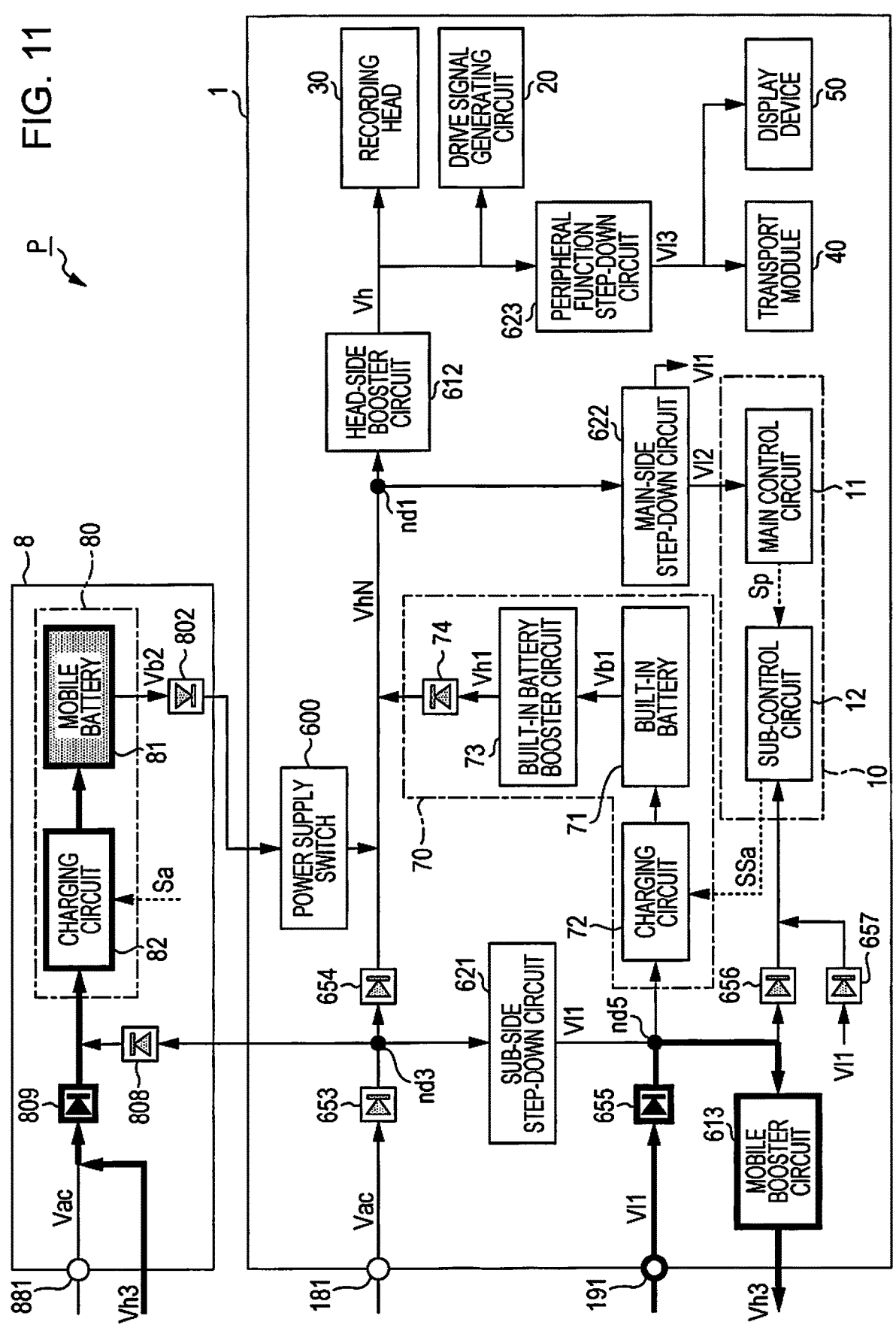
FIG. 11 is an explanatory diagram illustrating an example of the charging by a mobile battery USB charging mode.

FIG. 11 is a diagram illustrating the charging by the mobile battery USB charging mode.

When the mobile battery charging mode is set to the mobile battery USB charging mode, the main control circuit 11 supplies the control signal Sa instructing the charging circuit 82 to charge the mobile battery 81. The charging circuit 82 charges the mobile battery 81 based on the control signal Sa supplied to the charging circuit 82. The main control circuit 11 supplies the instruction signal Sp instructing the output of the control signal SSa to the sub-control circuit 12, where the control signal SSa instructs the charging circuit 72 not to charge the built-in battery 71. The sub-control circuit 12 supplies the control signal SSa instructing the charging circuit 72 not to charge the built-in battery 71 to the charging circuit 72 based on the instruction signal Sp supplied to the sub-control circuit 12. In this case, the charging circuit 72 does not charge the built-in battery 71.

As illustrated in FIG. 11, in the mobile battery USB charging mode, the power from the USB power source is supplied to the mobile battery 81 via the power supply terminal 191, the device-side diode 655, the node nd5, the mobile booster circuit 613, the mobile-side diode 809, and the charging circuit 82. Since the charging circuit 72 does not charge the built-in battery 71 in the mobile battery USB charging mode, the power from the USB power source is not supplied to the built-in battery 71.

The description will return to FIG. 7. The control module 10 executes the process of step S14 for a fixed time and returns to the process of step S13. When the result of the determination in step S13 is positive, that is, when the mobile battery 81 is in the fully charged state, the control module 10 ends the processes illustrated in FIG. 7.

1.5. Effects of First Embodiment

As described above, the mobile printer 1 according to the present embodiment is provided with the recording head 30, the built-in battery 71, the power supply terminal 181, and the power supply terminal 191. The built-in battery 71 supplies the power to the recording head 30, the power supply terminal 181 receives a supply of power that charges the mobile battery 81 supplying the power to the built-in battery 71 and the recording head 30, and the power supply terminal 191 receives a supply of power that charges the built-in battery 71 and the mobile battery 81. The electric storage capacity of the mobile battery 81 is greater than the electric storage capacity of the built-in battery 71. The power from the AC power source supplied to the power supply terminal 181 is greater than the power from the USB power source supplied to the power supply terminal 191. In the mobile printer 1, the charging of the mobile battery 81 is prioritized over the charging of the built-in battery 71 when the built-in battery 71 and the mobile battery 81 are charged using the power from the AC power source.

In general, in a state in which the secondary cell is close to the completely discharged state, in other words, in a state in which the capacity of the secondary cell is low, the stable supplying of the power from the secondary cell is not realized. More specifically, although it is possible to determine that the secondary cell is close to the completely discharged state using the voltage of the secondary cell, as described above, the obtained voltage includes an error. The greater the electric storage capacity of the secondary cell, the greater the necessary charging power for assuming a state in which it is possible to stably supply the power becomes.

In the present embodiment, the mobile battery 81 having a greater electric storage capacity than the built-in battery 71 is mounted to the mobile printer 1 in order to increase the portability of the mobile printer 1. However, when the mobile battery 81 is mounted to the mobile printer 1, in a state in which the mobile battery 81 is close to the completely discharged state, the stable supplying of the power from the mobile battery 81 may not be realized and the portability of the mobile printer 1 may not be increased.

Therefore, in the present embodiment, when the charging is performed using the power from the AC power source, the charging of the mobile battery 81 is prioritized over the charging of the built-in battery 71. Since the power from the AC power source is greater than the power from the USB power source, the power from the AC power source is capable of charging the mobile battery 81 in a shorter time as compared to the power from the USB power source. Accordingly, the mobile battery 81 sooner reaches a state in which the mobile battery 81 is capable of stably supplying the power and it is possible to sooner stably operate the mobile printer 1 as compared to a case in which the charging is performed using the power from the AC power source and in which the charging of the built-in battery 71 is prioritized over the charging of the mobile battery 81. In this manner, since it is possible to sooner stably operate the mobile printer 1 even in a state in which the mobile battery 81 is close to the completely discharged state, it is possible to increase the portability of the mobile printer 1.

The mobile printer 1 according to the present embodiment is provided with the recording head 30, the built-in battery 71, the power supply terminal 181, and the power supply terminal 191. The built-in battery 71 supplies the power to the recording head 30, the power supply terminal 181 receives a supply of power that charges the mobile battery 81 supplying the power to the built-in battery 71 and the recording head 30, and the power supply terminal 191 receives a supply of power that charges the built-in battery 71 and the mobile battery 81. The electric storage capacity of the mobile battery 81 is greater than the electric storage capacity of the built-in battery 71. The power from the AC power source supplied to the power supply terminal 181 is greater than the power from the USB power source supplied to the power supply terminal 191. The charging of the built-in battery 71 is prioritized over the charging of the mobile battery 81 when the built-in battery 71 and the mobile battery 81 are charged using the power from the USB power source.

Accordingly, according to the present embodiment, since the built-in battery 71 sooner reaches a state in which the built-in battery 71 is capable of stably supplying the power, it is possible to sooner stably operate the mobile printer 1 as compared to a case in which the charging is performed using the power from the USB power source and in which the charging of the mobile battery 81 is prioritized over the charging of the built-in battery 71. In this manner, since it is possible to sooner stably operate the mobile printer 1 even in a state in which the built-in battery 71 is close to the completely discharged state, it is possible to increase the portability of the mobile printer 1.

In the mobile printer 1 according to the present embodiment, when the built-in battery 71 and the mobile battery 81 are charged using the power from the AC power source supplied to the power supply terminal 181, after starting the charging of the mobile battery 81, the charging of the built-in battery 71 is started.

Accordingly, according to the present embodiment, the mobile battery 81 sooner reaches a state in which the mobile battery 81 is capable of stably supplying the power and it is possible to sooner stably operate the mobile printer 1 as compared to a case in which the charging is performed using the power from the AC power source and in which the charging of the mobile battery 81 is started after starting the charging of the built-in battery 71.

In the mobile printer 1 according to the present embodiment, when the built-in battery 71 and the mobile battery 81 are charged using the power from the USB power source supplied to the power supply terminal 191, after starting the charging of the built-in battery 71, the charging of the mobile battery 81 is started.

Accordingly, according to the present embodiment, the built-in battery 71 sooner reaches a state in which the built-in battery 71 is capable of stably supplying the power and it is possible to sooner stably operate the mobile printer 1 as compared to a case in which the charging is performed using the power from the USB power source and the charging of the built-in battery 71 is started after starting the charging of the mobile battery 81.

In the mobile printer 1 according to the present embodiment, when the built-in battery 71 and the mobile battery 81 are charged using the power from the AC power source supplied to the power supply terminal 191, the charging of the built-in battery 71 is started after the charging of the mobile battery 81 is finished to a capacity less than or equal to the capacity of the fully charged state of the mobile battery 81.

Accordingly, according to the present embodiment, the mobile battery 81 sooner reaches a state in which the mobile battery 81 is capable of stably supplying the power and it is possible to shorten a period until the mobile printer 1 is stably operated as compared to a case in which the charging is performed using the power from the AC power source and in which the charging of the mobile battery 81 is started before the charging of the mobile battery 81 is finished to a capacity less than or equal to the capacity of the fully charged state of the mobile battery 81.

In the mobile printer 1 according to the present embodiment, when the built-in battery 71 and the mobile battery 81 are charged using the power from the USB power source supplied to the power supply terminal 181, the charging of the mobile battery 81 is started after the charging of the built-in battery 71 is finished to a capacity less than or equal to the capacity of the fully charged state of the built-in battery 71.

Accordingly, according to the present embodiment, the built-in battery 71 sooner reaches a state in which the built-in battery 71 is capable of stably supplying the power and it is possible to shorten the period until the mobile printer 1 is stably operated as compared to a case in which the charging is performed using the power from the USB power source and in which the charging of the built-in battery 71 is started before the charging of the built-in battery 71 is finished to a capacity less than or equal to the capacity of the fully charged state of the built-in battery.

In the mobile printer 1 according to the present embodiment, the mobile battery 81 is capable of being attached and detached with respect to the mobile printer 1. Accordingly, it is possible to lengthen the time during which it is possible to continue the printing process without supplying the power from the AC power source as compared to a case in which the mobile battery 81 may not be mounted. Therefore, according to the present embodiment, it is possible to increase the portability of the mobile printer 1 as compared to a case in which the mobile battery 81 may not be mounted to the mobile printer 1.

1.6. Modification Examples of First Embodiment

The embodiments described above may be modified in various ways. Specific modified aspects will be exemplified hereinafter. Two or more aspects arbitrarily selected from the following examples may be combined, as appropriate, within a scope not being mutually contradicting. With respect to elements in the following exemplified modification examples and embodiments for which the actions and functions are the same as those of the first embodiment, symbols already referenced in the above description will be reused and the detailed description thereof will be omitted, as appropriate.

Modification Example 1.1

In the embodiment described above, although the voltage V11 is 5 V, for example, when the USB port 19 is electrically coupled to the host computer, the configuration is not limited to this aspect. For example, the voltage V11 may be greater than or equal to 5 V according to the USB PD standard. PD is an acronym of power delivery. When the voltage V11 exceeds 17 V, the mobile booster circuit 613 is unnecessary.

Figure 12:
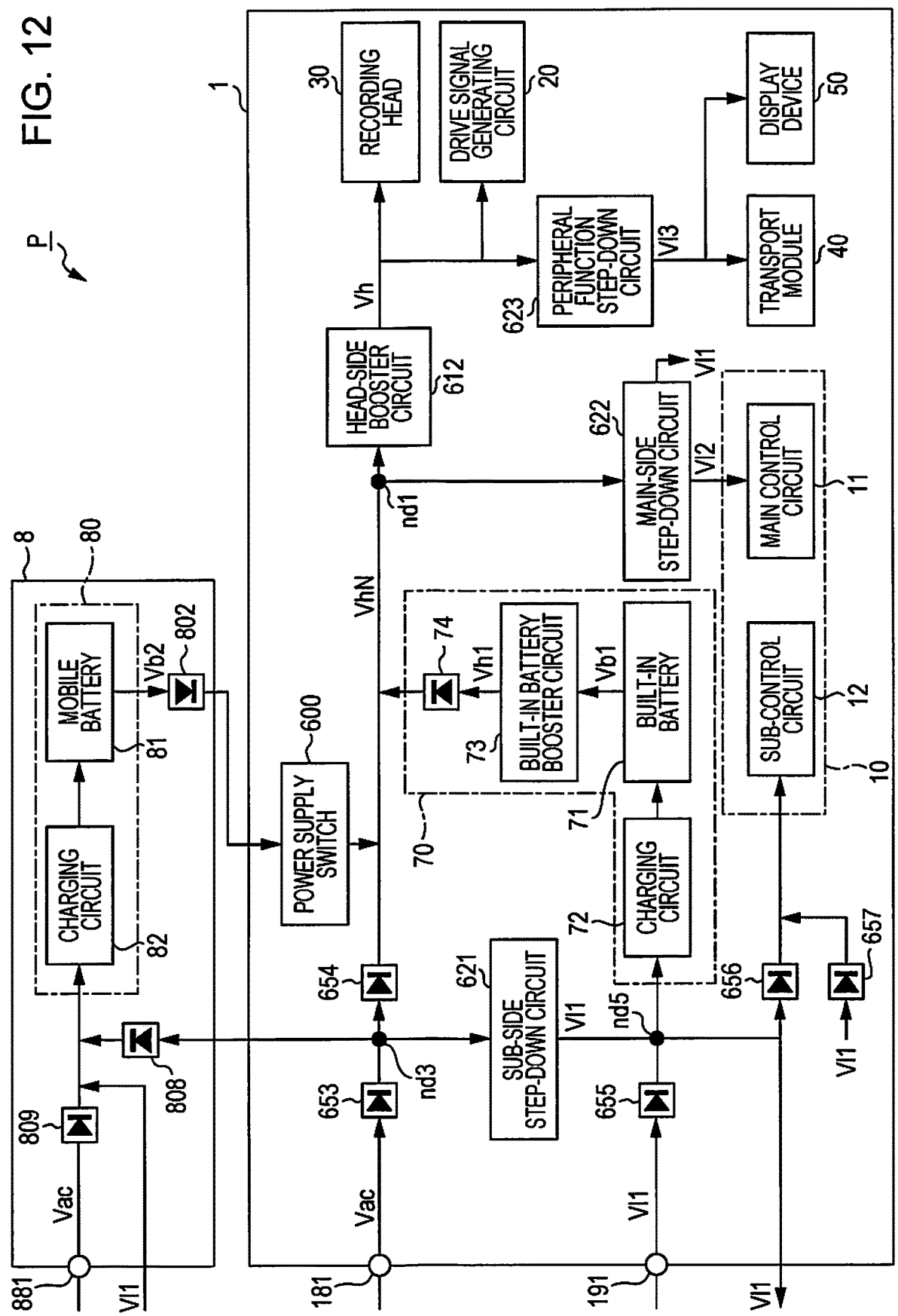
FIG. 12 is an explanatory diagram illustrating an example of a circuit configuration of the portable device according to a modification example 1.1.

FIG. 12 is a diagram illustrating an example of a circuit configuration of the portable device P according to the modification example 1. As illustrated in FIG. 12, the cathode of the device-side diode 655 is electrically coupled to the charging circuit 82.

Modification Example 1.2

Although the embodiments described above include a first configuration in which the charging of the built-in battery 71 is started after starting the charging of the mobile battery 81 when the built-in battery 71 and the mobile battery 81 are charged using the power from the AC power source and a second configuration in which the charging of the mobile battery 81 is started after starting the charging of the built-in battery 71 when the built-in battery 71 and the mobile battery 81 are charged using the power from the USB power source, the configuration is not limited to this aspect. For example, an aspect may be adopted in which includes the first configuration and does not include the second configuration, as may an aspect which includes the second configuration and does not include the first configuration. The aspect which includes the first configuration and does not include the second configuration is, for example, an aspect in which the charging of the built-in battery 71 is started after starting the charging of the mobile battery 81 when the built-in battery 71 and the mobile battery 81 are charged using the power from the AC power source, and the charging of the built-in battery 71 is started after starting the charging of the mobile battery 81 when the built-in battery 71 and the mobile battery 81 are charged using the power from the USB power source. The aspect which includes the second configuration and does not include the first configuration is, for example, an aspect in which the charging of the mobile battery 81 is started after starting the charging of the built-in battery 71 when the built-in battery 71 and the mobile battery 81 are charged using the power from the USB power source, and the charging of the mobile battery 81 is started after starting the charging of the built-in battery 71 when the built-in battery 71 and the mobile battery 81 are charged using the power from the AC power source.

Modification Example 1.3

In the embodiments described above, although the power supply terminal 191 is an example of a second terminal, the configuration is not limited to this aspect. For example, the second terminal may be an IEEE 1394 power supply terminal.

Modification Example 1.4

In the embodiments described above, although power source supplying the power to the power supply terminal 181 is an AC power source, the configuration is not limited to this aspect. The power source supplying the power to the power supply terminal 181 may be a cigar lighter socket of an automobile, for example. The voltage of the cigar lighter socket is 12 V, for example.

Modification Example 1.5

In the first embodiment, although the voltage Vac from the AC power source is higher than the voltage V11 from the USB power source and the current from the AC power source is greater than the current from the USB power source, the configuration is not limited to this aspect and it is sufficient for the power from the AC power source to be greater than the power from the USB power source. For example, even if the current from the AC power source and the current from the USB power source are the same value, it is sufficient for the voltage Vac from the AC power source to be higher than the voltage V11 from the USB power source.

Modification Example 1.6

In the embodiments described above, although a serial type mobile printer 1 in which the carriage 43 and the recording head 30 move reciprocally in the X-axis directions is exemplified, the configuration is not limited to this aspect. It is also possible to apply the present disclosure to a line type mobile printer in which discharging units are distributed along the full width of the medium.

2. Second Embodiment

In the present embodiment, a description will be given of a portable device PA provided with a smart phone 2A which displays an image. In the present embodiment, the smart phone 2A is an example of "a mobile device".

2.1. Outline of Portable Device PA

Figure 13:
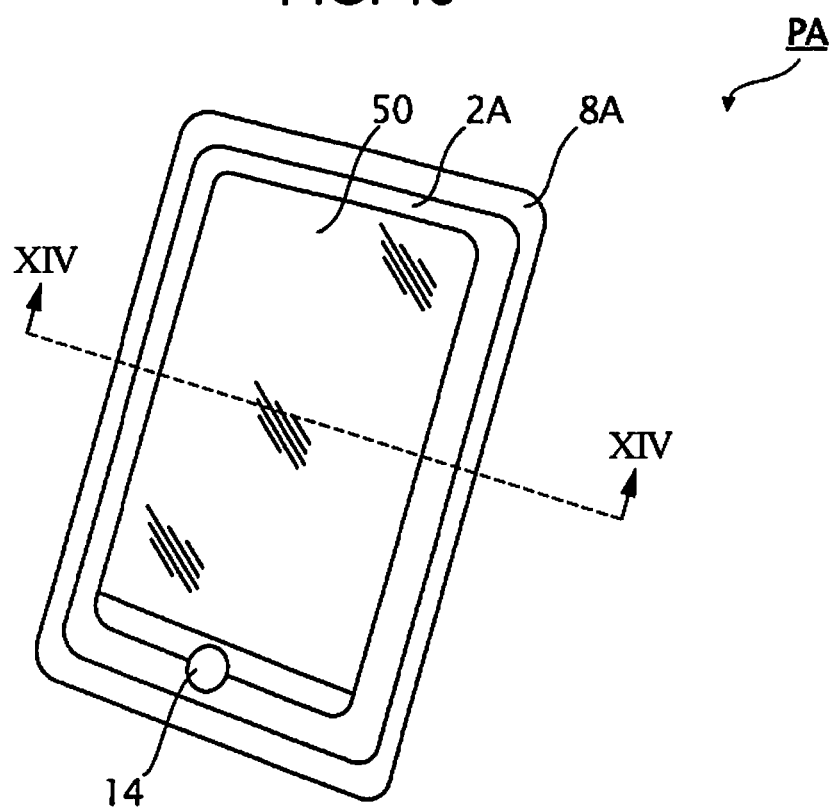
FIG. 13 is an external perspective view illustrating an example of a portable device according to a second embodiment.

FIG. 13 is an external perspective view of the portable device PA as viewed from the front side. The portable device PA includes the smart phone 2A and a mobile battery unit 8A that is attachable and detachable with respect to the smart phone 2A. The mobile battery unit 8A is mounted to the rear surface of the smart phone 2A. As illustrated in FIG. 13, the mobile battery unit 8A also functions as a cover protecting the smart phone 2A.

As illustrated in FIG. 13, the smart phone 2A is provided with the display device 50 and the operation unit 14. The display device 50 in the present embodiment is capable of displaying various information relating to the smart phone 2A and the mobile battery unit 8A and is an example of "a drive element". In the present embodiment, the display device 50 is formed to include a display unit such as a liquid crystal panel, an electronic paper panel, or an organic electro-luminescence panel and a drive circuit which drives the display unit. The display unit is an example of "a notification unit".

Figure 14:
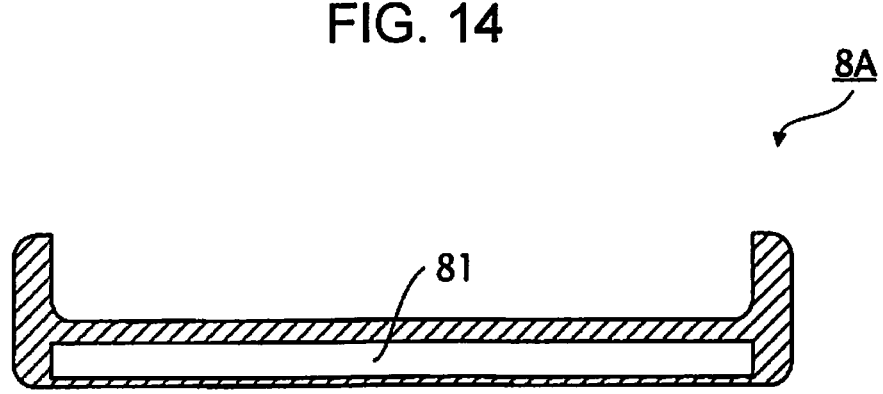
FIG. 14 is a sectional diagram illustrating a schematic example of a cross-sectional structure of the portable device.

FIG. 14 is a sectional diagram illustrating a schematic example of a cross-sectional structure of the portable device PA when the portable device PA is cut on a XIV-XIV line in FIG. 13. As illustrated in FIG. 14, the mobile battery unit 8A includes the mobile battery 81.

Figure 15:
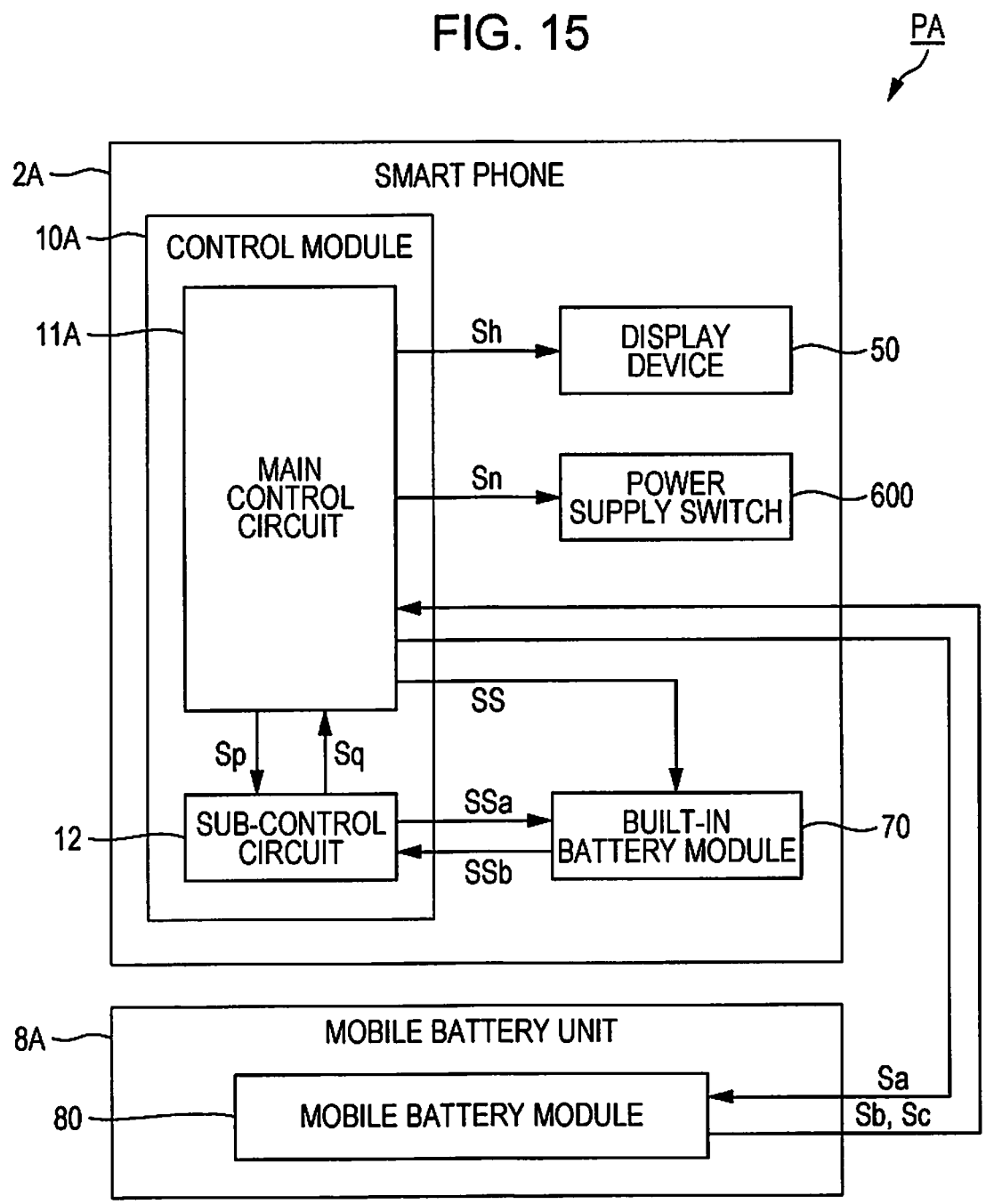
FIG. 15 is a functional block diagram illustrating an example of a functional configuration of the portable device.

FIG. 15 is a functional block diagram illustrating an example of a functional configuration of the portable device PA. As described above, the portable device PA is provided with the smart phone 2A and the mobile battery unit 8A.

As exemplified in FIG. 15, the smart phone 2A is provided with a control module 10A, the display device 50, the built-in battery module 70, and the power supply switch 600. The control module 10A controls the parts of the smart phone 2A, the built-in battery module 70 is capable of supplying power to the parts of the smart phone 2A, and the power supply switch 600 switches between whether or not the smart phone 2A receives the supply of power from the mobile battery unit 8A. In other words, from the perspective of the functional configuration, the smart phone 2A according to the present embodiment differs from the mobile printer 1 according to the first embodiment illustrated in FIG. 4 in that the smart phone 2A is provided with the control module 10A instead of the control module 10 and in that the smart phone 2A is not provided with the drive signal generating circuit 20, the recording head 30, and the transport module 40.

As exemplified in FIG. 15, the mobile battery unit 8A is provided with the mobile battery module 80 capable of supplying power to the parts of the smart phone 2A when the mobile battery unit 8A is mounted to the smart phone 2A. In other words, from the perspective of the functional configuration, the mobile battery unit 8A according to the present embodiment has the same configuration as that of the mobile battery unit 8 according to the first embodiment illustrated in FIG. 4.

In the present embodiment, in a similar manner to the first embodiment, the built-in battery 71 provided in the built-in battery module 70 is an example of "the first battery" and the mobile battery 81 provided in the mobile battery module 80 is an example of "the second battery".

In the present embodiment, for example, a case is anticipated in which the control module 10A includes a main control circuit 11A and the sub-control circuit 12. The main control circuit 11A is configured to include a CPU, for example. From the perspective of the functional configuration, the main control circuit 11A differs from the main control circuit 11 according to the first embodiment illustrated in FIG. 4 in that the main control circuit 11A does not output the waveform definition signal dCom, the print signal SI, and the transport control signal SK. In the present embodiment, the main control circuit 11A is an example of "the first processor". In the present embodiment, the sub-control circuit 12 is an example of "the second processor".

2.2. Circuit Configuration of Portable Device PA

Figure 16:
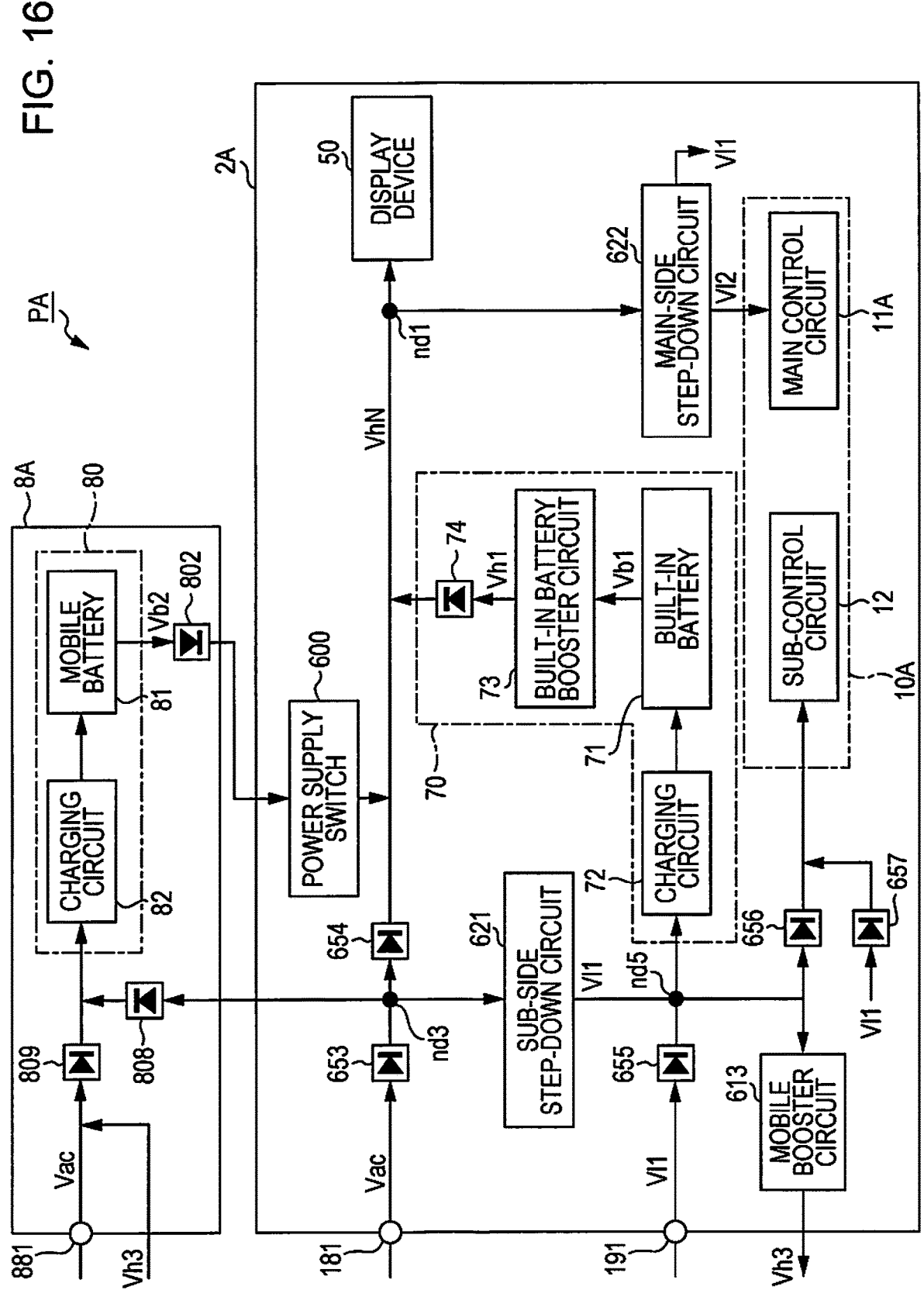
FIG. 16 is an explanatory diagram illustrating an example of a circuit configuration of the portable device.

FIG. 16 is an example of the circuit configuration of the portable device PA. In FIG. 16, to facilitate explanation, of the wiring provided in the portable device PA, notation of the signal lines will be omitted and only the power lines will be denoted.

As described above, the portable device PA is provided with the smart phone 2A and the mobile battery unit 8A.

As illustrated in FIG. 16, from the perspective of the circuit configuration, the smart phone 2A differs from the mobile printer 1 according to the first embodiment illustrated in FIG. 6 in that the smart phone 2A is provided with the control module 10A instead of the control module 10 and in that the smart phone 2A is not provided with the drive signal generating circuit 20, the recording head 30, the transport module 40, the head-side booster circuit 612, and the peripheral function step-down circuit 623. From the perspective of the circuit configuration, the mobile battery unit 8A is the same as the mobile battery unit 8 according to the first embodiment illustrated in FIG. 6.

2.3. Charging Modes

In the portable device PA in the present embodiment, in the same manner as in the portable device P according to the first embodiment, it is possible to charge the built-in battery 71 using two built-in battery charging modes, the built-in battery AC charging mode and the built-in battery USB charging mode. In the portable device PA in the present embodiment, in the same manner as in the portable device P according to the first embodiment, it is possible to charge the mobile battery 81 using two built-in battery charging modes, the mobile battery AC charging mode and the mobile battery USB charging mode.

The priority order of the charging performed by the portable device PA according to the present embodiment is the same as the priority order of the charging performed by the portable device P according to the first embodiment illustrated in FIG. 7. In other words, the control module 10A according to the present embodiment executes the processes illustrated in FIG. 7 when the portable device PA performs the charging.

In other words, when the portable device PA charges the built-in battery 71 and the mobile battery 81 using the power from the AC power source, for the order of charging, the control module 10A prioritizes the charging of the mobile battery 81 over the charging of the built-in battery 71 and controls the portable device PA such that the charging of the built-in battery 71 is started after starting the charging of the mobile battery 81. When the portable device PA charges the built-in battery 71 and the mobile battery 81 using the power from the AC power source, the control module 10A may control the portable device PA such that the charging of the built-in battery 71 is started after the charging of the mobile battery 81 is started and the charging of the mobile battery 81 is finished to a capacity less than or equal to the capacity of the fully charged state of the mobile battery 81.

When the portable device PA charges the built-in battery 71 and the mobile battery 81 using the power from the USB power source, for the order of charging, the control module 10A prioritizes the charging of the built-in battery 71 over the charging of the mobile battery 81 and controls the portable device PA such that the charging of the mobile battery 81 is started after starting the charging of the built-in battery 71. When the portable device PA charges the built-in battery 71 and the mobile battery 81 using the power from the USB power source, the control module 10A may control the portable device PA such that the charging of the mobile battery 81 is started after the charging of the built-in battery 71 is started and the charging of the built-in battery 71 is finished to a capacity less than or equal to the capacity of the fully charged state of the built-in battery 71.

2.4. Effects of Second Embodiment

As described above, the smart phone 2A according to the present embodiment is provided with the display device 50, the built-in battery 71, the power supply terminal 181, and the power supply terminal 191. The built-in battery 71 supplies the power to the display device 50, the power supply terminal 181 receives a supply of power that charges the mobile battery 81 supplying the power to the built-in battery 71 and the display device 50, and the power supply terminal 191 receives a supply of power that charges the built-in battery 71 and the mobile battery 81. The electric storage capacity of the mobile battery 81 is greater than the electric storage capacity of the built-in battery 71. The power from the AC power source supplied to the power supply terminal 181 is greater than the power from the USB power source supplied to the power supply terminal 191. In the smart phone 2A, the charging of the mobile battery 81 is prioritized over the charging of the built-in battery 71 when the built-in battery 71 and the mobile battery 81 are charged using the power from the AC power source.

Accordingly, according to the present embodiment, since the mobile battery 81 sooner reaches a state in which the mobile battery 81 is capable of stably supplying the power, it is possible to sooner stably operate the smart phone 2A as compared to a case in which the charging is performed using the power from the AC power source and in which the charging of the built-in battery 71 is prioritized over the charging of the mobile battery 81. In this manner, since it is possible to sooner stably operate the smart phone 2A even in a state in which the mobile battery 81 is close to the completely discharged state, it is possible to increase the portability of the smart phone 2A.

The smart phone 2A according to the present embodiment is provided with the display device 50, the built-in battery 71, the power supply terminal 181, and the power supply terminal 191. The built-in battery 71 supplies the power to the display device 50, the power supply terminal 181 receives a supply of power that charges the mobile battery 81 supplying the power to the built-in battery 71 and the display device 50, and the power supply terminal 191 receives a supply of power that charges the built-in battery 71 and the mobile battery 81. The electric storage capacity of the mobile battery 81 is greater than the electric storage capacity of the built-in battery 71. The power from the AC power source supplied to the power supply terminal 181 is greater than the power from the USB power source supplied to the power supply terminal 191. The charging of the built-in battery 71 is prioritized over the charging of the mobile battery 81 when the built-in battery 71 and the mobile battery 81 are charged using the power from the USB power source.

Accordingly, according to the present embodiment, since the built-in battery 71 sooner reaches a state in which the built-in battery 71 is capable of stably supplying the power, it is possible to sooner stably operate the smart phone 2A as compared to a case in which the charging is performed using the power from the USB power source and the charging of the mobile battery 81 is prioritized over the charging of the built-in battery 71. In this manner, since it is possible to sooner stably operate the smart phone 2A even in a state in which the mobile battery 81 is close to the completely discharged state, it is possible to increase the portability of the smart phone 2A.

3. Third Embodiment

In the present embodiment, a description will be given of a portable device PB provided with a smart phone 2B which displays an image. In the present embodiment, the smart phone 2B is an example of "a mobile device".

3.1. Outline of Portable Device PB

Figure 17:
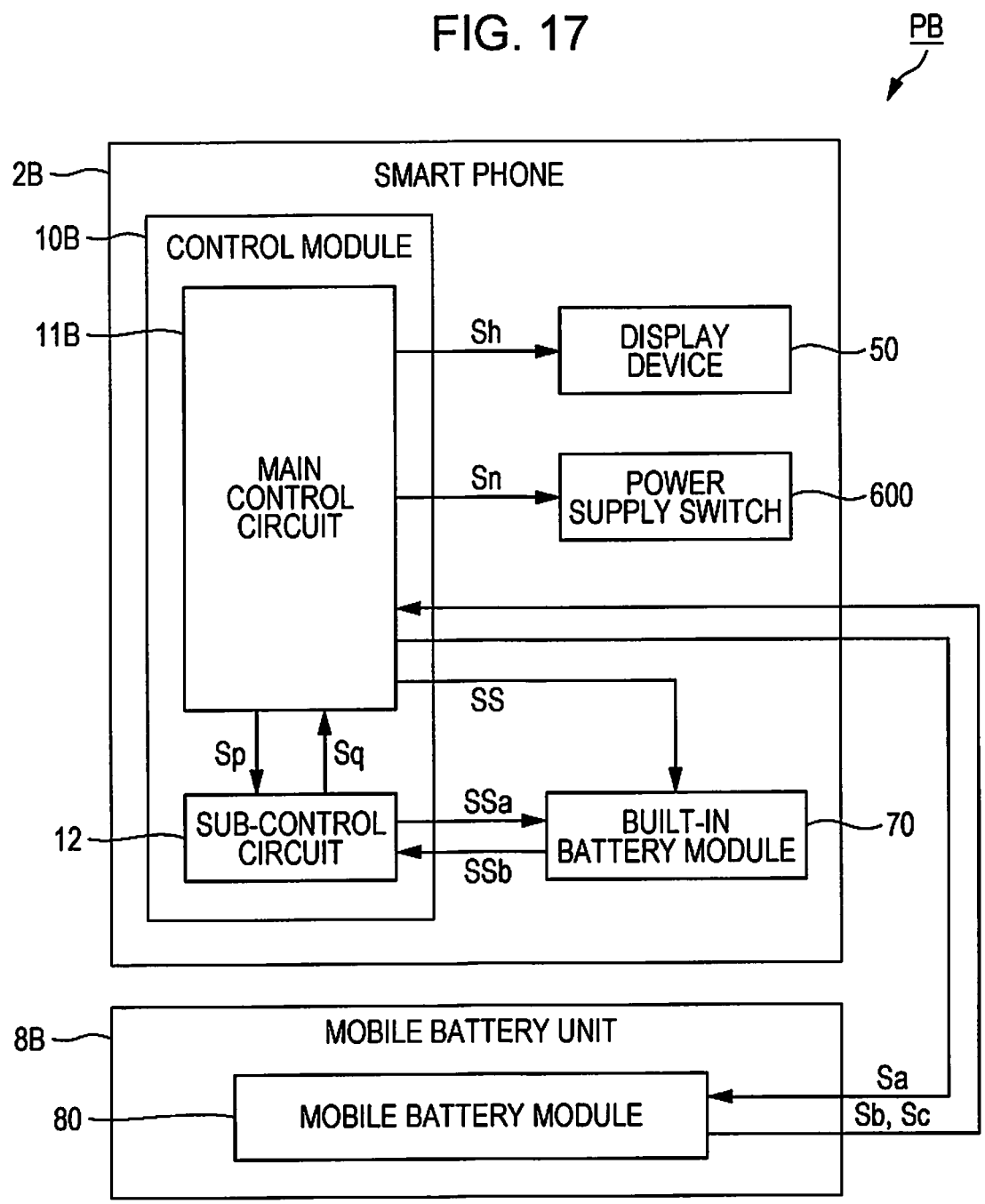
FIG. 17 is an external perspective view illustrating an example of a functional configuration of a portable device according to a third embodiment.

FIG. 17 is a functional block diagram illustrating an example of a functional configuration of the portable device PB. As illustrated in FIG. 17, the portable device PB is provided with the smart phone 2B and a mobile battery unit 8B that is attachable and detachable with respect to the smart phone 2B.

As exemplified in FIG. 17, the smart phone 2B is provided with a control module 10B, the display device 50, the built-in battery module 70, and the power supply switch 600. The control module 10B controls the parts of the smart phone 2B, the display device 50 is capable of displaying various information, the built-in battery module 70 is capable of supplying power to the parts of the smart phone 2B, and the power supply switch 600 switches between whether or not the smart phone 2B receives the supply of power from the mobile battery unit 8B. In other words, from the perspective of the functional configuration, the smart phone 2B according to the present embodiment differs from the mobile printer 1 according to the first embodiment illustrated in FIG. 4 in that the smart phone 2B is provided with the control module 10B instead of the control module 10 and in that the smart phone 2B is not provided with the drive signal generating circuit 20, the recording head 30, and the transport module 40. In the present embodiment, the power supply switch 600 is an example of "a switch".

As exemplified in FIG. 17, the mobile battery unit 8B is provided with the mobile battery module 80 capable of supplying power to the parts of the smart phone 2B when the mobile battery unit 8B is mounted to the smart phone 2B. In other words, from the perspective of the functional configuration, the mobile battery unit 8B according to the present embodiment has the same configuration as that of the mobile battery unit 8 according to the first embodiment illustrated in FIG. 4.

In the present embodiment, the display device 50 provided on the smart phone 2B is capable of displaying various information relating to the smart phone 2B and the mobile battery unit 8B and is an example of "a drive element". The display device 50 is formed to include a display unit such as a liquid crystal panel, an electronic paper panel, or an organic electro-luminescence panel and a drive circuit which drives the display unit. The display unit is an example of "a notification unit".

In the present embodiment, the built-in battery 71 provided in the built-in battery module 70 is an example of "the first battery" and the mobile battery 81 provided in the mobile battery module 80 is an example of "the second battery".

In the present embodiment, for example, a case is anticipated in which the control module 10B includes a main control circuit 11B and the sub-control circuit 12. The main control circuit 11B is configured to include a CPU, for example. From the perspective of the functional configuration, the main control circuit 11B differs from the main control circuit 11 according to the first embodiment illustrated in FIG. 4 in that the main control circuit 11B does not output the waveform definition signal dCom, the print signal SI, and the transport control signal SK. In the present embodiment, the main control circuit 11B is an example of "the first processor". In the present embodiment, the sub-control circuit 12 is an example of "the second processor".

In the present embodiment, the main control circuit 11B causes the display unit provided on the display device 50 to display a remaining capacity of the built-in battery 71 and a remaining capacity of the mobile battery 81.

3.2. Circuit Configuration of Portable Device PB

Figure 18:
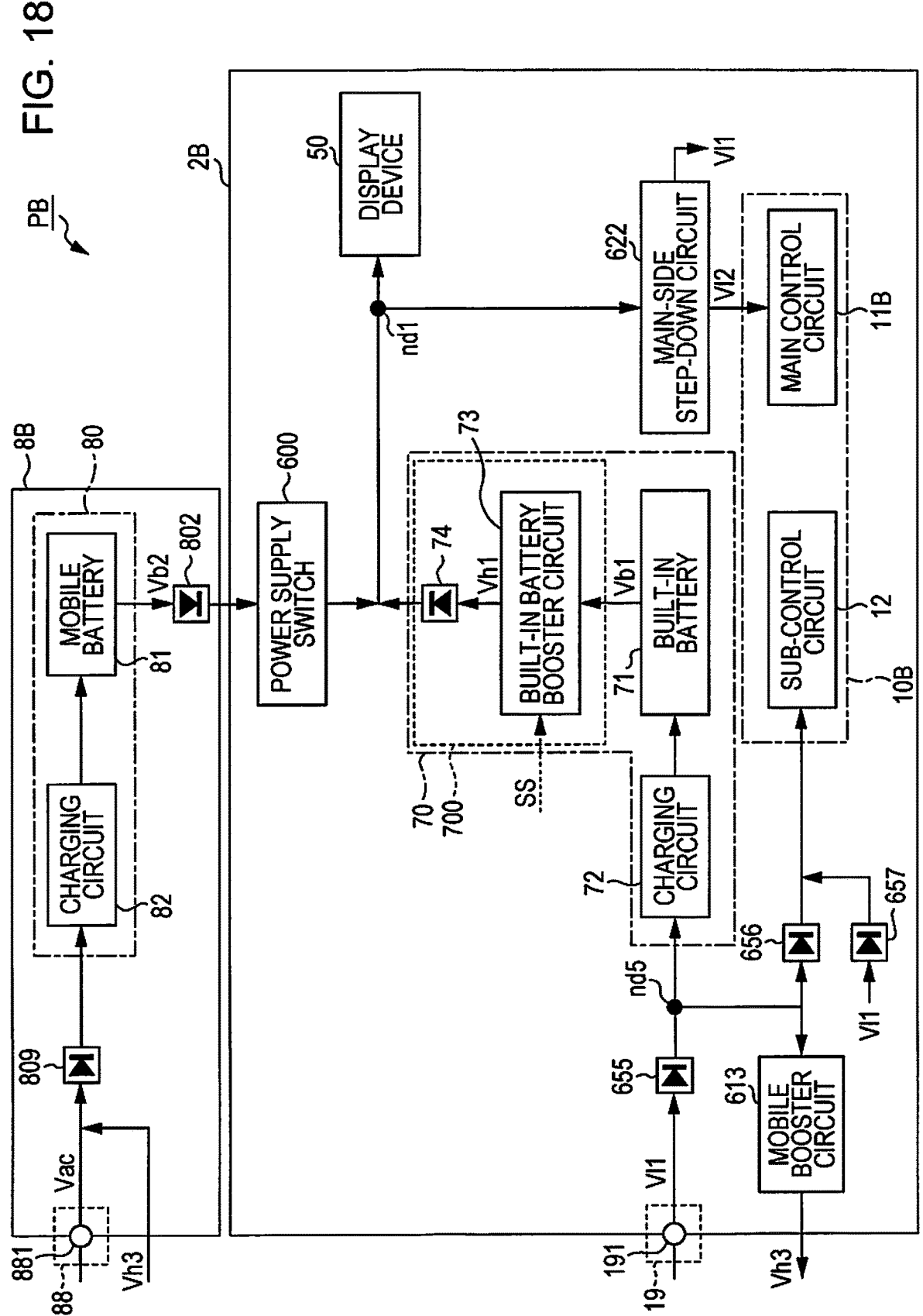
FIG. 18 is an explanatory diagram illustrating an example of a circuit configuration of the portable device.

FIG. 18 is an example of the circuit configuration of the portable device PB. In FIG. 18, to facilitate explanation, of the wiring provided in the portable device PB, notation of the signal lines will be omitted and only the power lines will be denoted.

As described above, the portable device PB is provided with the smart phone 2B and the mobile battery unit 8B.

As illustrated in FIG. 18, from the perspective of the circuit configuration, the smart phone 2B differs from the smart phone 2A according to the second embodiment illustrated in FIG. 16 in that the smart phone 2B is provided with the control module 10B instead of the control module 10A and in that the smart phone 2B is not provided with the power supply terminal 181, the sub-side step-down circuit 621, the device-side diode 653, the device-side diode 654, and the node nd3. From the perspective of the circuit configuration, the mobile battery unit 8B differs from the mobile battery unit 8A according to the second embodiment illustrated in FIG. 16 in that the mobile battery unit 8B is not provided with the mobile-side diode 808.

In the present embodiment, as illustrated in FIG. 18, in the built-in battery module 70, the built-in battery booster circuit 73 and the built-in battery diode 74 will be referred to as a stopping circuit 700. Here, the stopping circuit 700 is an example of "a stopping unit". The built-in battery booster circuit 73 is an example of "a booster unit". The built-in battery diode 74 is an example of "a diode".

3.3. Power Supplying Mode

Hereinafter, a description will be given of a specific aspect of the supplying of the power to a power supplying target such as the control module 10B and the display device 50 in the portable device PB according to the present embodiment, with reference to FIGS. 19A to 21.

In the portable device PB in the present embodiment, it is possible to supply the power to the power supplying target using two built-in battery charging modes, the built-in battery power supplying mode and the mobile battery power supplying mode. Here, the built-in battery power supplying mode is a power supplying mode which performs the supplying of power from the built-in battery 71 to the power supplying target. The mobile battery power supplying mode is a power supplying mode which performs the supplying of power from the mobile battery 81 to the power supplying target.

The main control circuit 11B sets the power supplying mode to the built-in battery power supplying mode or the mobile battery power supplying mode based on one or both of the state signal Sb and the mounting signal Sc.

Figure 19A:
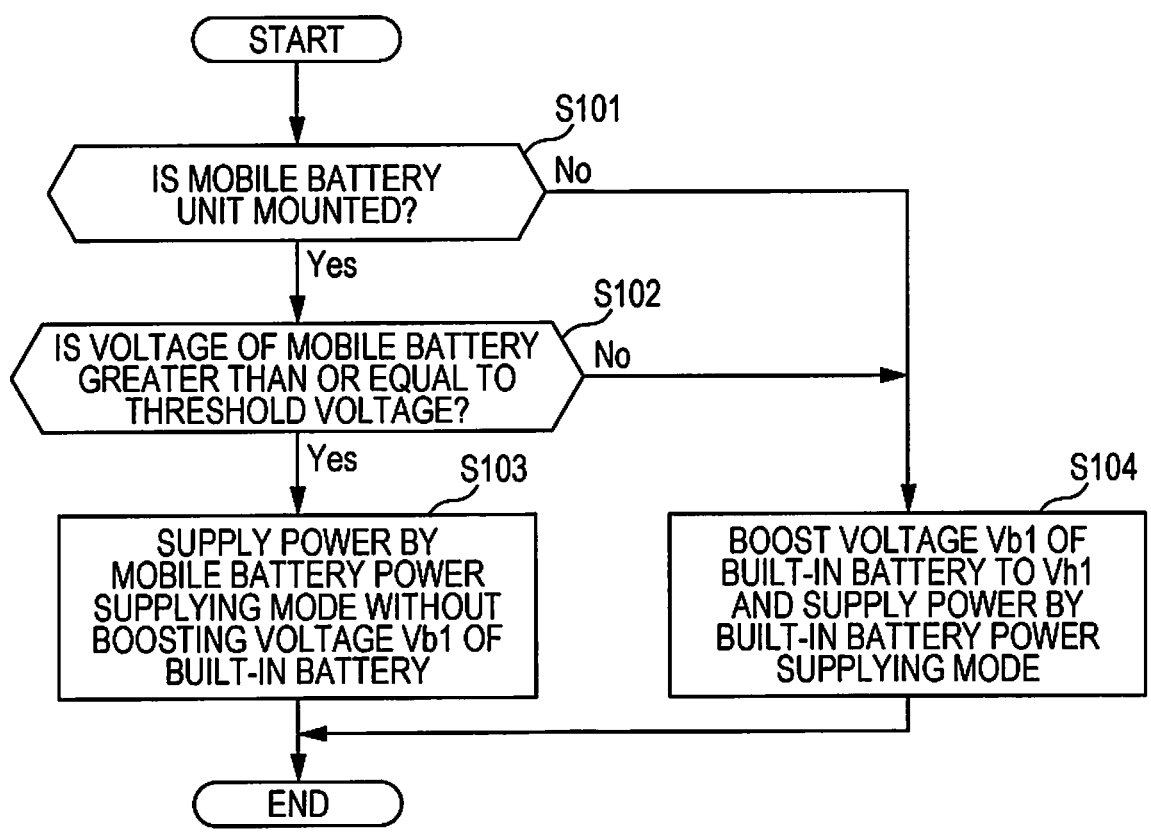
FIG. 19A is a flowchart illustrating an example of a process relating to power supplying in the portable device.

FIG. 19A is a flowchart relating to the setting of the power supplying mode by the main control circuit 11B.

As illustrated in FIG. 19A, in step S101, the main control circuit 11B determines whether or not the mounting signal Sc indicates that the mobile battery unit 8B is mounted to the smart phone 2B.

In step S102, the main control circuit 11B determines whether or not the state signal Sb indicates that the voltage Vb2 supplied from the mobile battery 81 is greater than or equal to the threshold voltage Vth.

When the result of the determination in step S101 is positive and the result of the determination in step S102 is positive, the main control circuit 11B sets the power supplying mode to the mobile battery power supplying mode as step S103.

On the other hand, when the result of the determination in step S101 is negative or the result of the determination in step S102 is negative, the main control circuit 11B sets the power supplying mode to the built-in battery power supplying mode as step S104.

In the present embodiment, the threshold voltage Vth is an example of "a first voltage".

FIG. 19A is an example of the processes relating to the setting of the power supplying mode according to the present embodiment and the main control circuit 11B may set the power supplying mode using different processes from those of FIG. 19A.

Figure 19B:
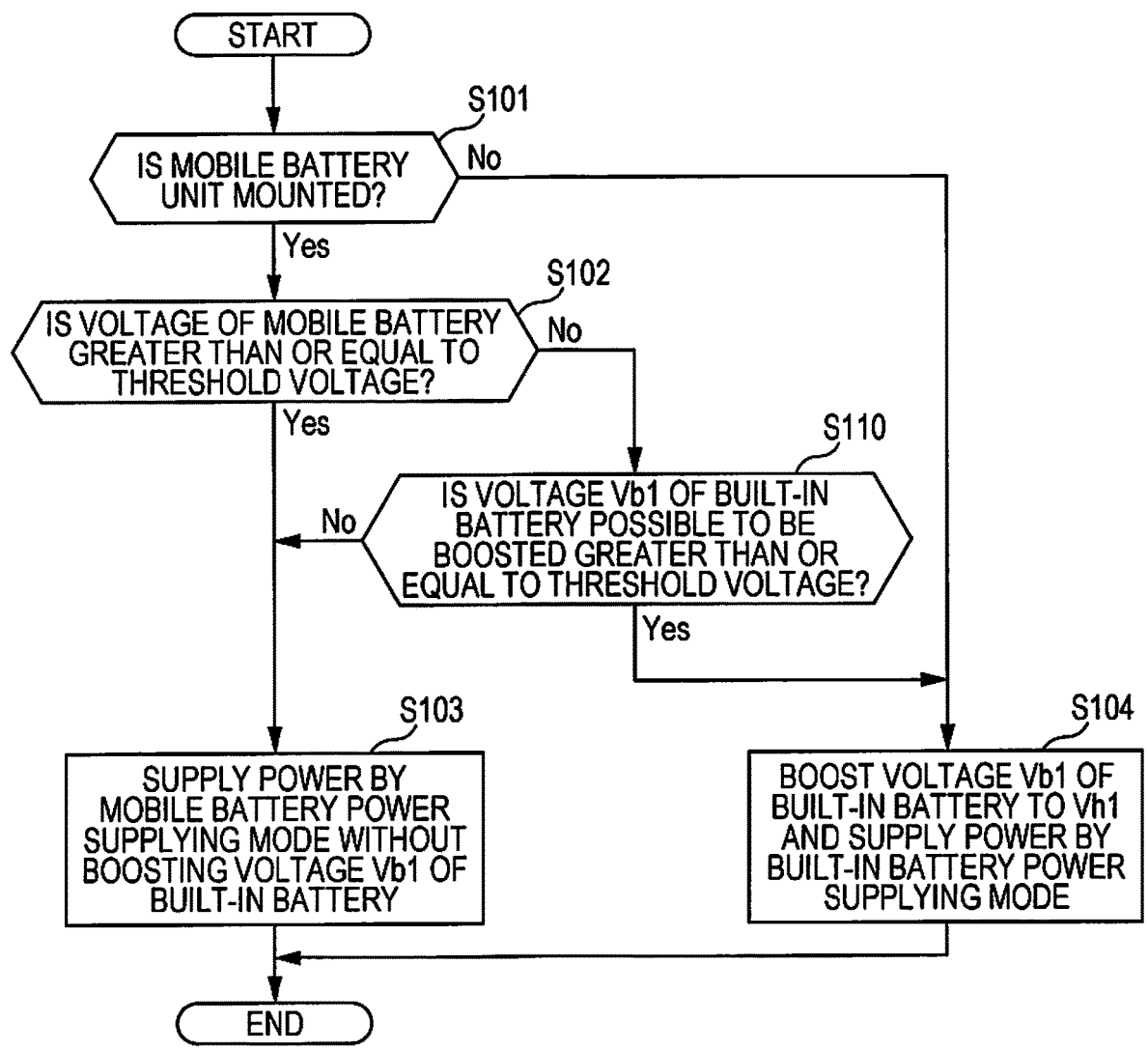
FIG. 19B is a flowchart illustrating an example of a process relating to the power supplying in the portable device.

FIG. 19B is a flowchart illustrating another example of processes relating to the setting of the power supplying mode by the main control circuit 11B.

As illustrated in FIG. 19B, when the result of the determination in step S101 is positive and the result of the determination in step S102 is negative, the main control circuit 11B determines whether or not it is possible to boost the voltage Vb1 of the built-in battery 71 to greater than or equal to the threshold voltage Vth using the built-in battery booster circuit 73 (S110). In step S110, the main control circuit 11B may determine whether or not it is possible to boost the voltage Vb1 of the built-in battery 71 to greater than or equal to the voltage Vh1 using the built-in battery booster circuit 73. In step S110, the main control circuit 11B may determine whether or not the voltage Vb1 of the built-in battery 71 is greater than or equal to a reference voltage Vb0. Here, the reference voltage Vb0 is a predetermined voltage which is a higher voltage than 0 V, for example, and is a lower voltage than the voltage Vb1 when the built-in battery 71 is in the fully charged state.

When the result of the determination in step S101 is positive and the result of the determination in step S102 is positive, or when the result of the determination in step S110 is negative, the main control circuit 11B sets the power supplying mode to the mobile battery power supplying mode (S103). On the other hand, when the result of the determination in step S101 is negative or the result of the determination in step S110 is positive, the main control circuit 11B sets the power supplying mode to the built-in battery power supplying mode (S104).

In this manner, in the present embodiment, the main control circuit 11B may set the power supplying mode such that the supplying of power from the mobile battery 81 is prioritized over the supplying of power from the built-in battery 71, as exemplified in FIG. 19A or FIG. 19B. The processes relating to the setting of the power supplying mode in the present embodiment are not limited to the examples illustrated in FIG. 19A or FIG. 19B, and may be any processes as long as the supplying of power from the mobile battery 81 is prioritized over the supplying of power from the built-in battery 71.

FIG. 20 is a diagram illustrating the supplying of power using a built-in battery power supplying mode.

When the main control circuit 11B sets the power supplying mode to the built-in battery power supplying mode, the main control circuit 11B causes the built-in battery booster circuit 73 to boost the voltage Vb1 output by the built-in battery 71 to the voltage Vh1 by supplying the control signal SS specifying that boosting is to be performed to the built-in battery booster circuit 73. When the main control circuit 11B sets the power supplying mode to the built-in battery power supplying mode, the main control circuit 11B turns off the power supply switch 600 by supplying the specification signal Sn specifying off to the power supply switch 600.

In the built-in battery power supplying mode, the built-in battery booster circuit 73 boosts the voltage Vb1 supplied from the built-in battery 71 to the voltage Vh1 and supplies the post-boosting voltage Vh1 to the node nd1 via the built-in battery diode 74. The main-side step-down circuit 622 steps down the voltage Vh1 supplied thereto via the node nd1 to the voltage V12 and the voltage V11 and supplies the post-step-down voltages V12 and V11 to the control module 10B. The voltage Vh1 supplied to the main-side step-down circuit 622 via the node nd1 is supplied to the display device 50.

In the built-in battery power supplying mode, the built-in battery 71 supplies the power to the display device 50 using a built-in battery power supply path RT1. The built-in battery power supply path RT1 is an example of "a first path". As illustrated in FIG. 20, the built-in battery power supply path RT1 is a path which has the built-in battery 71 as the starting point, goes via the built-in battery booster circuit 73, the built-in battery diode 74, and the node nd1, and has the display device 50 as the ending point.

Figure 21:
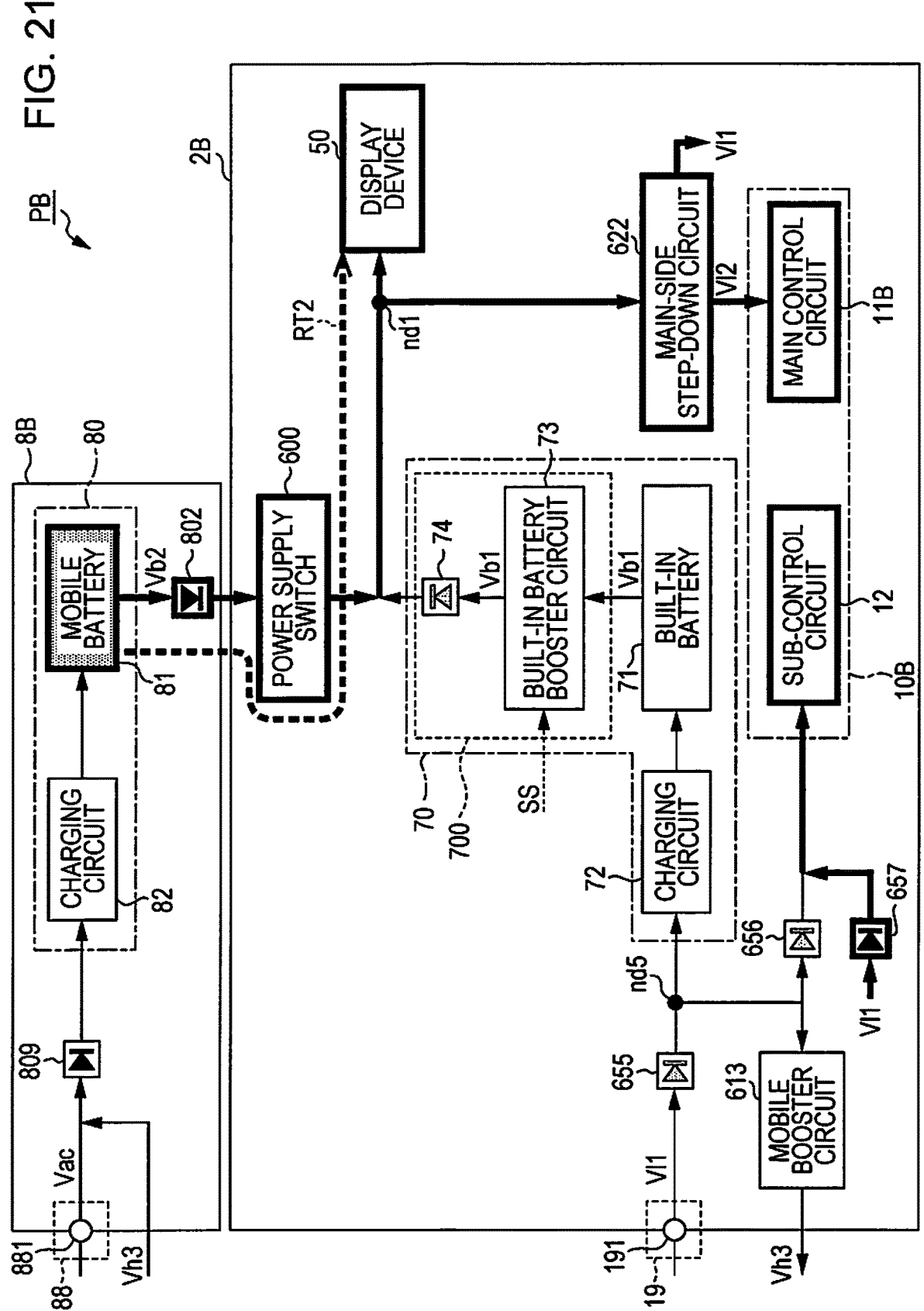
FIG. 21 is an explanatory diagram illustrating an example of the power supplying by a mobile battery power supplying mode.

FIG. 21 is a diagram illustrating the supplying of power using a mobile battery power supplying mode.

When the main control circuit 11B sets the power supplying mode to the mobile battery power supplying mode, the main control circuit 11B causes the built-in battery booster circuit 73 to output the voltage Vb1, which is output by the built-in battery 71, to the built-in battery diode 74 without boosting the voltage Vb1 by supplying the control signal SS specifying that boosting is not to be performed to the built-in battery booster circuit 73. When the main control circuit 11B sets the power supplying mode to the mobile battery power supplying mode, the main control circuit 11B turns on the power supply switch 600 by supplying the specification signal Sn specifying on to the power supply switch 600.

In the mobile battery power supplying mode, since the power supply switch 600 is turned on, the cathode of the mobile-side diode 802 and the cathode of the built-in battery diode 74 are electrically coupled to each other. The voltage Vb2 supplied to the anode of the mobile-side diode 802 is a higher voltage than the voltage Vb1 supplied to the anode of the built-in battery diode 74. Therefore, since the built-in battery diode 74 is turned off even as a current flows from the mobile-side diode 802 into the node nd1, a current will not flow from the built-in battery diode 74 into the node nd1. In this manner, in the mobile battery power supplying mode, the mobile battery 81 supplies the voltage Vb2 to the node nd1 via the mobile-side diode 802 and the power supply switch 600.

In the mobile battery power supplying mode, the main-side step-down circuit 622 steps down the voltage Vb2 supplied thereto from the mobile battery 81 via the node nd1 to the voltage V12 and the voltage V11 and supplies the post-step-down voltages V12 and V11 to the control module 10B. The voltage Vb2 supplied to the main-side step-down circuit 622 via the node nd1 is supplied to the display device 50.

In the mobile battery power supplying mode, the mobile battery module 80 supplies the power to the display device 50 using a mobile battery power supply path RT2. The mobile battery power supply path RT2 is an example of "a second path". As illustrated in FIG. 21, the mobile battery power supply path RT2 is a path which has the mobile battery 81 as the starting point, goes via the mobile-side diode 802, power supply switch 600, and the node nd1, and has the display device 50 as the ending point. In other words, the node nd1 is "a node shared by the first path and the second path". In the present embodiment, the node nd1 may be bus wiring.

3.4. Effects of Third Embodiment

As described above, since it is possible to mount the mobile battery unit 8B to the smart phone 2B according to the present embodiment, it is possible to lengthen the driving time without supplying the power from a commercial power source such as an AC power source as compared to a case in which it is not possible to mount the mobile battery unit 8B to the smart phone 2B. Therefore, according to the present embodiment, it is possible to increase the portability of the smart phone 2B as compared to a case in which the mobile battery unit 8B may not be mounted to the smart phone 2B.

The smart phone 2B according to the present embodiment is provided with the display device 50, the built-in battery 71, and the stopping circuit 700. The built-in battery 71 is capable of supplying the power to the display device 50, and the stopping circuit 700 stops the supplying of the power of the built-in battery 71 when the voltage of the mobile battery 81, which is capable of supplying the power to the display device 50 and is attachable and detachable, is greater than or equal to the threshold voltage Vth capable of driving the display device 50.

In a mobile device having a merit in ease of carrying, freedom of placement and ability to use at an arbitrary site are points in demand. In other words, there is a demand for being able to use the mobile device without relying on a site of an AC power source.

Since the smart phone 2B according to the present embodiment stops the supplying of the power of the built-in battery 71 when the voltage of the mobile battery 81 is greater than or equal to the threshold voltage Vth, the power of the mobile battery 81 is used preferentially. When the power of the mobile battery 81 is used and the voltage of the mobile battery 81 is less than the threshold voltage Vth, it is possible to operate the smart phone 2B using the built-in battery 71 while charging the mobile battery 81 using the AC power source. Since it is possible to remove the mobile battery unit 8B from the smart phone 2B, the AC power source and the smart phone 2B may be separated from each other when the mobile battery 81 is charged using the AC power source. In this manner, according to the present embodiment, since the installation site of the smart phone 2B is not limited even when the mobile battery 81 is to be charged, it is possible to perform the charging of the mobile battery 81 while driving the display device 50 at an arbitrary site.

On the other hand, hypothetically, when the power is preferentially supplied from the built-in battery 71 to the display device 50, when the built-in battery 71 assumes the completely discharged state, it is necessary to supply the power from the mobile battery 81. In a case in which the smart phone 2B receives the power supplying from the mobile battery 81 after the built-in battery 71 assumes the completely discharged state, the mobile battery unit 8B may not be removed from the smart phone 2B. Therefore, when the mobile battery 81 assumes the completely discharged state, the display device 50 completely stops being driven. Accordingly, when the power is preferentially supplied from the built-in battery 71 to the display device 50, it is necessary to move the smart phone 2B to the vicinity of the AC power source in order to continue the driving of the display device 50 even after the mobile battery 81 assumes the completely discharged state.

In contrast, according to the present embodiment, even when the usage site of the smart phone 2B is an arbitrary site, it is possible to shorten the time during which the display device 50 may not be driven as compared to a case in which the power supplying from the built-in battery 71 is prioritized. According to the present embodiment, since the usage site of the smart phone 2B is not limited, it is possible to use the smart phone 2B for a long time without the usage site being limited as compared to a case in which the power supplying from the built-in battery 71 is prioritized.

In the smart phone 2B according to the present embodiment, the voltage Vb1 of the fully charged state of the built-in battery 71 is lower than the threshold voltage Vth and the built-in battery power supply path RT1 that supplies the power from the built-in battery 71 to the display device 50 and the mobile battery power supply path RT2 that supplies the power from the mobile battery 81 to the display device 50 are provided with a shared node nd1. The stopping circuit 700 is provided with the built-in battery booster circuit 73 and the built-in battery diode 74. The built-in battery booster circuit 73 is provided on the built-in battery power supply path RT1 and is capable of switching between whether or not to boost the voltage Vb1 of the built-in battery 71, the built-in battery diode 74 is provided on the built-in battery power supply path RT1, the anode of the built-in battery diode 74 is electrically coupled to the built-in battery booster circuit 73, and the cathode of the built-in battery diode 74 is electrically coupled to the node nd1.

In this manner, according to the present embodiment, it is possible to stop the boosting of the voltage Vb1 of the built-in battery 71 using the built-in battery booster circuit 73. Therefore, according to the present embodiment, when the voltage Vb2 of the mobile battery 81 is greater than or equal to the threshold voltage Vth, it is possible to turn off the built-in battery diode 74. In other words, according to the present embodiment, when the voltage Vb2 of the mobile battery 81 is greater than or equal to the threshold voltage Vth, it is possible to stop the power supplying from the built-in battery 71 and to prioritize the power supplying from the mobile battery 81. Therefore, according to the present embodiment, it is possible to suppress the reduction of the remaining capacity of the built-in battery 71 as compared to an aspect in which the power supplying from the built-in battery 71 to the display device 50 is not stopped when performing the power supplying from the mobile battery 81 to the display device 50.

The stopping circuit 700 does not completely stop the output of the power from the built-in battery 71 and merely stops the boosting of the voltage Vb1 of the built-in battery 71 by the built-in battery booster circuit 73. The time taken from a state in which the boosting of the voltage Vb1 of the built-in battery 71 is stopped until the voltage Vb1 is boosted is shorter than the time taken from a state in which the output of the power of the built-in battery 71 is stopped until the power is output. Therefore, according to the present embodiment, it is possible to shorten the time from the mobile battery unit 8B being unintentionally removed until it is possible to supply the power to the display device 50 again as compared to a case in which the output of the power of the built-in battery 71 is completely stopped.

In the smart phone 2B according to the present embodiment, the built-in battery booster circuit 73 stops the boosting of the voltage Vb1 of the built-in battery 71 when the voltage Vb2 of the mobile battery 81 is greater than or equal to the threshold voltage Vth and the built-in battery booster circuit 73 boosts the voltage Vb1 of the built-in battery 71 to a voltage greater than or equal to the threshold voltage Vth when the voltage Vb2 of the mobile battery 81 is less than the threshold voltage Vth.

Therefore, according to the present embodiment, when the voltage Vb2 of the mobile battery 81 is greater than or equal to the threshold voltage Vth, it is possible to turn off the built-in battery diode 74. In other words, according to the present embodiment, when the voltage Vb2 of the mobile battery 81 is greater than or equal to the threshold voltage Vth, it is possible to stop the power supplying from the built-in battery 71 and to prioritize the power supplying from the mobile battery 81. Therefore, according to the present embodiment, it is possible to suppress the reduction of the remaining capacity of the built-in battery 71 as compared to an aspect in which the voltage Vb1 of the built-in battery 71 is boosted even if the voltage Vb2 of the mobile battery 81 is greater than or equal to the threshold voltage Vth.

According to the present embodiment, it is possible to shorten the time from the mobile battery unit 8B being unintentionally removed until it is possible to supply the power to the display device 50 again as compared to an aspect in which the output of the power of the built-in battery 71 is completely stopped when the voltage Vb2 of the mobile battery 81 is greater than or equal to the threshold voltage Vth.

In the smart phone 2B according to the present embodiment, the power supply switch 600 is provided on the mobile battery power supply path RT2, turns on when the voltage Vb2 of the mobile battery 81 is greater than or equal to the threshold voltage Vth, and turns off when the voltage Vb2 of the mobile battery 81 is less than the threshold voltage Vth.

Accordingly, even if the mobile battery unit 8B is mounted, it is possible to stop the supplying of the power from the mobile battery 81 and cause the built-in battery 71 to supply the power by turning off the power supply switch 600.

In the smart phone 2B according to the present embodiment, the maximum capacity of the mobile battery 81 is greater than the maximum capacity of the built-in battery 71.

Therefore, in the smart phone 2B according to the present embodiment, it is possible to increase the portability of the smart phone 2B as compared to a case in which the maximum capacity of the mobile battery 81 is less than or equal to the maximum capacity of the built-in battery 71.

In the smart phone 2B according to the present embodiment, the display device 50 is provided with the display unit which displays the capacity of the mobile battery 81. For example, the display unit of the display device 50 displays the fact that the remaining capacity of the mobile battery 81 is "0%" when the mobile battery 81 is in the completely discharged state and displays the fact that the remaining capacity of the mobile battery 81 is "100%" when the mobile battery 81 is in the fully charged state.

When the mobile battery 81 is in the completely discharged state, the user of the portable device PB is capable of realizing that the mobile battery 81 is in the completely discharged state and that the charging is necessary by viewing the display device 50. Therefore, it is possible to shorten the time during which the display device 50 may not be driven due to the user noticing that the charging of the mobile battery 81 is necessary before the mobile battery 81 reaches the completely discharged state and performing the charging work of the mobile battery 81.

3.5. Modification Examples of Third Embodiment

Specific modified aspects according to the present embodiment will be exemplified hereinafter. Two or more aspects arbitrarily selected from the following examples may be combined, as appropriate, within a scope not being mutually contradicting.

Modification Example 3.1

In the embodiment described above, although a configuration is exemplified in which the stopping circuit 700 includes the built-in battery booster circuit 73 and the built-in battery diode 74, the configuration is not limited to this aspect. For example, the stopping circuit 700 may be provided with a switch instead of the built-in battery diode 74. The main control circuit 11B may turn off the switch of the stopping circuit 700 to stop the supplying of the power from the built-in battery 71 to the display device 50 when the voltage Vb2 of the mobile battery 81 is greater than or equal to the threshold voltage Vth and may turn on the switch of the stopping circuit 700 to cause the power to be supplied from the built-in battery 71 to the display device 50 when the voltage Vb2 of the mobile battery 81 is less than the threshold voltage Vth.

Modification Example 3.2

In the embodiments described above, although the main control circuit 11B has a function of controlling the power supply switch 600 and the built-in battery booster circuit 73, the configuration is not limited to this aspect. For example, the sub-control circuit 12 circuit may have a function of controlling the power supply switch 600 and the built-in battery booster circuit 73. In this case, the sub-control circuit 12 is an example of "a first processor".

Modification Example 3.3

In the embodiments described above, the display device 50 may be capable of displaying information other than the remaining capacity of the mobile battery 81.

For example, when the smart phone 2B reproduces a video on the display device 50, the display device 50 may be capable of displaying information indicating whether or not it is possible to finish the reproduction of the video before the mobile battery 81 and the built-in battery 71 assume the completely discharged state. In this case, the smart phone 2B may be provided with a storage device storing data relating to the video and data relating to the length of time required to reproduce the video. In this case, the main control circuit 11B may determine whether or not it is possible to finish the reproduction of the video stored in the storage device before the mobile battery 81 and the built-in battery 71 assume the completely discharged state and cause the display device 50 to display the result of the determination based on the data stored in the storage device.

Modification Example 3.4

In the embodiments described above, although a configuration is exemplified in which the display unit of the display device 50 displays the remaining capacity of the mobile battery 81, the configuration is not limited to this aspect. For example, the drive element included in the smart phone 2B may perform notification of the remaining capacity of the mobile battery 81. Specifically, the smart phone 2B may include a speaker as the drive element. The speaker may notify the user of the capacity of the mobile battery 81 using audio.

Modification Example 3.5

In the embodiments described above, although a configuration is exemplified in which the display device 50 is "the drive element", the configuration is not limited thereto. For example, if the smart phone 2B includes an imaging element, the imaging element may be an example of "the drive element".

4. Fourth Embodiment

In the present embodiment, a description will be given of a portable device PC including a smart phone 2C which displays an image. In the present embodiment, the smart phone 2C is an example of "a mobile device".

4.1. Outline of Portable Device PC

Figure 22:
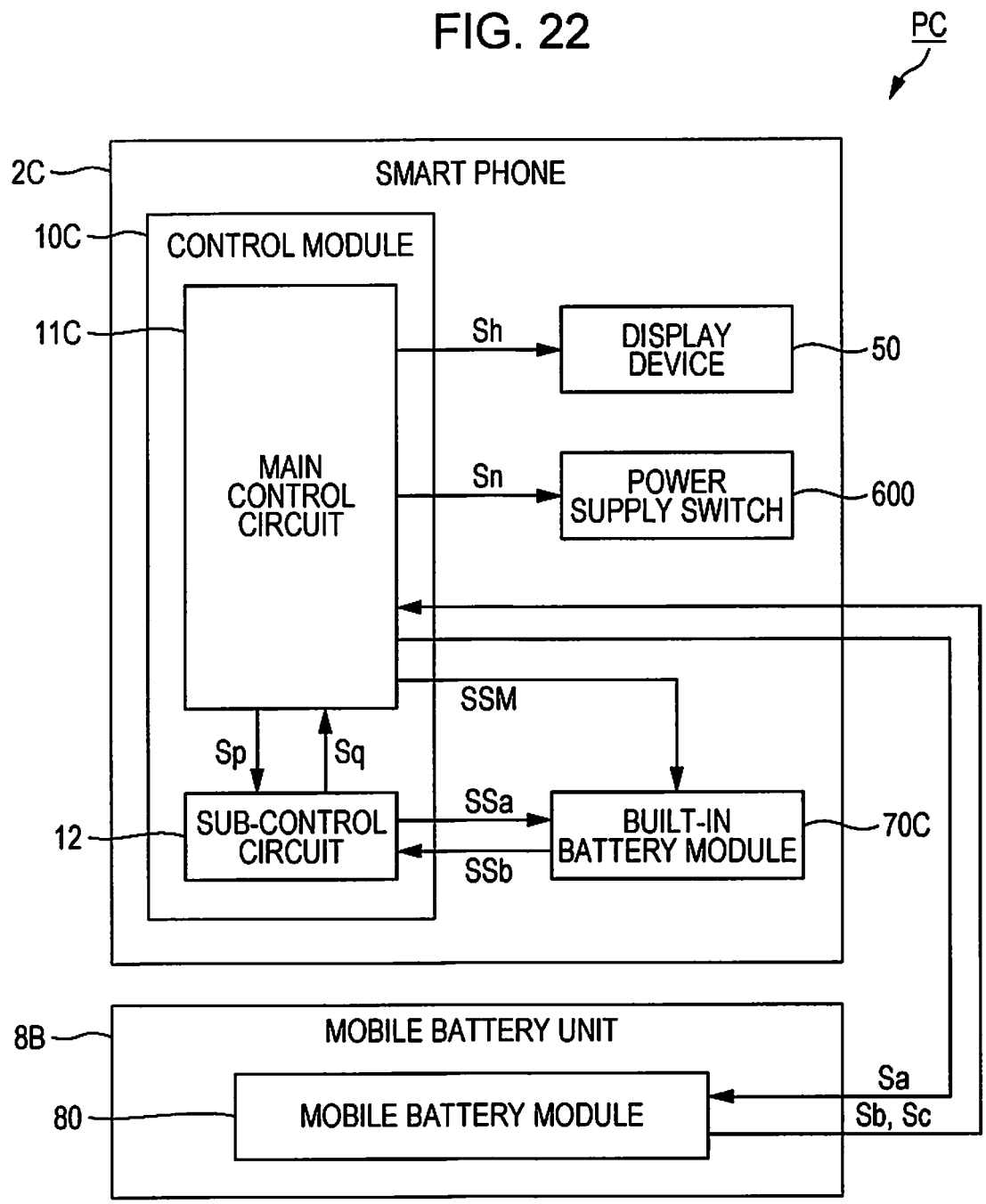
FIG. 22 is a functional block diagram illustrating an example of a functional configuration of a portable device according to a fourth embodiment.

FIG. 22 is a functional block diagram illustrating an example of a functional configuration of the portable device PC. As illustrated in FIG. 22, the portable device PC is provided with the smart phone 2C and the mobile battery unit 8B that is attachable and detachable with respect to the smart phone 2C.

As exemplified in FIG. 22, the smart phone 2C is provided with a control module 10C, the display device 50, a built-in battery module 70C, and the power supply switch 600. The control module 10C controls the parts of the smart phone 2C, the display device 50 is capable of displaying various information, the built-in battery module 70C is capable of supplying power to the parts of the smart phone 2C, and the power supply switch 600 switches between whether or not the smart phone 2C receives the supply of power from the mobile battery unit 8B. In other words, from the perspective of the functional configuration, the smart phone 2C according to the present embodiment differs from the smart phone 2B according to the third embodiment illustrated in FIG. 17 in that the smart phone 2C is provided with the control module 10C instead of the control module 10B and is provided with the built-in battery module 70C instead of the built-in battery module 70.

As exemplified in FIG. 22, the mobile battery unit 8B is provided with the mobile battery module 80 as described above.

In the present embodiment, the display device 50 provided on the smart phone 2C is capable of displaying various information relating to the smart phone 2C and the mobile battery unit 8B and is an example of "the drive element".

In the present embodiment, the built-in battery module 70C is provided with the built-in battery 71. In the present embodiment, the built-in battery 71 provided in the built-in battery module 70C is an example of "the first battery" and the mobile battery 81 provided in the mobile battery module 80 is an example of "the second battery".

In the present embodiment, for example, a case is anticipated in which the control module 10C includes a main control circuit 11C and the sub-control circuit 12. The main control circuit 11C is configured to include a CPU, for example. From the perspective of the functional configuration, the main control circuit 11C differs from the main control circuit 11B according to the third embodiment illustrated in FIG. 17 in that the main control circuit 11C outputs a control signal SSM instead of the control signal SS. In the present embodiment, the main control circuit 11C is an example of "the first processor". In the present embodiment, the sub-control circuit 12 is an example of "the second processor".

In the present embodiment, the main control circuit 11C causes the display unit provided on the display device 50 to display the remaining capacity of the built-in battery 71 and the remaining capacity of the mobile battery 81.

4.2. Circuit Configuration of Portable Device PC

Figure 23:
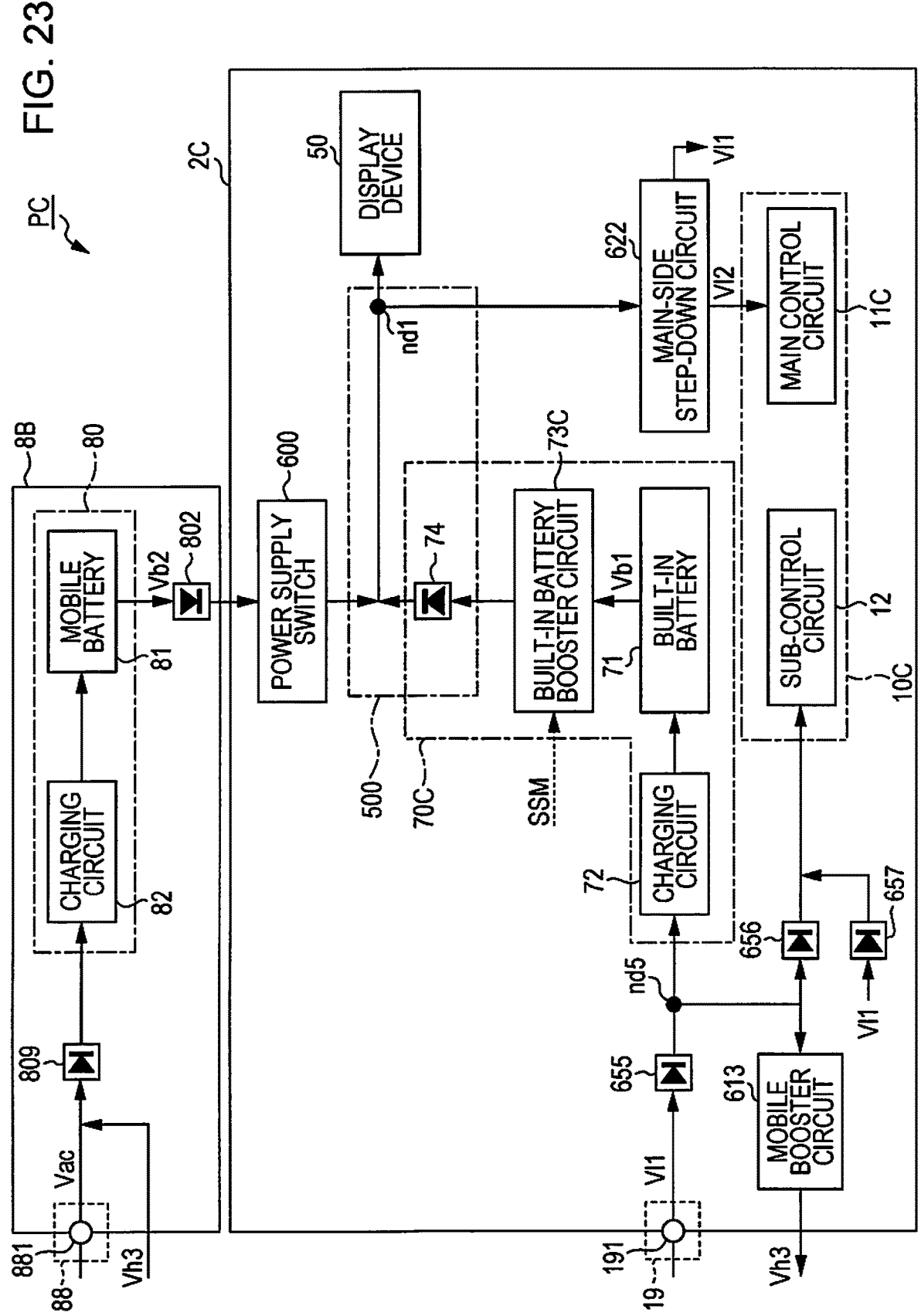
FIG. 23 is an explanatory diagram illustrating an example of a circuit configuration of the portable device.

FIG. 23 is an example of the circuit configuration of the portable device PC. In FIG. 23, to facilitate explanation, of the wiring provided in the portable device PC, notation of the signal lines will be omitted and only the power lines will be denoted.

As described above, the portable device PC is provided with the smart phone 2C and the mobile battery unit 8B.

As illustrated in FIG. 23, from the perspective of the functional configuration, the smart phone 2C differs from the smart phone 2B according to the third embodiment illustrated in FIG. 18 in that the smart phone 2C is provided with the control module 10C instead of the control module 10B and is provided with the built-in battery module 70C instead of the built-in battery module 70. As illustrated in FIG. 23, the built-in battery module 70 is provided with the built-in battery 71, the charging circuit 72, a built-in battery booster circuit 73C, and the built-in battery diode 74. In other words, the built-in battery module 70C differs from the built-in battery module 70 according to the third embodiment illustrated in FIG. 18 in that the built-in battery module 70C is provided with the built-in battery booster circuit 73C instead of the built-in battery booster circuit 73.

In the present embodiment, as illustrated in FIG. 23, in the smart phone 2C, there is a case in which the built-in battery diode 74 and the node nd1 are referred to as a supplying unit 500. The built-in battery booster circuit 73C is an example of "the booster unit". The built-in battery diode 74 is an example of "a diode".

The built-in battery booster circuit 73C boosts the voltage Vb1 output from the built-in battery 71 and supplies the result to the anode of the built-in battery diode 74. In the present embodiment, the built-in battery booster circuit 73C is capable of switching the voltage to be boosted using two boosting modes, a first boosting mode and a second boosting mode, based on the control signal SSM supplied from the main control circuit 11C. Here, the control signal SSM is a signal specifying the boosting mode in the built-in battery booster circuit 73C.

Specifically, when the control signal SSM specifies that the boosting is to be performed using the first boosting mode, the built-in battery booster circuit 73C boosts the voltage Vb1 output by the built-in battery 71 to a first drive voltage Vh11 which is lower than the voltage Vb2 of the mobile battery 81. When the control signal SSM specifies that the boosting is to be performed using the second boosting mode, the built-in battery booster circuit 73C boosts the voltage Vb1 output by the built-in battery 71 to a second drive voltage Vh12 which is a voltage greater than or equal to the first drive voltage Vh11 and is greater than or equal to the threshold voltage Vth.

Even in the present embodiment, the voltage Vb2 is a voltage greater than or equal to the threshold voltage Vth when the mobile battery 81 is in the fully charged state. Therefore, when the voltage Vb2 is a higher voltage than the threshold voltage Vth, the first drive voltage Vh11 is a higher voltage than the voltage Vb1 and is a voltage less than or equal to the threshold voltage Vth. When the voltage Vb2 and the threshold voltage Vth are equal, the first drive voltage Vh11 is a higher voltage than the voltage Vb1 and is a lower voltage than the threshold voltage Vth. In the present embodiment, the threshold voltage Vth is an example of "a first voltage.

The supplying unit 500 supplies the power from the mobile battery 81 to the power supplying target such as the display device 50 when the voltage Vb2 of the mobile battery 81 is greater than or equal to the threshold voltage Vth. The supplying unit 500 supplies the power from the built-in battery 71 to the power supplying target when the voltage Vb2 of the mobile battery 81 is less than the threshold voltage Vth. In other words, the supplying unit 500 preferentially supplies the power from the mobile battery 81 to the power supplying target over supplying the power from the built-in battery 71.

4.3. Power Supplying Mode

Hereinafter, a description will be given of a specific aspect of the supplying of the power to a power supplying target such as the control module 10C and the display device 50 in the portable device PC according to the present embodiment, with reference to FIGS. 24A to 26.

In the portable device PC in the present embodiment, it is possible to supply the power to the power supplying target using two built-in battery charging modes, the built-in battery power supplying mode and the mobile battery power supplying mode.

The main control circuit 11C sets the power supplying mode to the built-in battery power supplying mode or the mobile battery power supplying mode based on one or both of the state signal Sb and the mounting signal Sc.

Figure 24A:
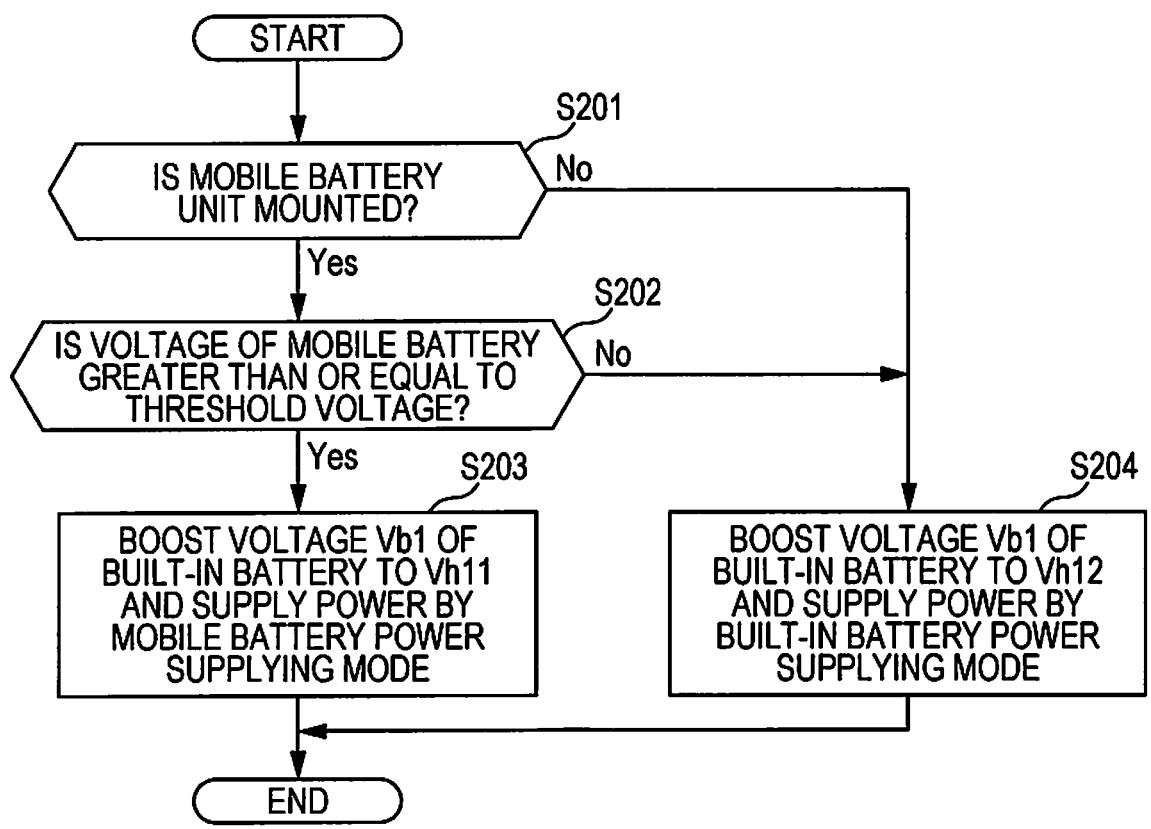
FIG. 24A is a flowchart illustrating an example of a process relating to power supplying in the portable device.

FIG. 24A is a flowchart relating to the setting of the power supplying mode by the main control circuit 11C.

As illustrated in FIG. 24A, in step S201, the main control circuit 11C determines whether or not the mounting signal Sc indicates that the mobile battery unit 8B is mounted to the smart phone 2C.

In step S202, the main control circuit 11C determines whether or not the state signal Sb indicates that the voltage Vb2 supplied from the mobile battery 81 is greater than or equal to the threshold voltage Vth.

When the result of the determination in step S201 is positive and the result of the determination in step S202 is positive, the main control circuit 11C sets the power supplying mode to the mobile battery power supplying mode as step S203 and supplies the control signal SSM specifying the boosting using the first boosting mode to the built-in battery booster circuit 73C.

When the result of the determination in step S201 is negative or the result of the determination in step S202 is negative, the main control circuit 11C sets the power supplying mode to the built-in battery power supplying mode as step S204 and supplies the control signal SSM specifying the boosting using the second boosting mode to the built-in battery booster circuit 73C.

FIG. 24A is an example of the processes relating to the setting of the power supplying mode according to the present embodiment and the main control circuit 11C may set the power supplying mode using different processes from those of FIG. 24A.

Figure 24B:
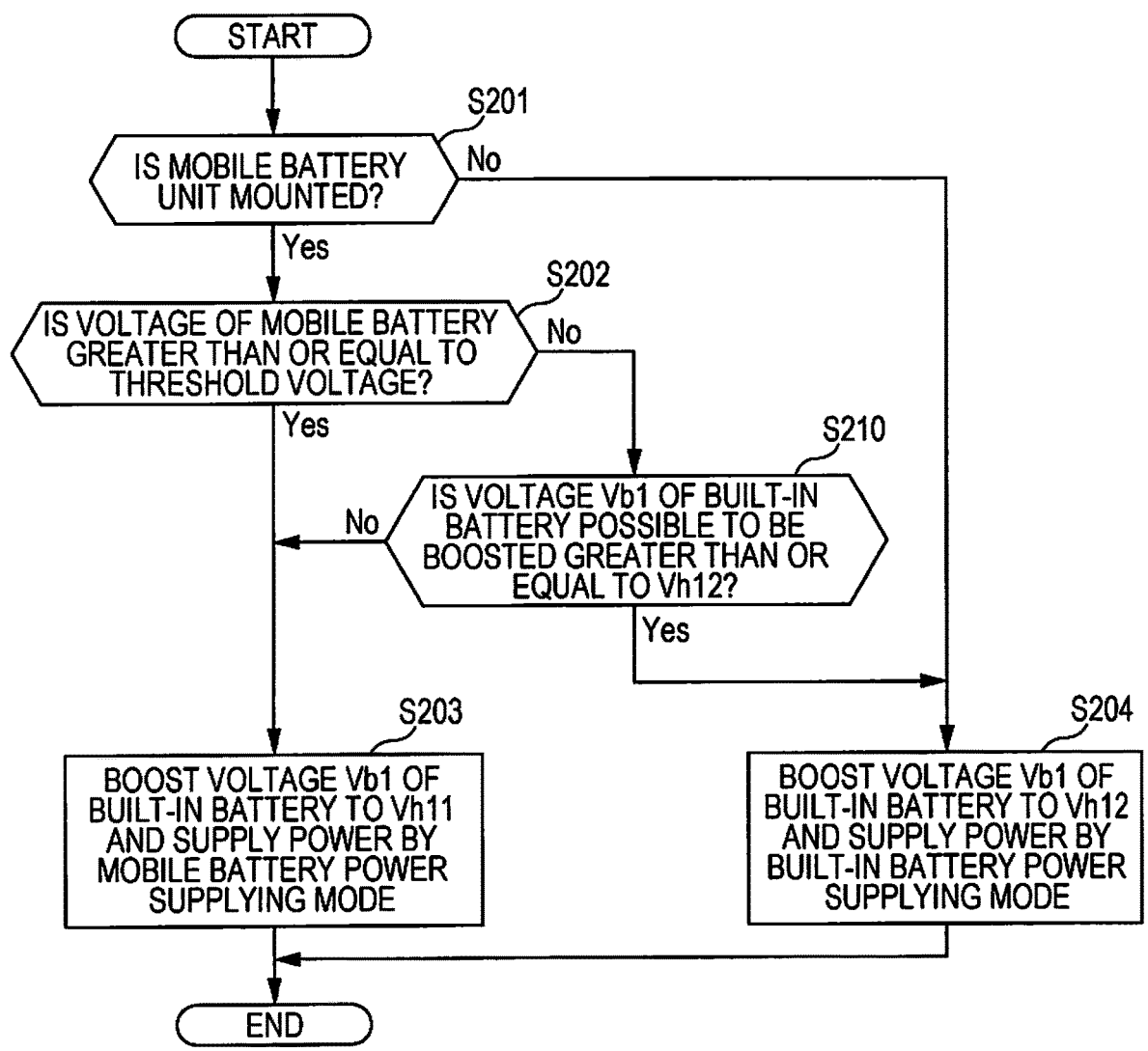
FIG. 24B is a flowchart illustrating an example of a process relating to the power supplying in the portable device.

FIG. 24B is a flowchart illustrating another example of processes relating to the setting of the power supplying mode by the main control circuit 11C.

As illustrated in FIG. 24B, when the result of the determination in step S201 is positive and the result of the determination in step S202 is negative, the main control circuit 11C determines whether or not it is possible to boost the voltage Vb1 of the built-in battery 71 to greater than or equal to the second drive voltage Vh12 using the built-in battery booster circuit 73C (S210). In step S210, the main control circuit 11C may determine whether or not it is possible to boost the voltage Vb1 of the built-in battery 71 to greater than or equal to the threshold voltage Vth using the built-in battery booster circuit 73C. In step S210, the main control circuit 11C may determine whether or not the voltage Vb1 of the built-in battery 71 is greater than or equal to the reference voltage Vb0.

When the result of the determination in step S201 is positive and the result of the determination in step S202 is positive, or when the result of the determination in step S210 is negative, the main control circuit 11C sets the power supplying mode to the mobile battery power supplying mode and supplies the control signal SSM specifying the boosting using the first boosting mode to the built-in battery booster circuit 73C (S203). On the other hand, when the result of the determination in step S201 is negative or the result of the determination in step S210 is positive, the main control circuit 11C sets the power supplying mode to the built-in battery power supplying mode and supplies the control signal SSM specifying the boosting using the second boosting mode to the built-in battery booster circuit 73C (S204).

In this manner, in the present embodiment, the main control circuit 11C may set the power supplying mode such that the supplying of power from the mobile battery 81 is prioritized over the supplying of power from the built-in battery 71, as exemplified in FIG. 24A or FIG. 24B. The processes relating to the setting of the power supplying mode in the present embodiment are not limited to the examples illustrated in FIG. 24A or FIG. 24B, and may be any processes as long as the supplying of power from the mobile battery 81 is prioritized over the supplying of power from the built-in battery 71.

Figure 25:
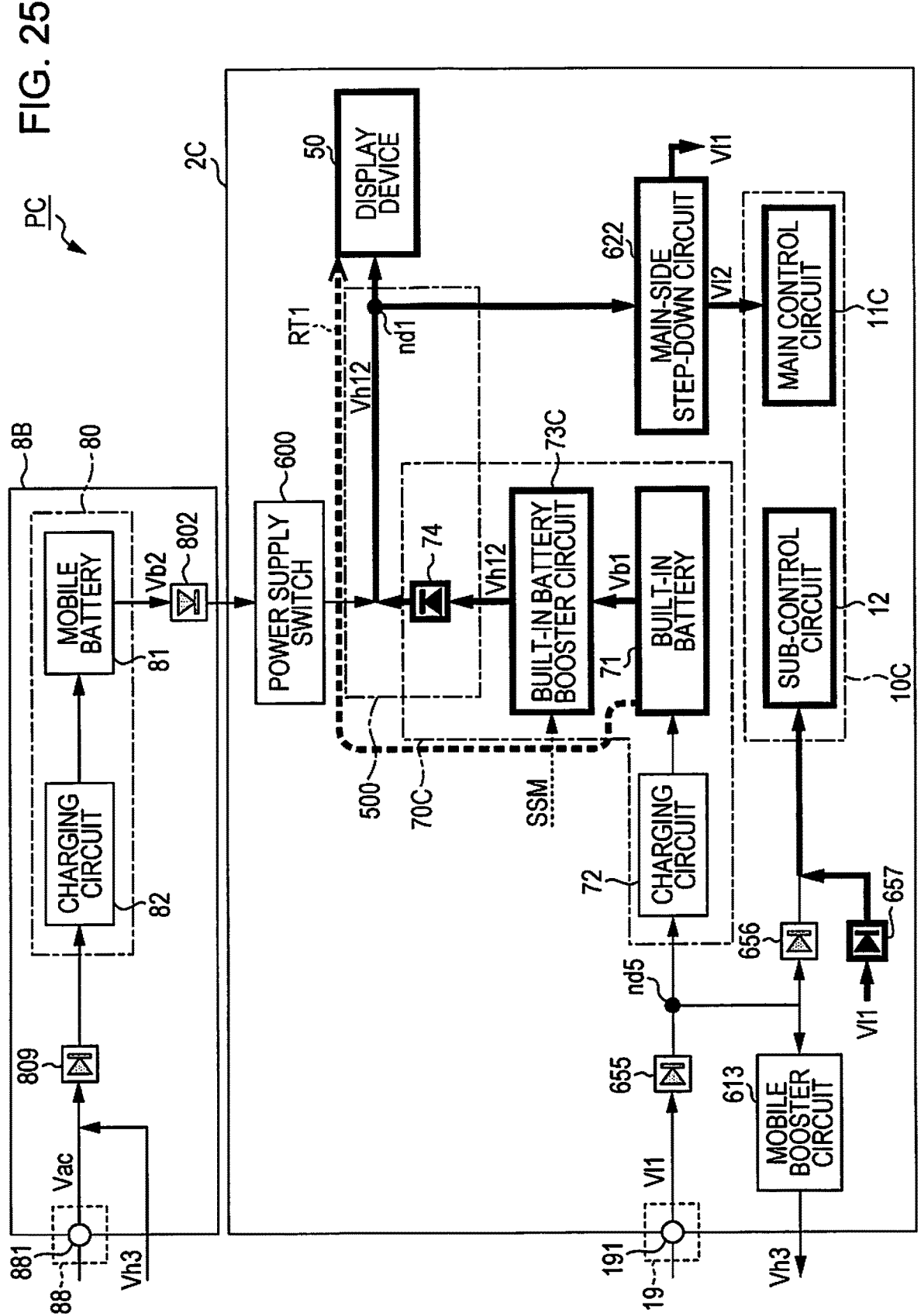
FIG. 25 is an explanatory diagram illustrating an example of the power supplying by a built-in battery power supplying mode.

FIG. 25 is a diagram illustrating the supplying of power using a built-in battery power supplying mode.

When the main control circuit 11C sets the power supplying mode to the built-in battery power supplying mode, the main control circuit 11C supplies the control signal SSM specifying the second boosting mode to the built-in battery booster circuit 73C. In this case, the built-in battery booster circuit 73C boosts the voltage Vb1 output by the built-in battery 71 to the second drive voltage Vh12. When the main control circuit 11C sets the power supplying mode to the built-in battery power supplying mode, the main control circuit 11C turns off the power supply switch 600 by supplying the specification signal Sn specifying off to the power supply switch 600.

In the built-in battery power supplying mode, the built-in battery booster circuit 73C boosts the voltage Vb1 supplied from the built-in battery 71 to the second drive voltage Vh12 and supplies the post-boosting second drive voltage Vh12 to the node nd1 via the built-in battery diode 74. The main-side step-down circuit 622 steps down the second drive voltage Vh12 supplied thereto via the node nd1 to the voltage V12 and the voltage V11 and supplies the post-step-down voltages V12 and V11 to the control module 10C. The second drive voltage Vh12 supplied to the main-side step-down circuit 622 via the node nd1 is supplied to the display device 50.

In the present embodiment, in the same manner as the third embodiment, the built-in battery power supply path RT1 which has the built-in battery 71 as the starting point, goes via the built-in battery booster circuit 73C, the built-in battery diode 74, and the node nd1, and has the display device 50 as the ending point is a path for the built-in battery 71 to supply the power to the display device 50 and is an example of "the first path".

Figure 26:
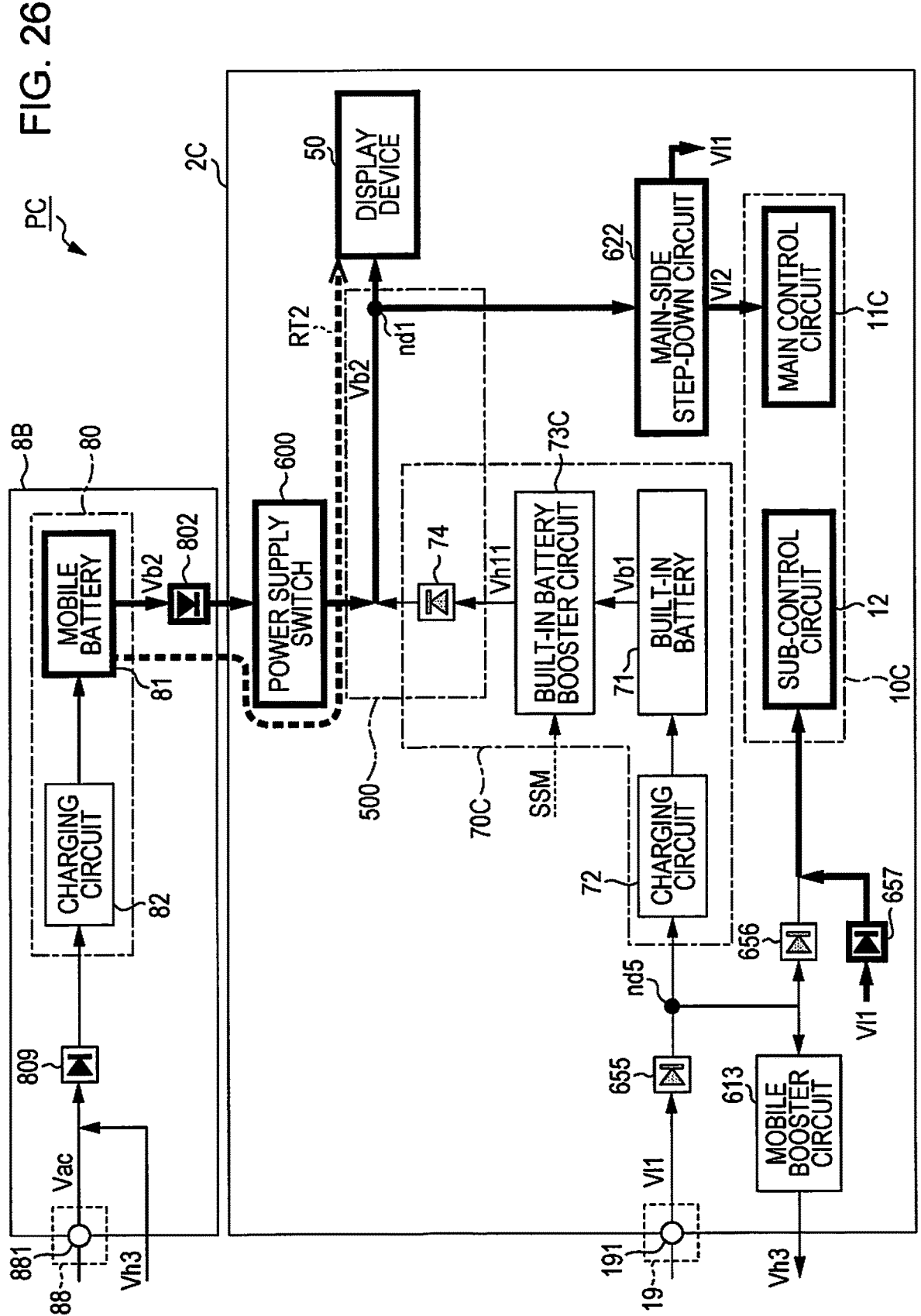
FIG. 26 is an explanatory diagram illustrating an example of the power supplying by a mobile battery power supplying mode.

FIG. 26 is a diagram illustrating the supplying of power using a mobile battery power supplying mode.

When the main control circuit 11C sets the power supplying mode to the mobile battery power supplying mode, the main control circuit 11C supplies the control signal SSM specifying the first boosting mode to the built-in battery booster circuit 73C. In this case, the built-in battery booster circuit 73C boosts the voltage Vb1 output by the built-in battery 71 to the first drive voltage Vh11. When the main control circuit 11C sets the power supplying mode to the mobile battery power supplying mode, the main control circuit 11C turns on the power supply switch 600 by supplying the specification signal Sn specifying on to the power supply switch 600.

In the mobile battery power supplying mode, since the power supply switch 600 is turned on, the cathode of the mobile-side diode 802 and the cathode of the built-in battery diode 74 are electrically coupled to each other. The voltage Vb2 supplied to the anode of the mobile-side diode 802 is a higher voltage than the first drive voltage Vh11 supplied to the anode of the built-in battery diode 74. Therefore, since the built-in battery diode 74 is turned off even as a current flows from the mobile-side diode 802 into the node nd1, a current will not flow from the built-in battery diode 74 into the node nd1. In this manner, in the mobile battery power supplying mode, the mobile battery 81 supplies the voltage Vb2 to the node nd1 via the mobile-side diode 802 and the power supply switch 600.

In the mobile battery power supplying mode, the main-side step-down circuit 622 steps down the voltage Vb2 supplied thereto from the mobile battery 81 via the node nd1 to the voltage V12 and the voltage V11 and supplies the post-step-down voltages V12 and V11 to the control module 10C. The voltage Vb2 supplied to the main-side step-down circuit 622 via the node nd1 is supplied to the display device 50.

Even in the present embodiment, mobile battery power supply path RT2 which has the mobile battery 81 as the starting point, goes via the mobile-side diode 802, the power supply switch 600, and the node nd1, and has the display device 50 as the ending point is a path for the mobile battery 81 to supply the power to the display device 50 and is an example of "the second path". In other words, the node nd1 is "a node shared by the first path and the second path". In the present embodiment, the node nd1 may be bus wiring.

4.4. Effects of Fourth Embodiment

Hereinabove, the smart phone 2C according to the present embodiment is provided with the display device 50, the built-in battery 71, and the supplying unit 500 which supplies one of the power output by the built-in battery 71 and the power output by the mobile battery 81 to the display device 50, the supplying unit 500 prioritizing the supplying of the power output by the built-in battery 71 to the display device 50 over the supplying of the power output by the mobile battery 81 to the display device 50.

In this manner, according to the present embodiment, since the power output by the mobile battery 81 is preferentially supplied to the display device 50 over the power output by the built-in battery 71 provided in the smart phone 2C, it is possible to suppress a reduction in the remaining capacity of the built-in battery 71 provided in the smart phone 2C as compared to an aspect in which the power output by the built-in battery 71 is preferentially supplied to the display device 50 over the power output by the mobile battery 81. Accordingly, according to the present embodiment, it is possible to increase the portability of the smart phone 2C.

According to the present embodiment, the mobile battery 81 is capable of being attached and detached with respect to the smart phone 2C.

Therefore, it is possible to lengthen the time during which it is possible to drive the smart phone 2C without supplying the power from a commercial power source such as an AC power source as compared to a case in which it is not possible to mount the mobile battery 81 to the smart phone 2C according to the present embodiment. Accordingly, according to the present embodiment, it is possible to increase the portability of the smart phone 2C as compared to a case in which the mobile battery 81 may not be mounted to the smart phone 2C.

The smart phone 2C according to the present embodiment is provided with the built-in battery booster circuit 73 which boosts the voltage of the built-in battery 71 to the first drive voltage Vh11 which is lower than the voltage of the mobile battery 81 when the voltage of the mobile battery 81 is greater than or equal to the threshold voltage Vth necessary for the driving of the display device 50, In the smart phone 2C according to the present embodiment, the supplying unit 500 supplies the power from the mobile battery 81 to the display device 50 when the voltage of the mobile battery 81 is greater than or equal to the threshold voltage Vth.

In the smart phone 2C according to the present embodiment, when the power from the mobile battery 81 is supplied to the display device 50, the output of the power from the built-in battery 71 is not stopped and the voltage Vb1 of the built-in battery 71 is boosted to the first drive voltage Vh11 which is lower than the voltage Vb2 of the mobile battery 81. The time taken from a state in which the voltage Vb1 of the built-in battery 71 is boosted to the first drive voltage Vh11 until the voltage Vb1 of the built-in battery 71 is boosted to the threshold voltage Vth is shorter than the time taken from a state in which the voltage Vb1 of the built-in battery 71 is not boosted or a state in which the output of the power of the built-in battery 71 is stopped until the voltage Vb1 of the built-in battery 71 is boosted to the threshold voltage Vth. Therefore, according to the present embodiment, when the mobile battery unit 8B is unintentionally removed from the smart phone 2C, it is possible to shorten the time from the mobile battery unit 8B being unintentionally removed from the smart phone 2C and the supply of power to the display device 50 stopping until the supply of power to the display device 50 is resumed as compared to an aspect in which the voltage Vb1 of the built-in battery 71 is not boosted. In other words, according to the present embodiment, even when the mobile battery unit 8B is unintentionally removed from the smart phone 2C, it is possible to swiftly restart the operation of the display device 50 and it is possible to stabilize the operation of the display device 50.

For the causes of the mobile battery unit 8B being unintentionally removed from the smart phone 2C, the two causes indicated hereinafter exist, for example. The first cause is the mating portions between the smart phone 2C and the mobile battery unit 8B being degraded through usage of the portable device PC over a long period. The second cause is external shock being applied to the portable device PC, the smart phone 2C falling from the palm of the hand of the user, or the like.

In a mobile device having a merit in ease of carrying, freedom of placement and ability to use at an arbitrary site are points in demand. In other words, there is a demand for being able to use the mobile device without relying on a site of an AC power source.

In the smart phone 2C according to the present embodiment, the power of the mobile battery 81 is used preferentially when the voltage of the mobile battery 81 is greater than or equal to the threshold voltage Vth. When the power of the mobile battery 81 is used and the voltage of the mobile battery 81 is less than the threshold voltage Vth, it is possible to operate the smart phone 2C using the built-in battery 71 while charging the mobile battery 81 using the AC power source. In a case in which it is possible to remove the mobile battery unit 8B from the smart phone 2C, the AC power source and the smart phone 2C may be separated from each other when the mobile battery 81 is charged using the AC power source. In this manner, according to the present embodiment, since the installation site of the smart phone 2C is not limited even in a case by prioritizing the power supplying from the mobile battery 81, it is possible to perform the charging of the mobile battery 81 while driving the display device 50 at an arbitrary site.

On the other hand, hypothetically, in a case in which the power is preferentially supplied from the built-in battery 71 to the display device 50, when the built-in battery 71 assumes the completely discharged state, it is necessary to supply the power from the mobile battery 81. When the smart phone 2C receives the power supplying from the mobile battery 81, the mobile battery unit 8B may not be removed from the smart phone 2C. When the mobile battery 81 assumes the completely discharged state, the display device 50 completely stops being driven. Accordingly, when the power is preferentially supplied from the built-in battery 71 to the display device 50, it is necessary to move the smart phone 2C to the vicinity of the AC power source in order to continue the driving of the display device 50 even after the mobile battery 81 assumes the completely discharged state. In contrast, according to the present embodiment, even when the usage site of the smart phone 2C is an arbitrary site, it is possible to shorten the time during which the display device 50 may not be driven as compared to a case in which the power supplying from the built-in battery 71 is prioritized. According to the present embodiment, since the usage site of the smart phone 2C is not limited, it is possible to use the smart phone 2C for a long time without the usage site being limited as compared to a case in which the power supplying from the built-in battery 71 is prioritized.

In the smart phone 2C according to the present embodiment, the built-in battery booster circuit 73 boosts the voltage of the built-in battery 71 to the second drive voltage Vh12 which is greater than or equal to the threshold voltage Vth when the voltage of the mobile battery 81 is less than the threshold voltage Vth. In the smart phone 2C according to the present embodiment, the supplying unit 500 supplies the power from the built-in battery 71 to the display device 50 when the voltage of the mobile battery 81 is less than the threshold voltage Vth.

Therefore, in the smart phone 2C according to the present embodiment, since it is possible to supply the power from the built-in battery 71 to the display device 50 even when the voltage of the mobile battery 81 is less than the threshold voltage Vth, it is possible to realize the stable operation of the display device 50.

In the smart phone 2C according to the present embodiment, the voltage of the built-in battery 71 is lower than the threshold voltage Vth, the supplying unit 500 is provided with the node nd1 shared by the built-in battery power supply path RT1 and the mobile battery power supply path RT2, and the built-in battery diode 74, and the built-in battery booster circuit 73 is provided on the built-in battery power supply path RT1. The built-in battery power supply path RT1 supplies the power from the built-in battery 71 to the display device 50, the built-in battery power supply path RT2 supplies the power from the mobile battery 81 to the display device 50, and the built-in battery diode 74 is provided on the built-in battery power supply path RT1, the anode of the built-in battery diode 74 is electrically coupled to the built-in battery booster circuit 73, and the cathode of the built-in battery diode 74 is electrically coupled to the node nd1.

As described above, according to the present embodiment, when the voltage Vb2 of the mobile battery 81 is greater than or equal to the threshold voltage Vth, the voltage Vb1 of the built-in battery 71 is boosted to the first drive voltage Vh11 by the built-in battery booster circuit 73. Therefore, according to the present embodiment, when the voltage Vb2 of the mobile battery 81 is greater than or equal to the threshold voltage Vth, it is possible to turn off the built-in battery diode 74. In other words, according to the present embodiment, when the voltage Vb2 of the mobile battery 81 is greater than or equal to the threshold voltage Vth, it is possible to stop the power supplying from the built-in battery 71 and to prioritize the power supplying from the mobile battery 81. Therefore, according to the present embodiment, even when the usage site of the smart phone 2C is an arbitrary site, it is possible to shorten the time during which the display device 50 may not be driven as compared to a case in which the power supplying from the built-in battery 71 is prioritized.

In the smart phone 2C according to the present embodiment, the maximum capacity of the mobile battery 81 is greater than the maximum capacity of the built-in battery 71.

Therefore, in the smart phone 2C according to the present embodiment, it is possible use the smart phone 2C for a long time in a single charge as compared to a case in which the maximum capacity of the mobile battery 81 is less than the maximum capacity of the built-in battery 71.

In the smart phone 2C according to the present embodiment, the display device 50 is provided with the display unit which displays the capacity of the mobile battery 81. When the mobile battery 81 is in the completely discharged state, the user of the portable device PC is capable of realizing that the mobile battery 81 is in the completely discharged state and that the charging is necessary by viewing the display device 50.

4.5. Modification Examples of Fourth Embodiment

Specific modified aspects according to the present embodiment will be exemplified hereinafter.

Two or more aspects arbitrarily selected from the following examples may be combined, as appropriate, within a scope not being mutually contradicting.

Modification Example 4.1

In the embodiments described above, although the main control circuit 11C has a function of controlling the built-in battery booster circuit 73, the configuration is not limited to this aspect. For example, the sub-control circuit 12 may have a function of controlling the built-in battery booster circuit 73.

Modification Example 4.2

In the embodiments described above, the display device 50 may be capable of displaying information other than the remaining capacity of the mobile battery 81.

Modification Example 4.3

In the embodiments described above, although a configuration is exemplified in which the display unit of the display device 50 displays the remaining capacity of the mobile battery 81, the configuration is not limited to this aspect. For example, the drive element included in the smart phone 2C may perform notification of the remaining capacity of the mobile battery 81. Specifically, the smart phone 2C may include a speaker as the drive element.

5. Fifth Embodiment

In the present embodiment, a description will be given of the positional relationship between a main control circuit 11Z, the built-in battery 71, the mobile battery 81, a drive element 900, a power supply terminal 181Z, and the power supply terminal 191 which are provided in a portable device PZ. The portable device PZ according to the present embodiment is a collective term for the portable device P, the portable device PA, the portable device PB, and the portable device PC. The main control circuit 11Z is a collective term for the main control circuit 11, the main control circuit 11A, the main control circuit 11B, and the main control circuit 11C. The drive element 900 is a collective term for the recording head 30 and the display device 50. A power supply terminal 181Z is a collective term for the power supply terminal 181 provided in the mobile printer 1, the power supply terminal 181 provided in the smart phone 2A, the power supply terminal 881 provided in the smart phone 2B, and the power supply terminal 881 provided in the smart phone 2C.

5.1. Outline of Portable Device PZ

The portable device PZ according to the present embodiment is provided to with a mobile device 2Z and a mobile battery unit 8Z. Here, the mobile device 2Z is a collective term for the mobile printer 1, the smart phone 2A, the smart phone 2B, and the smart phone 2C. The mobile battery unit 8Z is a collective term for the mobile battery unit 8, the mobile battery unit 8A, and the mobile battery unit 8B.

The mobile device 2Z is provided with a control module 10Z including the main control circuit 11Z and the sub-control circuit 12, a built-in battery module 70Z including the built-in battery 71, and the drive element 900. Here, the control module 10Z is a collective term for the control module 10, the control module 10A, the control module 10B, and the control module 10C. In the present embodiment, the main control circuit 11Z provided in the control module 10Z is an example of "the processor". The built-in battery module 70Z is a collective term for the built-in battery module 70 and the built-in battery module 70C. In the present embodiment, the built-in battery 71 provided in the built-in battery module 70Z is an example of "the first battery".

The mobile battery unit 8Z is provided with the mobile battery module 80 including a mobile battery 81. In the present embodiment, the mobile battery 81 is an example of "the second battery".

The portable device PZ according to the present embodiment is provided with the power supply terminal 181Z and the power supply terminal 191. Here, the power supply terminal 181Z is an example of "the first terminal". The power supply terminal 191 is an example of "the second terminal".

5.2. Power Supplying Path

As described above, the mobile battery 81, the built-in battery 71, the main control circuit 11Z, the drive element 900, the power supply terminal 181Z, and the power supply terminal 191 are electrically coupled to each other via a power bus 100. The power bus 100 may configure the node nd1 described above, of the power lines provided in the portable device PZ. In the present embodiment, the power lines including the power bus 100 are an example of "power wiring".

Figure 27:
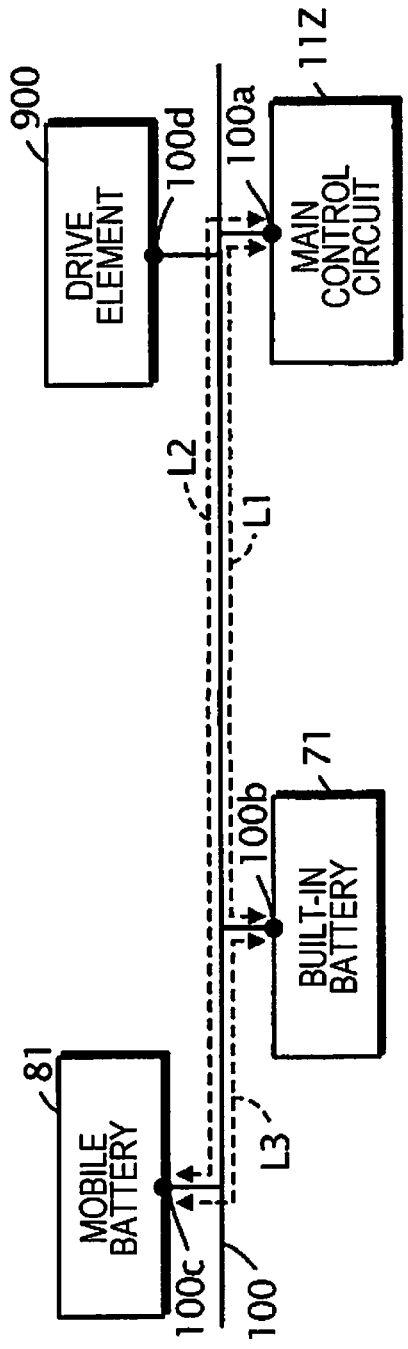
FIG. 27 is an explanatory diagram illustrating an example of a power bus provided in a portable device according to a fifth embodiment.
Figure 28:
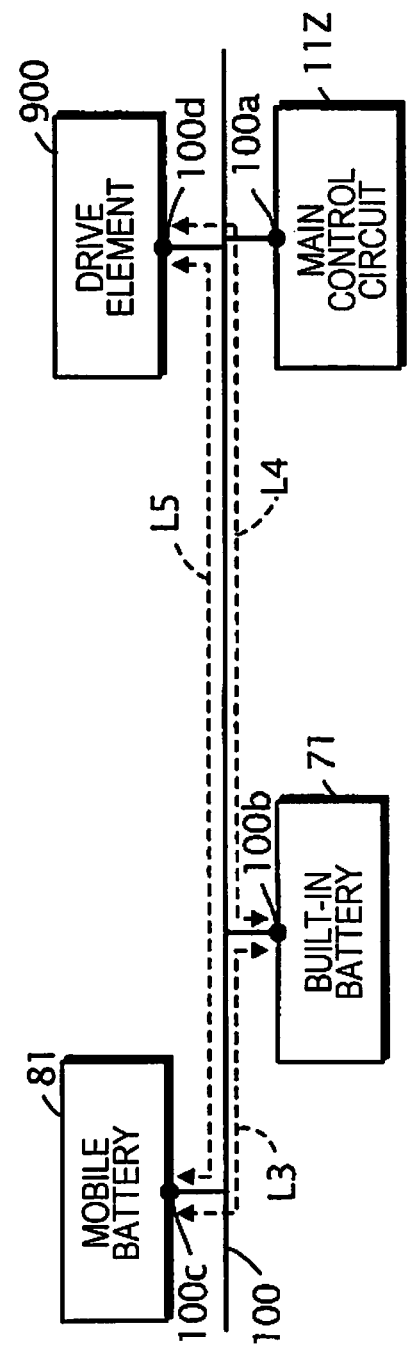
FIG. 28 is an explanatory diagram illustrating an example of the power bus.

FIGS. 27 and 28 are conceptual diagrams for explaining the electrical coupling relationships between the mobile battery 81, the built-in battery 71, the main control circuit 11Z, and the drive element 900 according to the power bus 100.

As illustrated in FIGS. 27 and 28, the power bus 100 electrically couples the main control circuit 11Z, the drive element 900, the built-in battery 71, and the mobile battery 81 to each other. The power bus 100 is electrically coupled to the mobile battery 81 when the mobile battery unit 8Z is mounted to the mobile device 2Z. Hereinafter, in the power lines provided in the portable device PZ, a coupling location between the power line electrically coupled to the power bus 100 and the main control circuit 11Z will be referred to as "a first location 100a". In the power lines provided in the portable device PZ, a coupling location between the power line electrically coupled to the power bus 100 and the built-in battery 71 will be referred to as "a second location 100b". In the power lines provided in the portable device PZ, a coupling location between the power line electrically coupled to the power bus 100 and the mobile battery 81 will be referred to as "a third location 100c". In the power lines provided in the portable device PZ, a coupling location between the power line electrically coupled to the power bus 100 and the drive element 900 will be referred to as "a fourth location 100d".

As illustrated in FIG. 27, a wiring length L1 between the main control circuit 11Z and the built-in battery 71 in the power line including the power bus 100 is shorter than a wiring length L2 between the main control circuit 11Z and the mobile battery 81 in the power line including the power bus 100. A wiring length L3 between the mobile battery 81 and the built-in battery 71 in the power line including the power bus 100 is shorter than the wiring length L2 between the mobile battery 81 and the main control circuit 11Z in the power line including the power bus 100.

Therefore, the power line including the power bus 100 includes a first wiring portion from the third location 100c to the first location 100a and a second wiring portion which electrically couples the first wiring portion and the second location 100b to each other. Since the second location 100b is electrically coupled to the built-in battery 71, a voltage from the built-in battery 71 is supplied to the first wiring portion via the second wiring portion.

Therefore, since the voltage from the built-in battery 71 with respect to the first wiring portion is set, even if noise such as static electricity generated when attaching or removing the mobile battery unit 8Z with respect to the mobile device 2Z enters the first wiring portion from the third location 100c, fluctuations in the voltage of the first wiring portion originating in the noise will be suppressed by the built-in battery 71. Accordingly, the main control circuit 11Z electrically coupled to the first location 100a is not easily influenced by the noise.

As illustrated in FIG. 28, a wiring length L4 between the drive element 900 and the built-in battery 71 in the power line including the power bus 100 is shorter than a wiring length L5 between the drive element 900 and the mobile battery 81 in the power line including the power bus 100. The wiring length L3 is shorter than the wiring length L5.

Therefore, even if noise such as static electricity generated when attaching or removing the mobile battery unit 8Z with respect to the mobile device 2Z enters the first wiring portion from the third location 100c, fluctuations in the voltage of the first wiring portion originating in the noise will be suppressed by the built-in battery 71. Therefore, the drive element 900 electrically coupled to the fourth location 100d is not easily influenced by the noise.

Figures 29, 30:
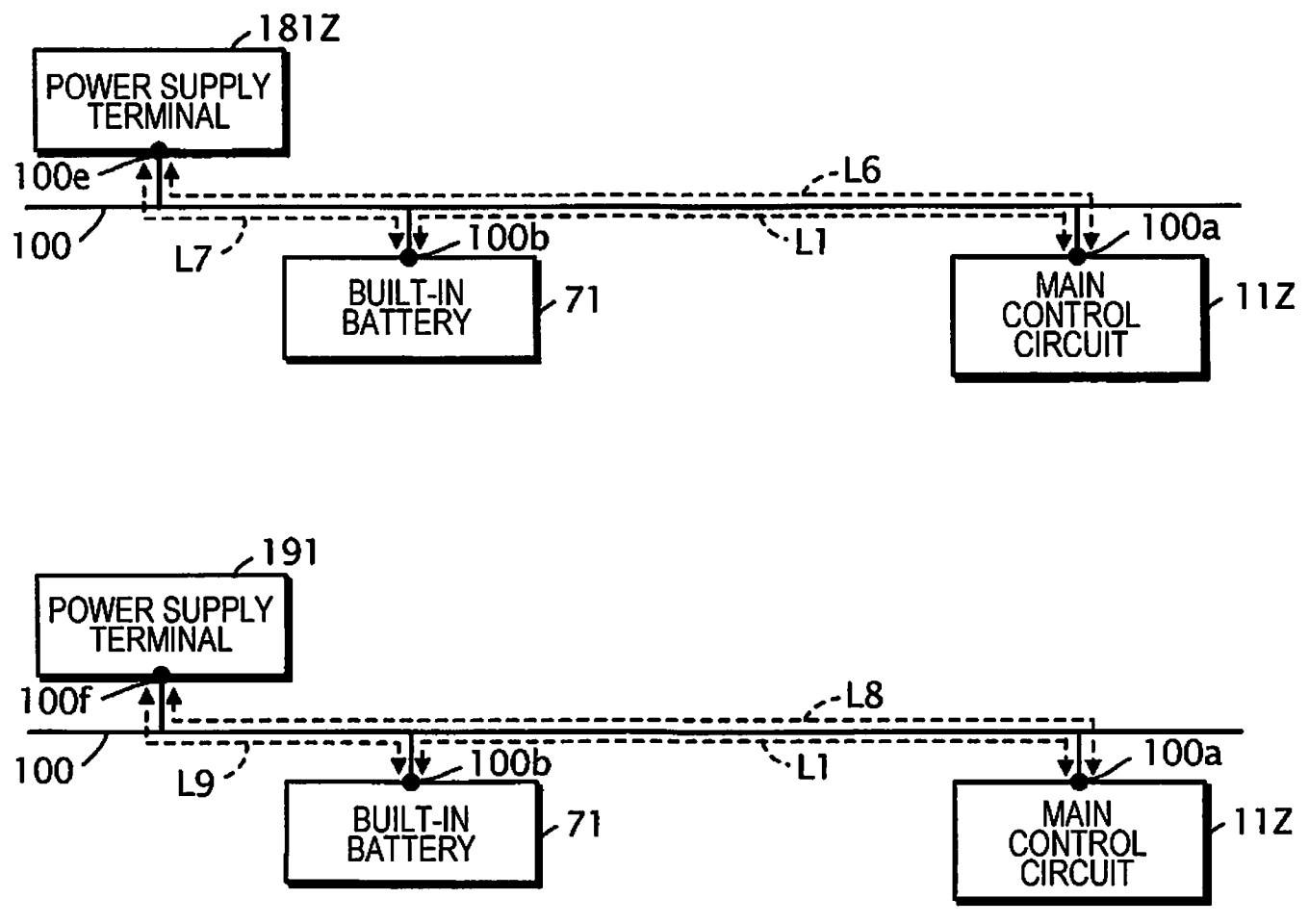

FIGS. 29 and 30 are conceptual diagrams for explaining the electrical coupling relationships between the power supply terminal 181Z, the power supply terminal 191, the built-in battery 71, and the main control circuit 11Z according to the power bus 100.

As illustrated in FIGS. 29 and 30, the power bus 100 electrically couples the main control circuit 11Z, the built-in battery 71, the power supply terminal 181Z, and the power supply terminal 191 to each other. Hereinafter, in the power lines provided in the portable device PZ, a coupling location between the power line electrically coupled to the power bus 100 and the power supply terminal 181Z will be referred to as "a fifth location 100e". In the power lines provided in the portable device PZ, a coupling location between the power line electrically coupled to the power bus 100 and the power supply terminal 191 will be referred to as "a sixth location 100f".

As illustrated in FIG. 29, the wiring length L1 between the main control circuit 11Z and the built-in battery 71 in the power line including the power bus 100 is shorter than a wiring length L6 between the main control circuit 11Z and the power supply terminal 181Z in the power line including the power bus 100. A wiring length L7 between the power supply terminal 181Z and the built-in battery 71 in the power line including the power bus 100 is shorter than the wiring length L6 between the power supply terminal 181Z and the main control circuit 11Z in the power line including the power bus 100.

In other words, in the present embodiment, the coupling location between the power line electrically coupled to the built-in battery 71 and the power bus 100 is set on a path joining the main control circuit 11Z and the power supply terminal 181Z to each other in the power bus 100. Therefore, even if noise such as potential fluctuation generated when starting or ending the power supplying from the power supply terminal 181Z enters the power bus 100, since the voltage is also supplied to the power bus 100 from the built-in battery 71, the potential fluctuation of the power bus 100 originating in the noise is suppressed by the built-in battery 71. Accordingly, the main control circuit 11Z electrically coupled to the power bus 100 is not easily influenced by the noise.

As illustrated in FIG. 30, the wiring length L1 between the main control circuit 11Z and the built-in battery 71 in the power line including the power bus 100 is shorter than a wiring length L8 between the main control circuit 11Z and the power supply terminal 191 in the power line including the power bus 100. A wiring length L9 between the power supply terminal 191 and the built-in battery 71 in the power line including the power bus 100 is shorter than the wiring length L8 between the power supply terminal 191 and the main control circuit 11Z in the power line including the power bus 100.

In other words, in the present embodiment, the coupling location between the power line electrically coupled to the built-in battery 71 and the power bus 100 is set on a path joining the main control circuit 11Z and the power supply terminal 191 to each other in the power bus 100. Therefore, even if noise such as potential fluctuation generated when starting or ending the power supplying from the power supply terminal 191 enters the power bus 100, since the voltage is also supplied to the power bus 100 from the built-in battery 71, the potential fluctuation of the power bus 100 originating in the noise is suppressed by the built-in battery 71. Accordingly, the main control circuit 11Z electrically coupled to the power bus 100 is not easily influenced by the noise.

6. Sixth Embodiment

In the present embodiment, a description will be given of the positional relationship between the main control circuit 11Z, the sub-control circuit 12, the built-in battery 71, and the mobile battery 81 which are provided in the portable device PZ.

6.1. Outline of Portable Device PZ

The portable device PZ according to the present embodiment is provided to with the mobile device 2Z and the mobile battery unit 8Z.

The mobile device 2Z is provided with the control module 10Z including the main control circuit 11Z and the sub-control circuit 12, the built-in battery module 70Z including the built-in battery 71, and the drive element 900. In the present embodiment, the main control circuit 11Z provided in the control module 10Z is an example of "the first processor" and the sub-control circuit 12 provided in the control module 10Z is an example of "the second processor". In the present embodiment, the built-in battery 71 provided in the built-in battery module 70Z is an example of "the first battery".

The mobile battery unit 8Z is provided with the mobile battery module 80 including a mobile battery 81. In the present embodiment, the mobile battery 81 is an example of "the second battery".

6.2. Positional Relationship Between Control Module and Battery

Since the control module 10Z emits heat together with the execution of the various processes, the control module 10Z also serves as a heat source. Since the mobile device 2Z is provided with the main control circuit 11Z and the sub-control circuit 12 as a control unit controlling the mobile device 2Z, it is possible to distribute the heat source as compared to a configuration in which the mobile device 2Z is controlled by a single control circuit.

In the main control circuit 11Z and the sub-control circuit 12, the greater the power consumption, the greater the heat emission amount. Here, the power consumption is the rated power dissipation, for example. As described above, the main control circuit 11Z controls the built-in battery module 70Z including the drive element 900 and the built-in battery 71, and the mobile battery module 80 including the mobile battery 81. Meanwhile, the sub-control circuit 12 controls the built-in battery module 70Z. Therefore, the main control circuit 11Z has a greater processing amount and a greater power consumption than the sub-control circuit 12.

In the present embodiment, a case is anticipated in which the number of cores in the CPU provided in the main control circuit 11Z is greater than the number of cores in the CPU provided in the sub-control circuit 12. In the present embodiment, a case is anticipated in which the maximum number of threads of the CPU provided in the main control circuit 11Z is greater than the maximum number of threads of the CPU provided in the sub-control circuit 12.

Therefore, in the present embodiment, the heat emission amount of the main control circuit 11Z is greater than the heat emission amount of the sub-control circuit 12.

Figure 31:
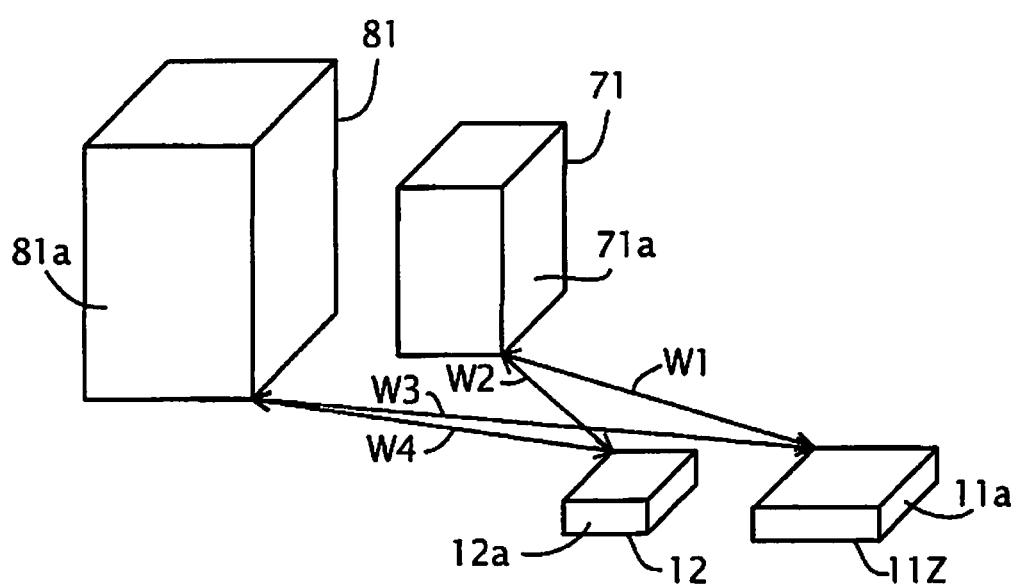
FIG. 31 is an explanatory diagram illustrating a positional relationship between a main control circuit and the built-in battery, which are provided in the portable device, and the mobile battery according to a sixth embodiment.

FIG. 31 is a conceptual diagram for explaining the positional relationship between the main control circuit 11Z, the sub-control circuit 12, the built-in battery 71, and the mobile battery 81. As illustrated in FIG. 31, in the present embodiment, the distance between the main control circuit 11Z and the built-in battery 71 is defined as "a first distance W1", the distance between the sub-control circuit 12 and the built-in battery 71 is defined as "a second distance W2", the distance between the main control circuit 11Z and the mobile battery 81 is defined as "a third distance W3", and the distance between the sub-control circuit 12 and the mobile battery 81 is defined as "a fourth distance W4".

In the present embodiment, for example, a distance between one object and another object is defined as the minimum distance between the outer surface of the one object and the outer surface of the other object. In other words, in the present embodiment, the distance between the one object and the other object is defined as the minimum value of the distance between an arbitrary point on the one object and an arbitrary point on the other object. Therefore, the first distance W1 is the minimum distance between an outer surface 11a of the main control circuit 11Z and an outer surface 71a of the built-in battery 71. The second distance W2 is the minimum distance between an outer surface 12a of the sub-control circuit 12 and the outer surface 71a of the built-in battery 71. The third distance W3 is the minimum distance between the outer surface 11a of the main control circuit 11Z and an outer surface 81a of the mobile battery 81. The fourth distance W4 is the minimum distance between the outer surface 12a of the sub-control circuit 12 and the outer surface 81a of the mobile battery 81.

The method of defining the distance in the present embodiment is an example and may be modified as appropriate. For example, the distance between one object and another object may be defined as the maximum value of the distance between an arbitrary point on the one object and an arbitrary point on the other object, may be defined as the distance between a hottest point on the one object and the hottest point on the other object, or may be defined as the distance between the center of gravity of the one object and the center of gravity of the other object.

As illustrated in FIG. 31, the first distance W1 is longer than the second distance W2, and the third distance W3 is longer than the fourth distance W4. In other words, the sum of the first distance W1 and the third distance W3 is longer than the sum of the second distance W2 and the fourth distance W4.

Therefore, in the present embodiment, it is possible to render the influence of the heat emission from the main control circuit 11Z which is greater than the heat emission amount of the sub-control circuit 12 on the built-in battery 71 and the mobile battery 81 less than the influence of the heat emission from the sub-control circuit 12 on the built-in battery 71 and the mobile battery 81 and it is possible to suppress the degradation by heat on the built-in battery 71 and the mobile battery 81.

In the present embodiment, a case is anticipated in which the third distance W3 is longer than the first distance W1 and the fourth distance W4 is longer than the second distance W2. However, this aspect is an example, and the third distance W3 may be shorter than the first distance W1 and the fourth distance W4 may be shorter than the second distance W2.

In the present embodiment, a case is anticipated in which the substrate provided for the main control circuit 11Z and the sub-control circuit provided for the sub-control circuit 12 are different from each other. In this case, it becomes easy to perform adjustment of the relative positional relationships between the main control circuit 11Z and the sub-control circuit 12 and between the built-in battery 71 and the mobile battery 81 as compared to a configuration in which the main control circuit 11Z and the sub-control circuit 12 are provided on the same substrate. However, this aspect is an example, and the main control circuit 11Z and the sub-control circuit 12 may be provided on the same substrate as in the example of FIG. 5.

7. Other Modification Examples

Specific modified aspects of the first embodiment to the sixth embodiment described above will be exemplified hereinafter. Two or more aspects arbitrarily selected from the following examples may be combined, as appropriate, within a scope not being mutually contradicting.

Modification Example 7.1

In the first embodiment and the second embodiment described above, the main control circuit 11 and the main control circuit 11A may be capable of executing processes which set the power supplying mode exemplified in FIG. 19A or FIG. 19B, as in the third embodiment.

In other words, the portable device P and the portable device PA may be capable of supplying power to the power supplying target using two power supplying modes, the built-in battery power supplying mode and the mobile battery power supplying mode.

For example, the main control circuit 11 may determine whether or not the mobile battery unit 8 is mounted to the mobile printer 1 based on the mounting signal Sc in step S101, determine whether or not the voltage Vb2 is greater than or equal to the threshold voltage Vth from the mobile battery 81 based on the state signal Sb in step S102, set the power supplying mode to the mobile battery power supplying mode in step S103 when the result of the determination in step S101 is positive and the result of the determination in step S102 is positive, and set the power supplying mode to the built-in battery power supplying mode in step S104 when the result of the determination in step S101 is negative or when the result of the determination in step S102 is negative.

In the present modification example, the built-in battery booster circuit 73 and the built-in battery diode 74 provided in the mobile printer 1 or the smart phone 2A correspond to the stopping circuit 700 which is an example of "the stopping unit".

Modification Example 7.2

In the first embodiment and the second embodiment described above, the main control circuit 11 and the main control circuit 11A may be capable of executing processes which set the power supplying mode and the boosting mode exemplified in FIG. 24A or FIG. 24B, as in the fourth embodiment.

In other words, the portable device P and the portable device PA may be provided with the built-in battery booster circuit 73C instead of the built-in battery booster circuit 73 and may be capable of boosting the voltage Vb1 output from the built-in battery 71 using two boosting modes, the first boosting mode and the second boosting mode. In this case, the portable device P and the portable device PA may be capable of supplying power to the power supplying target using two power supplying modes, the built-in battery power supplying mode and the mobile battery power supplying mode.

For example, the main control circuit 11 may determine whether or not the mobile battery unit 8 is mounted to the mobile printer 1 based on the mounting signal Sc in step S201, determine whether or not the voltage Vb2 is greater than or equal to the threshold voltage Vth from the mobile battery 81 based on the state signal Sb in step S202, set the power supplying mode to the mobile battery power supplying mode in step S203 and set the boosting mode to the first boosting mode when the result of the determination in step S201 is positive and the result of the determination in step S202 is positive, and set the power supplying mode to the built-in battery power supplying mode in step S204 and set the boosting mode to the second boosting mode when the result of the determination in step S201 is negative or when the result of the determination in step S202 is negative.

In the present modification example, the built-in battery diode 74 and the node nd1 provided in the mobile printer 1 or the smart phone 2A correspond to "the supplying unit".

Modification Example 7.3

In the embodiments and modification examples described above, although a mobile printer or a smart phone is exemplified as the mobile device, these aspects are merely examples. For example, in addition to a mobile printer or a smart phone, the mobile device may be a portable telephony device other than a smart phone, a portable information terminal, a wearable terminal, an electronic organizer, a calculator, a digital still camera, a video camera, a portable music player, an IC recorder, a portable radio, a portable television, a mobile projector, a mobile scanner, a mobile router, a portable DVD player, or the like. IC is an acronym for integrated circuit.

Modification Example 7.4

In the embodiments and modification examples described above, although a case is exemplified in which mobile battery 81 has a greater capacity than that of the built-in battery 71, this aspect is merely an example. For example, the built-in battery 71 may have a greater capacity than that of the mobile battery 81.

What is claimed is:
1. A mobile device comprising:
a drive element;
a first battery which outputs power;
a supplying unit which supplies the power output by the first battery or power output by a second battery to the drive element; and
a booster unit which boosts a voltage of the first battery to a first drive voltage that is lower than a voltage of the second battery when the voltage of the second battery is greater than or equal to a first voltage for driving the drive element, wherein the supplying unit prioritizes supplying of the power output by the second battery to the drive element over the power output by the first battery, and the supplying unit supplies the power output by the second battery to the drive element when the voltage of the second battery is greater than or equal to the first voltage.

2. The mobile device according to claim 1, wherein the second battery is attachable and detachable with respect to the mobile device.

3. The mobile device according to claim 1, wherein the booster unit boosts the voltage of the first battery to a second drive voltage that is greater than or equal to the first voltage when the voltage of the second battery is less than the first voltage, and the supplying unit supplies the power output by the first battery to the drive element when the voltage of the second battery is less than the first voltage.

4. The mobile device according to claim 1, wherein a maximum capacity of the second battery is greater than a maximum capacity of the first battery.

5. The mobile device according to claim 1, wherein the voltage of the first battery is lower than the first voltage, the supplying unit includes
- a node shared by a first path through which power is supplied from the first battery to the drive element and a second path through which power is supplied from the second battery to the drive element, and
- a diode provided on the first path, an anode of the diode being electrically coupled to the booster unit and a cathode of the diode being electrically coupled to the node, and the booster unit is provided on the first path.

6. The mobile device according to claim 5, wherein the node is bus wiring.

7. The mobile device according to claim 1, wherein the drive element includes a notification unit which performs notification of a capacity of the second battery.

8. The mobile device according to claim 1, further comprising:
- a first processor which controls the drive element; and
- power wiring which electrically couples the first processor, the first battery, and the second battery to one another, wherein
- a wiring length between the first processor and the first battery in the power wiring is shorter than a wiring length between the first processor and the second battery in the power wiring, and
- a wiring length between the second battery and the first battery in the power wiring is shorter than a wiring length between the second battery and the first processor in the power wiring.

9. The mobile device according to claim 1, further comprising:
- a first processor which controls the drive element; and
- a second processor having a smaller power consumption than the first processor, wherein
- a sum of a distance between the first processor and the first battery and a distance between the first processor and the second battery is greater than a sum of a distance between the second processor and the first battery and a distance between the second processor and the second battery.

* * * * *